US012574666B2

(12) United States Patent
Kitamura et al.

(10) Patent No.: US 12,574,666 B2
(45) Date of Patent: Mar. 10, 2026

(54) CONNECTION NODE APPARATUS, OPTICAL TRANSMISSION SYSTEM, AND CONNECTION METHOD

(71) Applicant: NTT, Inc., Tokyo (JP)

(72) Inventors: Kei Kitamura, Musashino (JP); Hideki Nishizawa, Musashino (JP); Tetsuro Inui, Musashino (JP); Takafumi Tanaka, Musashino (JP); Takeru Inoue, Musashino (JP)

(73) Assignee: NTT, Inc., Tokyo (JP)

( * ) Notice: Subject to any disclaimer, the term of this patent is extended or adjusted under 35 U.S.C. 154(b) by 331 days.

(21) Appl. No.: 18/286,461

(22) PCT Filed: Apr. 30, 2021

(86) PCT No.: PCT/JP2021/017206
§ 371 (c)(1),
(2) Date: Oct. 11, 2023

(87) PCT Pub. No.: WO2022/230175
PCT Pub. Date: Nov. 3, 2022

(65) Prior Publication Data
US 2024/0196118 A1 Jun. 13, 2024

(51) Int. Cl.
*H04Q 11/00* (2006.01)
(52) U.S. Cl.
CPC ..... *H04Q 11/0005* (2013.01); *H04Q 11/0062* (2013.01); *H04Q 2011/0016* (2013.01); *H04Q 2011/0073* (2013.01)
(58) Field of Classification Search
None
See application file for complete search history.

(56) References Cited

U.S. PATENT DOCUMENTS 7,039,316 B2 * 5/2006 Chang ................ H04Q 11/0005
398/183
8,041,214 B2 * 10/2011 Wada ................. H04Q 11/0005
398/54
(Continued)

FOREIGN PATENT DOCUMENTS

EP 3206311 A1 8/2017
JP 2011-250291 A 12/2011
(Continued)

*Primary Examiner* — Jai M Lee
(74) *Attorney, Agent, or Firm* — Harness, Dickey & Pierce, P.L.C.

(57) ABSTRACT

An output port switching unit that connects to a first optical transmission path, a second optical transmission path, and the connection information processor, and sets a destination of the first optical transmission path as the connection information processor in an initial state. A controller that transmits transmission mode information indicating a transmission mode identified based on connection information of the first optical transmission path acquired from an optical signal transmitted by an optical transceiver provided in an optical communicator that the connection information processor connects to the first optical transmission path, connection request data included in the optical signal and transmitted by the optical transceiver, and transmission path information of the second optical transmission path to the optical transceiver through the first optical transmission path. The output port switching unit performs switching processing of switching a destination of the first optical transmission path from the connection information processor to the second optical transmission path after the controller transmits the transmission mode information.

20 Claims, 20 Drawing Sheets

(56) References Cited

U.S. PATENT DOCUMENTS

| | | | |
|---|---|---|---|
| 10,637,570 B1 | 4/2020 | Brinkley et al. | |
| 10,750,255 B2* | 8/2020 | Mehrvar | H04Q 11/0005 |
| 11,212,793 B2 | 12/2021 | Abdel Shahid et al. | |
| 11,217,077 B2 | 1/2022 | Shakedd et al. | |
| 11,218,588 B2 | 1/2022 | Horsley | |
| 12,323,750 B2* | 6/2025 | Patronas | H04L 45/62 |
| 2003/0099014 A1 | 5/2003 | Egner et al. | |
| 2009/0196602 A1 | 8/2009 | Saunders et al. | |
| 2010/0262664 A1 | 10/2010 | Brown et al. | |
| 2011/0170450 A1 | 7/2011 | Juntti et al. | |
| 2011/0255870 A1 | 10/2011 | Grigoryan et al. | |
| 2011/0293266 A1* | 12/2011 | Aoki | H04B 10/5161 398/25 |
| 2012/0230694 A1 | 9/2012 | Tanaka et al. | |
| 2015/0043364 A1 | 2/2015 | Kahng et al. | |
| 2015/0071640 A1 | 3/2015 | Batshon et al. | |
| 2015/0280892 A1 | 10/2015 | Verbin et al. | |
| 2016/0094305 A1 | 3/2016 | Yamashita et al. | |
| 2016/0119221 A1* | 4/2016 | Tochio | H04L 45/02 398/52 |
| 2016/0191189 A1 | 6/2016 | Mitchell | |
| 2016/0192042 A1 | 6/2016 | Mitchell | |
| 2016/0356152 A1 | 12/2016 | Croux et al. | |
| 2017/0134089 A1 | 5/2017 | Mansouri Rad et al. | |
| 2018/0034618 A1 | 2/2018 | Al Rawi et al. | |
| 2018/0302154 A1 | 10/2018 | Ferreira et al. | |
| 2019/0036608 A1 | 1/2019 | Leigh et al. | |
| 2019/0097720 A1 | 3/2019 | Kim et al. | |
| 2019/0097747 A1 | 3/2019 | Kim et al. | |
| 2019/0166009 A1 | 5/2019 | Parvin et al. | |
| 2019/0356378 A1 | 11/2019 | Takeda et al. | |
| 2020/0067624 A1 | 2/2020 | Tsuzuki | |
| 2020/0145995 A1 | 5/2020 | Abdel Shahid et al. | |
| 2021/0111959 A1 | 4/2021 | Shahriar et al. | |
| 2021/0258893 A1 | 8/2021 | Zhang et al. | |
| 2021/0314067 A1 | 10/2021 | Inui et al. | |
| 2021/0320856 A1 | 10/2021 | Castaldelli et al. | |
| 2021/0328693 A1 | 10/2021 | Difranco | |
| 2022/0006490 A1 | 1/2022 | Barois et al. | |
| 2022/0006491 A1 | 1/2022 | Barois et al. | |
| 2022/0007237 A1 | 1/2022 | Huang et al. | |
| 2022/0007341 A1 | 1/2022 | Matthews et al. | |
| 2022/0012810 A1 | 1/2022 | Brandmaier et al. | |
| 2022/0014338 A1 | 1/2022 | Yoshioka et al. | |

FOREIGN PATENT DOCUMENTS

| | | | |
|---|---|---|---|
| JP | 2012-191452 A | 10/2012 | |
| JP | 5753604 B1 | 7/2015 | |
| JP | 2015188165 A | 10/2015 | |
| JP | 2016-072834 A | 5/2016 | |
| JP | 2018078377 A | 5/2018 | |
| WO | WO-2020/031514 A1 | 2/2020 | |

* cited by examiner

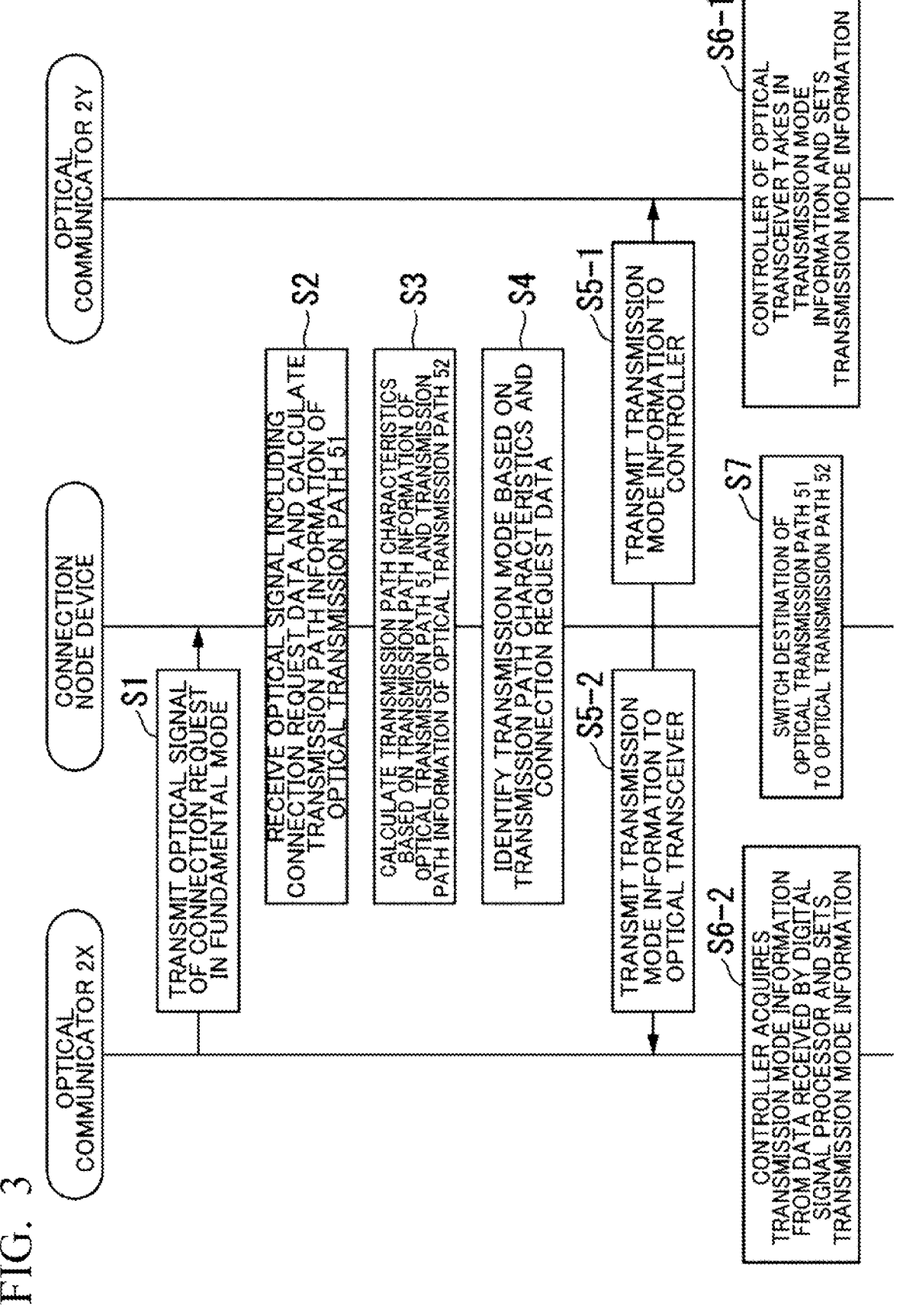

OPTICAL COMMUNICATOR 2Y

CONNECTION NODE DEVICE

OPTICAL COMMUNICATOR 2X

S1 — TRANSMIT OPTICAL SIGNAL OF CONNECTION REQUEST IN FUNDAMENTAL MODE

S2 — RECEIVE OPTICAL SIGNAL INCLUDING CONNECTION REQUEST DATA AND CALCULATE TRANSMISSION PATH INFORMATION OF OPTICAL TRANSMISSION PATH 51

S3 — CALCULATE TRANSMISSION PATH CHARACTERISTICS BASED ON TRANSMISSION PATH INFORMATION OF OPTICAL TRANSMISSION PATH 51 AND TRANSMISSION PATH INFORMATION OF OPTICAL TRANSMISSION PATH 52

S4 — IDENTIFY TRANSMISSION MODE BASED ON TRANSMISSION PATH CHARACTERISTICS AND CONNECTION REQUEST DATA

S5-1 — TRANSMIT TRANSMISSION MODE INFORMATION TO CONTROLLER

S5-2 — TRANSMIT TRANSMISSION MODE INFORMATION TO OPTICAL TRANSCEIVER

S6-1 — CONTROLLER OF OPTICAL TRANSCEIVER TAKES IN TRANSMISSION MODE INFORMATION AND SETS TRANSMISSION MODE INFORMATION

S6-2 — CONTROLLER ACQUIRES TRANSMISSION MODE INFORMATION FROM DATA RECEIVED BY DIGITAL SIGNAL PROCESSOR AND SETS TRANSMISSION MODE INFORMATION

S7 — SWITCH DESTINATION OF OPTICAL TRANSMISSION PATH 51 TO OPTICAL TRANSMISSION PATH 52

| CONNECTION STATUS TABLE 43 | | | | |
|---|---|---|---|---|
| SOURCE ADDRESS INFORMATION | DESTINATION ADDRESS INFORMATION | CONNECTION NODE DEVICE | DESTINATION OPTICAL TRANSMISSION PATH | RECEIVED DATA |
| (ADDRESS INFORMATION OF OPTICAL TRANSCEIVER 21aX) | (ADDRESS INFORMATION OF OPTICAL TRANSCEIVER 21aY) | (IDENTIFICATION INFORMATION OF CONNECTION NODE DEVICE 1bX) | (IDENTIFICATION INFORMATION FOR IDENTIFYING OPTICAL TRANSMISSION PATH 52) | (CONNECTION INFORMATION AND CONNECTION REQUEST DATA OF OPTICAL TRANSMISSION PATH 51 TRANSMITTED BY OPTICAL TRANSCEIVER 21aX) |
| (ADDRESS INFORMATION OF OPTICAL TRANSCEIVER 21aY) | (ADDRESS INFORMATION OF OPTICAL TRANSCEIVER 21aX) | (IDENTIFICATION INFORMATION OF CONNECTION NODE DEVICE 1bY) | (IDENTIFICATION INFORMATION FOR IDENTIFYING OPTICAL TRANSMISSION PATH 52) | (CONNECTION INFORMATION AND CONNECTION REQUEST DATA OF OPTICAL TRANSMISSION PATH 53 TRANSMITTED BY OPTICAL TRANSCEIVER 21aY) |
| ... | ... | ... | ... | ... |

CONNECTION NODE APPARATUS, OPTICAL TRANSMISSION SYSTEM, AND CONNECTION METHOD

CROSS-REFERENCE TO RELATED APPLICATIONS

This application is a 371 U.S. National Phase of International Application No. PCT/JP2021/017206, filed on Apr. 30, 2021. The entire disclosure of the above application is incorporated herein by reference.

TECHNICAL FIELD

The present invention relates to a connection server device, an optical transmission system and a connection method.

BACKGROUND ART

In accordance with high functionality of digital signal processing of optical transmission, that is, digital signal processors (DSPs), various parameters related to transmission performance such as baud rate, type of error correction code (ECC) such as FEC (Forward Error Correction), and number of carriers as well as modulation methods have increased, and transmission modes have been diversified. On the other hand, a technique for selecting an optimum transmission mode from among transmission modes determined by a combination of a plurality of parameters related to transmission performance and a messaging method for selecting an optimum transmission mode have been proposed.

For example, PTL 1 discloses a method of selecting an optimum modulation method based on a training signal. PTL 2 discloses a messaging method for selecting an optimum transmission mode in accordance with various parameters related to transmission performance such as a baud rate, a type of an error correction code (ECC), and the number of carriers other than the modulation method.

CITATION LIST

Patent Literature

[PTL 1] Japanese Patent No. 5753604
[PTL 2] WO 2020/031514

SUMMARY OF INVENTION

Technical Problem

However, according to the techniques described in PTLs 1 and 2, when setting the path of light passing through a plurality of optical transmission paths such as optical transmission paths of dark fibers and carrier networks, that is, an optical path, it is not possible to set the path of light by selecting an optimum transmission mode. In other words, when setting an optical path through a plurality of optical transmission paths such as dark fibers and carrier networks, it is necessary to manually measure the characteristics of the dark fibers from a user terminal device provided in a data center or the like to an edge terminal device of the carrier network. Therefore, there is a problem that setting optical paths between users requires cost and time. Further, since the resources that can be used within the carrier network are partially used for other communications, there is a limitation on the resources that can be used when setting the optical path, it is necessary to take the limitation on the resources into consideration in the setting of the optical path between users.

In view of the above-mentioned circumstances, an object of the present invention is to provide a technique capable of connecting optical transceivers provided in an optical communicator through a plurality of optical transmission paths without manual intervention by an optical path of an optimum transmission mode.

Solution to Problem

An aspect of the present invention provides a connection node device including: a connection information processor that acquires connection information including transmission path information that is information related to an optical transmission path; an output port switching unit that connects to a first optical transmission path, a second optical transmission path, and the connection information processor, and sets a destination of the first optical transmission path as the connection information processor in an initial state; a controller that transmits transmission mode information indicating a transmission mode identified based on connection information of the first optical transmission path acquired from an optical signal transmitted by an optical transceiver provided in an optical communicator that the connection information processor connects to the first optical transmission path, connection request data included in the optical signal and transmitted by the optical transceiver, and transmission path information of the second optical transmission path to the optical transceiver through the first optical transmission path, wherein the output port switching unit performs switching processing of switching a destination of the first optical transmission path from the connection information processor to the second optical transmission path after the controller transmits the transmission mode information.

Another aspect of the present invention provides an optical transmission system including: the connection node device; a first optical communicator that connects to the other end of the first optical transmission path having one end to which the connection node device is connected; and a second optical communicator that connects to the connection node device directly or indirectly through the second optical transmission path having one end to which the connection node device is connected, wherein an optical transceiver provided in the first optical communicator receives the transmission mode information transmitted through the first optical transmission path by the controller of the connection node device and transmits and receives an optical signal through the first optical transmission path according to a transmission mode indicated by the received transmission mode information, an optical transceiver provided in the second optical communicator receives the transmission mode information and transmits and receives an optical signal through the second optical transmission path according to a transmission mode indicated by the received transmission mode information, and an output port switching unit of the connection node device performs the switching processing so that the optical transceiver provided in the first optical communicator and the optical transceiver provided in the second optical communicator are connected through the first optical transmission path and the second optical transmission path after the controller transmits the transmission mode information to the first optical communicator through the first optical transmission path.

Another aspect of the present invention provides a connection method including: allowing an output port switching unit to connect to a first optical transmission path, a second optical transmission path, and the connection information processor, and set a destination of the first optical transmission path as the connection information processor in an initial state; allowing a controller to transmit transmission mode information indicating a transmission mode identified based on connection information of the first optical transmission path acquired from an optical signal transmitted by an optical transceiver provided in an optical communicator that the connection information processor connects to the first optical transmission path, connection request data included in the optical signal and transmitted by the optical transceiver, and transmission path information of the second optical transmission path to the optical transceiver through the first optical transmission path; and allowing the output port switching unit to perform switching processing of switching a destination of the first optical transmission path from the connection information processor to the second optical transmission path after the controller transmits the transmission mode information.

Advantageous Effects of Invention

According to the present invention, it is possible to connect optical transceivers provided in an optical communicator through a plurality of optical transmission paths without manual intervention by an optical path of an optimum transmission mode.

BRIEF DESCRIPTION OF DRAWINGS

FIG. 1 is a block diagram illustrating the configuration of the optical transmission system according to a first embodiment.

FIG. 3 is a diagram illustrating the processing flow of the optical transmission system according to the first embodiment.

FIG. 18 is a diagram illustrating a data configuration of a connection status table of a transmission path designer in the fourth embodiment.

DESCRIPTION OF EMBODIMENTS

First Embodiment

Figure 1:
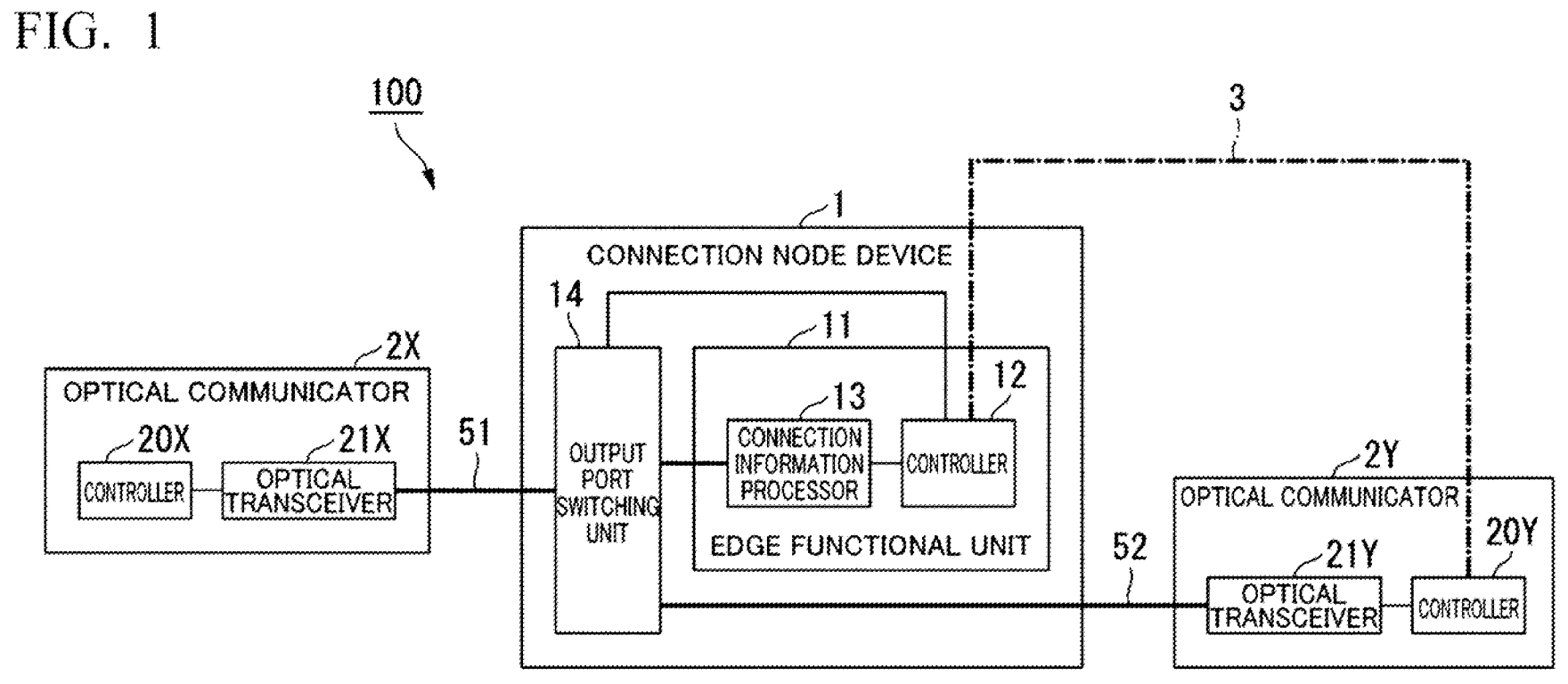

Hereinafter, an embodiment of the present invention will be described with reference to the drawings. FIG. 1 is a block diagram illustrating the configuration of the optical transmission system 100 according to a first embodiment. The optical transmission system 100 includes a connection node device 1, an optical communicator 2X, an optical communicator 2Y, an optical transmission path 51, an optical transmission path 52 and a connection line 3. The optical transmission path 51 connects the optical communicator 2X and the connection node device 1. The optical transmission path 52 connects the optical communicator 2Y and the connection node device 1. The connection line 3 connects the connection node device 1 and the optical communicator 2Y. The optical communicator 2X is, for example, a communicator used by a user. The optical communicator 2Y is, for example, an optical transmission device owned by a telecommunication carrier, that is, a node device in a communication network, or a white box transponder owned by a telecommunications carrier or a data center operator.

Figure 2:
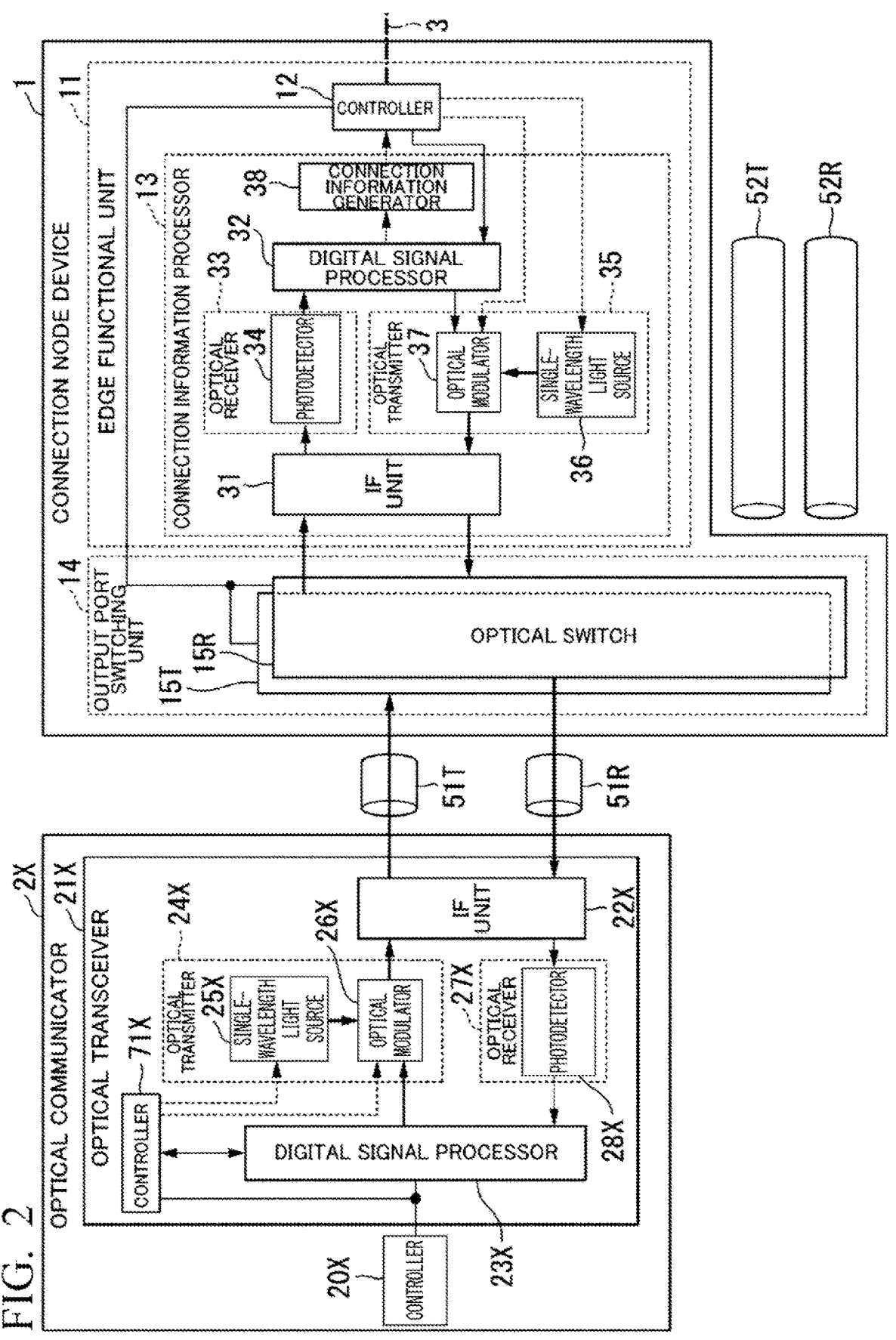
FIG. 2 is a diagram (part 1) illustrating an internal configuration of the connection node device and an optical communicator, and the connection relationship of the optical transmission paths in each of the connection node device and the optical communicator in the first embodiment.

Referring to FIG. 2 in addition to FIG. 1, the internal configuration of the connection node device 1, the optical communicator 2X, and the optical communicator 2Y will be described. In the connection lines illustrated in FIGS. 1 and 2, solid lines with thin arrows indicate the paths of electric data signals, solid lines with thick arrows indicate the paths of optical data signals, broken lines with thin arrows indicate the paths of electric control signals, narrow solid lines indicate electrical connections, thick solid lines indicate connections by optical lines, and dashed-dotted lines indicate connection lines. The same applies to other figures unless otherwise indicated.

As illustrated in FIG. 2, the optical transmission path 51 illustrated in FIG. 1 includes optical fibers 51T and 51R such as dark fibers. Here, in order to distinguish the two optical fibers included in the optical transmission path 51, for convenience of explanation, the letters "T" and "R" are attached to the sign "51". The sign "T" means a transmission direction viewed from the optical communicator 2X and a reception direction viewed from the connection node device 1 and the optical communicator 2Y. The sign "R" is a reception direction viewed from the optical communicator 2X and a transmission direction viewed from the connection node device 1 and the optical communicator 2Y. As illustrated in FIG. 2, the optical transmission path 52 illustrated in FIG. 1 includes, for example, optical fibers 52T and 52R constituting a carrier network owned by a telecommunication carrier. The connection line 3 is a communication line, and for example, may be a wired communication line such as a dedicated line, a wireless communication line, or a communication network such as a mobile communication network or the Internet network, or a DCN (Data Communication Network). In the case of connection by an optical communication line, a part of the overhead area of the digital frame transferred by an optical signal may be assigned as the connection line 3.

The optical communicator 2X is, for example, a transponder for transmitting data given from an external device and outputting the received data to the external device. As illustrated in FIG. 2, the optical communicator 2X includes a controller 20X and an optical transceiver 21X. The controller 20X is connected to the optical transceiver 21X, and controls the optical transceiver 21X and inputs and outputs information to and from the optical transceiver 21X. The controller 20X generates a connection request instruction signal, for example, when starting connection to an optical transceiver 21Y included in the optical communicator 2Y.

The optical transceiver 21X includes an IF (interface) unit 22X, an optical transmitter 24X, an optical receiver 27X, a digital signal processor 23X, and a controller 71X. The IF unit 22X connects the optical fiber 51T of the optical transmission path 51 and the optical transmitter 24X. The IF unit 22X connects the optical fiber 51R of the optical transmission path 51 and the optical receiver 27X.

Upon receiving the connection request instruction signal from the controller 20X, the controller 71X generates data indicating a connection request (hereinafter referred to as "connection request data"). Here, the connection request data is data including information such as a destination address, a source address, a desired bit rate, specifications of the optical transceiver 21X, and the like. The specification information of the optical transceiver 21X is information including, for example, a modulation method available in the optical transmitter 24X, an FEC type available in the digital signal processor 23X, the baud rate, and the type of a light source provided in the optical transmitter 24X.

Here, the information indicating the type of the light source is, for example, information indicating whether the light source outputs a predetermined single wavelength, or the light source changes and outputs the wavelength, and is information including information related to the wavelength or wavelength band that the light source can output in addition to the information. In the case of the optical communicator 2X, the optical transmitter 24X has a single-wavelength light source 25X. Thus, the specification information of the optical transceiver 21X includes information that a light source provided in the optical transmitter 24X is of a type that outputs a predetermined single wavelength, and information indicating a wavelength that the light source can output.

The optical transceiver 21X included in the optical communicator 2X and the optical transceiver 21Y included in the optical communicator 2Y are assigned in advance with address information that allows them to be identified. The controller 20X stores a desired bit rate and address information of a destination in advance in an internal storage area. The controller 71X stores address information added to the optical transceiver 21X provided therein in advance in an internal storage area. The controller 71X acquires the specification information of the optical transceiver 21X from the optical transmitter 24X and the digital signal processor 23X, and stores it in an internal storage area, for example, at a timing when the optical transceiver 21X is provided in the optical communicator 2X. Further, the controller 20X may not store address information of the destination in advance in an internal storage area, but may take in and acquire address information of the destination designated by a user of the optical communicator 2X, and may acquire the address information of the destination from the connection node device 1. Further, the controller 20X may not store the desired bit rate in the internal storage area in advance, but may receive the input operation of the user and take in and acquire data of the bit rate designated by the user in advance as the desired bit rate.

The controller 20X generates a connection request instruction signal including the address information of the optical transceiver 21Y and a desired bit rate and outputs it to the controller 71X, for example, when requesting connection to the optical transceiver 21Y provided in the optical communicator 2Y. The controller 71X reads the address information of the optical transceiver 21Y included in the connection request instruction signal received from the controller 20X to determine it as destination address information, and reads the address information of the optical transceiver 21X stored in the internal storage area to determine it as source address information. The controller 71X generates connection request data including the destination address information and the source address information determined as above, a desired bit rate included in the connection request instruction signal, and the specification information of the optical transceiver 21X stored in the internal storage area. The controller 71X outputs the generated connection request data to the digital signal processor 23X.

The digital signal processor 23X is, for example, a DSP, and is connected to the controller 71X, the optical transmitter 24X, and the optical receiver 27X. The digital signal processor 23X takes in transmission data such as a client signal given from an external device connected to the optical communicator 2X. The digital signal processor 23X takes in the connection request data generated by the controller 71X.

The digital signal processor 23X generates a transmission data signal in a transmission frame format including the taken-in transmission data in a payload. Further, the digital signal processor 23X generates a transmission data signal so that the taken-in connection request data is included in the free area of the overhead of the transmission frame. The digital signal processor 23X may generate a transmission data signal so as not to include the transmission data in the payload in order to prevent transmission data from being transmitted at a timing before the transmission mode information is determined. The digital signal processor 23X outputs the generated transmission data signal to the optical transmitter 24X.

The digital signal processor 23X takes in the reception data signal of the electric signal output by the optical receiver 27X. The digital signal processor 23X reads data included in the payload and overhead of the taken-in reception data signal. The digital signal processor 23X outputs the client signal in the read data to the external device. The digital signal processor 23X outputs the connection request data in the read data and the control information included in the overhead to the controller 71X. The controller 71X outputs an electric control signal to the single-wavelength light source 25X and an optical modulator 26X, as indicated by dashed arrows.

The optical transmitter 24X includes the single-wavelength light source 25X and the optical modulator 26X. The single-wavelength light source 25X generates continuous light of a predetermined single wavelength with optical power designated by a control signal (hereinafter referred to as an "output optical power designation signal") indicating the output optical power output by the controller 71X and outputs the continuous light. The optical modulator 26X optically modulates the continuous light output from the single-wavelength light source 25X according to a modulation method designated by a control signal (hereinafter referred to as a "modulation method designation signal") designating a modulation method output from the controller 71X based on the transmission data signal output from the digital signal processor 23X. The optical modulator 26X outputs the optical signal generated by optical modulation to the IF unit 22X.

The optical receiver 27X includes a photodetector 28X. The photodetector 28X is, for example, a PD (photo diode), receives an optical signal output from the IF unit 22X, performs optical intensity detection, for example, on the received optical signal, and converts it into an electric signal. The photodetector 28X outputs the electric signal converted from the optical signal to the digital signal processor 23X as a reception data signal.

The optical communicator 2Y has the same functional units as the optical communicator 2X. Hereinafter, when each functional unit provided in the optical communicator 2Y is indicated, the sign "X" included in the reference numeral attached to each functional unit provided in the optical communicator 2X is replaced with "Y".

The connection node device 1 includes an edge functional unit 11 and an output port switching unit (output port switch) 14. The output port switching unit 14 includes optical switches 15T and 15R which are, for example, fiber patch panels. The optical switch 15T is connected to the optical fiber 51T, the edge functional unit 11, and the optical fiber 52T included in the optical transmission path 52. The optical switch 15T performs switching processing of switching the destination of the optical fiber 51T to either the edge functional unit 11 or the optical fiber 52T. The optical switch 15R is connected to the optical fiber 51R, the edge functional unit 11, and the optical fiber 52R included in the optical transmission path 52. The optical switch 15R performs switching processing of switching the destination of the optical fiber 51R to either the edge functional unit 11 or the optical fiber 52R.

The edge functional unit 11 includes a controller 12 and a connection information processor 13. The connection information processor 13 includes an IF unit 31, a digital signal processor 32, an optical receiver 33, an optical transmitter 35, and a connection information generator 38.

The IF unit 31 connects the optical switch 15T and the optical receiver 33. The IF unit 31 connects the optical switch 15R and the optical transmitter 35.

The optical receiver 33 includes a photodetector 34. The photodetector 34 is, for example, a PD, receives the optical signal output from the IF unit 31, performs optical intensity detection, for example, on the received optical signal, and converts it into an electric signal. The photodetector 34 outputs the electric signal converted from the optical signal to the digital signal processor 32 as a reception data signal.

The optical transmitter 35 includes a single-wavelength light source 36 and an optical modulator 37. The single-wavelength light source 36 generates and outputs continuous light of a predetermined single wavelength, which is continuous light with fundamental output optical power in the fundamental mode designated by the controller 12. Here, the fundamental mode is a transmission mode determined in advance by predetermined fundamental output optical power, fundamental modulation method, fundamental wavelength, and the like. The controller 12, the controller 71X of the optical communicator 2X, and the controller 71Y of the optical communicator 2Y store information related to the fundamental mode in an internal storage area in advance.

The wavelength of the single-wavelength light source 36, the wavelength of the single-wavelength light source 25X provided in the optical communicator 2X, and the wavelength of the single-wavelength light source 25Y provided in the optical communicator 2Y are all the fundamental wavelengths determined in advance in the fundamental mode. However, these wavelengths are not necessarily limited to the same wavelength value as the fundamental wavelength. The wavelength of the single-wavelength light source 36 and the wavelength of the single-wavelength light source 25Y provided in the optical communicator 2Y may be any wavelength within a range where the photodetector 28X provided in the optical communicator 2X can receive light. Further, the wavelength of the single-wavelength light source 25X provided in the optical communicator 2X may be any wavelength within a range where the photodetector 28Y provided in the optical communicator 2Y and the photodetector 34 of the connection node device 1 can receive light.

The optical modulator 37 performs optical modulation of the continuous light output from the single-wavelength light source 36 according to the fundamental modulation method of the fundamental mode designated by the controller 12 based on the transmission data signal output from the digital signal processor 32.

The digital signal processor 32 is, for example, a DSP, and is connected to the optical receiver 33 and the optical transmitter 35. The digital signal processor 32 takes in the reception data signal output by the photodetector 34 of the optical receiver 33. When the connection request data transmitted by the optical communicator 2X is included in the reception data signal output by the photodetector 34, the digital signal processor 32 reads and acquires the connection request data from the reception data signal. The digital signal processor 32 generates a transmission data signal and outputs the transmission data signal to the optical modulator 37.

The connection information generator 38 calculates and acquires transmission path information of the optical fiber SIT of the optical transmission path 51, for example, by predetermined calculation disclosed in Reference 1 below based on the reception data signal taken in by the digital signal processor 32.

US 12,574,666 B2

9 | 10

Reference 1: Takeo Sasai, et al, "Simultaneous Detection of Anomaly Points and Fiber Types in Multi-Span Transmission Links Only by Receiver-Side Digital Signal Processing", OFC 2020: 1-3

Here, the transmission path information of the optical fiber 51T is information including the loss of the optical fiber 51T provided in the optical transmission path 51, the gain of an amplifier inserted into the optical transmission path 51, the NF (Noise Figure) of the amplifier, and the fiber type of the optical fiber SIT. The connection information generator 38 takes in the BER (bit Error Rate) of the optical transmission path 51 acquired from the reception data signal by the digital signal processor 32, and generates connection information including the BER of the optical transmission path 51 and the calculated transmission path information of the optical fiber 51T. The digital signal processor 32 may acquire information for calculating the BER instead of the BER, and the connection information generator 38 may calculate the BER based on the information for calculating the BER acquired by the digital signal processor 32, and include the calculated BER in the connection information. Further, the digital signal processor 32 may acquire a Q value (quality factor), a PMD (Polarization Mode Dispersion), a CD (Chromatic Dispersion) or an OSNR (Optical Signal-to-Noise Ratio) in addition to the BER, and output the information to the connection information generator 38 so that the Q value, the PMD, the CD, and the OSNR are included in the connection information. The digital signal processor 32 outputs a transmission data signal of an electric signal to the optical modulator 37. The connection information generator 38 outputs the connection request data read from the reception data signal by the digital signal processor 32 and the generated connection information to the controller 12.

The controller 12 stores in advance a path information table in which the pieces of address information of the optical transceivers 21X and 21Y provided in the optical communicators 2X and 2Y connected to the connection node device 1 and the identification information for identifying the optical transmission path corresponding to the address information are associated with each other in an internal storage area. The controller 12 may acquire the path information table from an external device or the like on demand, instead of storing the path information table in the internal storage area in advance. For example, in the case of the optical transmission system 100, the identification information for identifying the optical transmission path 51 is associated with the address information of the optical transceiver 21X of the optical communicator 2X in the path information table, and the identification information for identifying the optical transmission path 52 is associated with the address information of the optical transceiver 21Y of the optical communicator 2Y.

The controller 12 refers to the path information table and detects identification information for identifying the optical transmission path corresponding to the destination address information included in the connection request data output by the digital signal processor 32. However, in the first embodiment, the identification information for identifying the optical transmission path 52 is associated with address information of the optical transceiver 21Y in the path information table, and the optical communicator 2X selects only the optical transceiver 21Y as a destination. Therefore, the controller 12 always detects the identification information for identifying the optical transmission path 52, and the following description is made on the assumption that the controller 12 detects the identification information for identifying the optical transmission path 52.

The controller 12 stores the transmission path information of the optical transmission path 52 in an internal storage area in association with the identification information for identifying the optical transmission path 52. Here, the transmission path information of the optical transmission path 52 is, information including the loss of the optical fibers 52T and 52R provided in the optical transmission path 52, the gain of an amplifier inserted into the optical transmission path 52, the NF (Noise Figure) of the amplifier, and the fiber type of the optical fibers 52T and 52R similarly to the case of the optical transmission path 51. The controller 12 may calculate the transmission path information of the optical transmission path 52 in advance by predetermined calculation based on an optical signal transmitted by the optical transmission path 52 and store it in an internal storage area, or may acquire the information from an external device on demand at a specific timing such as when a network is constructed. The transmission path information of the optical transmission path 52 may be obtained in advance by a method other than the predetermined calculation.

The controller 12 stores information indicating free resources of the optical transmission path 52 in an internal storage area. Here, the information indicating the free resources includes, for example, information indicating a wavelength, a wavelength band, or an optical transmission path which is not used for communication when determining the free state of resources. It is assumed that the information indicating the free resources is updated by the controller 12 whenever the communication path is established. The controller 12 calculates the transmission path characteristics (QoT (Quality of Transmission)), for example, by a transmission design tool provided therein, based on the connection information generated by the connection information generator 38 and the transmission path information of the optical transmission path 52 stored in the internal storage area. Here, as the transmission design tool, for example, GNPy (Gaussian noise model in Python) illustrated in Reference 2 below is applied.

Reference 2: Alessio Ferrari, et al, "The GNPy Open Source Library of Applications for Software Abstraction of WDM Data Transport in Open Optical Networks", 2020 6th IEEE International Conference on Network Softwarization (NetSoft), DOI: 10.1109/NetSoft48620.2020.9165313, June 2020

Here, the transmission path characteristics are values calculated by the transmission design tool such as OSNR, GSNR (Generalized Signal-to-Noise Ratio), Q value, and BER. Here, the information such as OSNR, GSNR, Q value, and BER calculated by the transmission design tool is information such as OSNR, GSNR, Q value, and BER of the entire optical transmission path including the optical transmission paths 51 and 52.

The controller 12 selects configuration information for identifying the transmission mode by predetermined selection processing based on the calculated transmission path characteristics, information indicating free resources of the optical transmission path 52 stored in the internal storage area, the desired bit rate information included in the connection request data acquired from the digital signal processor 32, and the specification information of the optical transceiver 21X. Here, the predetermined selection processing is performed in the following manner. For example, the FEC type usable in the optical transceiver 21X and the optical transceiver 21Y is selected based on the FEC type included in the specification information of the optical transceiver 21X. After the PEC type is selected, a threshold value of ONSR determined for each modulation method included in the specification information of the optical transceiver 21X is compared with the OSNR of the calculated transmission path characteristics, and a modulation method in which the threshold value of OSNR is equal to or more than the calculated OSNR of the transmission path characteristics is selected. The configuration information is selected by processing of selecting a combination of a modulation method and a baud rate enabling transmission at a bit rate equal to or higher than a bit rate indicated by the desired bit rate information among a plurality of bit rate candidates in the selected several modulation methods. The transmission mode is identified by the configuration information selected by the controller 12. Here, the configuration information for identifying the transmission mode is, for example, information including output optical power, a signal band permitting use, and the like as well as the modulation method, baud rate, bit rate, and FEC (Forward Error Correction) type selected in the above processing. The information of the FEC type available in the optical transceiver 21Y is acquired by the controller 12 in advance and stored in the internal storage area, or acquired from the optical transceiver 21Y or an external device on demand. In the predetermined selection processing, a combination of a modulation method and a baud rate which enable transmission at a bit rate which is equal to or higher than the bit rate indicated by the desired bit rate information and closest to the bit rate indicated by the desired bit rate information may be selected from among a plurality of bit rate candidates in the selected several modulation methods.

The controller 12 generates transmission mode information including the selected configuration information and the source address information included in the connection request data. The controller 12 outputs the generated transmission mode information to the digital signal processor 32. As illustrated in FIG. 1, the controller 12 is connected to the controller 20Y of the optical communicator 2Y through, for example, the connection line 3, and transmits the generated transmission mode information to the controller 20Y of the optical communicator 2Y. The controller 12 outputs a control signal (hereinafter referred to as "switching instruction signal") for instructing switching processing of switching the destination to the optical switches 15T and 15R of the output port switching unit 14.

Processing of Optical Communication System of First Embodiment

FIG. 3 is a flowchart illustrating the processing flow of the optical transmission system 100. As illustrated in FIG. 2, the output port switching unit 14 of the connection node device 1 sets the destination of the optical transmission path 51 to the connection information processor 13 of the connection node device 1 in the initial state. More specifically, the optical switch 15T connects the optical fiber 51T to the photodetector 34 through the IF unit 31, and the optical switch 15R connects the optical fiber 51R the optical modulator 37 through the IF unit 31.

The controller 20X of the optical communicator 2X generates a connection request instruction signal including the address information of the optical transceiver 21Y and a desired bit rate in order to connect to the optical transceiver 21Y provided in the optical communicator 2Y. The controller 20X outputs the generated memory connection instruction to the memory connection controller 71X of the optical transceiver 21X. The controller 71X takes in the connection request instruction signal output by the controller 20X, and uses the address information of the optical transceiver 21Y included in the taken-in connection request instruction signal as destination address information. The controller 71X uses the address information of the optical transceiver 21X stored in the internal storage area as source address information. The controller 71X generates connection request data including the destination address information and source address information, a desired bit rate included in the connection request instruction signal, and the specification information of the optical transceiver 21X stored in the internal storage area.

The controller 71X outputs an output optical power designation signal indicating the fundamental output optical power determined in advance in the fundamental mode to the single-wavelength light source 25X. The single-wavelength light source 25X generates and outputs continuous light of a predetermined wavelength with the fundamental output optical power designated by the output optical power designation signal received from the controller 71X. The controller 71X outputs a modulation method designation signal indicating a fundamental modulation method determined in advance in the fundamental mode to the optical modulator 26X. The optical modulator 26X starts optical modulation according to a fundamental modulation method designated by the modulation method designation signal received from the controller 71X.

The controller 71X outputs the generated connection request data to the digital signal processor 23X. The digital signal processor 23X takes in the connection request data output by the controller 71X and generates a transmission data signal so that the taken-in connection request data is included in the free area of the overhead of the transmission frame. The digital signal processor 23X outputs the generated transmission data signal of an electric signal to the optical modulator 26X. The optical modulator 26X optically modulates the continuous light output from the single-wavelength light source 25X based on a transmission data signal including the connection request data output from the digital signal processor 23X. The optical modulator 26X transmits an optical signal generated by optical modulation to the optical fiber 51T through the IF unit 22X. The optical fiber 51T transmits the optical signal to the optical switch 15T of the output port switching unit 14 of the connection node device 1 (step S1).

The optical switch 15T receives the optical signal transmitted by the optical fiber SIT, and outputs the received optical signal to the photodetector 34 of the optical receiver 33 through the IF unit 31. The photodetector 34 takes in the optical signal output from the optical switch 15T. The photodetector 34 converts the received optical signal into an electric signal to obtain a reception data signal. The photodetector 34 outputs the reception data signal to the digital signal processor 32. The digital signal processor 32 takes in the reception data signal output from the photodetector 34. The digital signal processor 32 reads the connection request data included in the overhead area of the reception data signal and outputs the data to the connection information generator 38. The digital signal processor 32 acquires the BER of the optical transmission path 51 from the reception data signal and outputs it to the connection information generator 38. The connection information generator 38 takes in the connection request data output by the digital signal processor 32 and BER. When the connection request data output by the digital signal processor 32 and the BER are taken-in, the connection information generator 38 calculates the transmission path information of the optical transmission path 51 based on the reception data signal taken in by the digital signal processor 32 and output to the connection information generator 38. The connection information generator 38 generates connection information including the calculated transmission path information of the optical transmission path 51 and the BER of the optical transmission path 51. The connection information generator 38 outputs the taken-in connection request data and the generated connection information to the controller 12 (step S2).

The controller 12 takes in the connection request data output by the connection information generator 38 and the connection information. The controller 12 refers to the path information table stored in the internal storage area or a path information table acquired on demand, and detects destination address information included in the taken-in connection request data, in this case, the identification information for identifying the optical transmission path 52 corresponding to the address information of the optical transceiver 21Y.

The controller 12 reads and acquires the transmission path information of the optical transmission path 52 corresponding to the detected identification information from the internal storage area, or acquires the transmission path information of the optical transmission path 52 on demand. The controller 12 calculates the transmission path characteristics based on the acquired the transmission path information of the optical transmission path 52 and the taken-in connection information (step S3).

The controller 12 selects the configuration information by predetermined selection processing based on the calculated transmission path characteristics, the desired bit rate information included in the connection request data and the specification information of the optical transceiver 21X. The transmission mode is identified by the configuration information selected by the controller 12. The controller 12 generates transmission mode information including the selected configuration information and the source address information included in the connection request data (step S4).

The controller 12 transmits the generated transmission mode information to the controller 20Y of the optical communicator 2Y through the connection line 3 (step S5-1). The controller 20Y of the optical communicator 2Y receives the transmission mode information transmitted by the controller 12 of the connection node device 1, and outputs the received transmission mode information to the controller 71Y of the optical transceiver 21Y. The controller 71Y takes in the transmission mode information output by the controller 20Y. The controller 71Y outputs an output optical power designation signal indicating the output optical power indicated by the taken-in transmission mode information to the single-wavelength light source 25Y. Thus, the single-wavelength light source 25Y generates and outputs continuous light with the output optical power designated by the output optical power designation signal, that is, the output optical power indicated by the transmission mode information.

The controller 71Y outputs a modulation method designation signal indicating the modulation method indicated in the transmission mode information to the optical modulator 26Y. Thus, the optical modulator 26Y performs optical modulation according to a modulation method designated by the modulation method designation signal received from the controller 71Y, that is, a modulation method indicated in the transmission mode information. The controller 71Y outputs the transmission mode information to the digital signal processor 23Y. The digital signal processor 23Y takes in the transmission mode information output by the controller 71Y, and stores the modulation method, baud rate, bit rate, FEC type, signal band permitted to use, and the like indicated in the taken-in transmission mode information in the internal storage area as setting parameters, generates a transmission data signal based on the setting parameters stored in the internal storage area and outputs the signal to the optical modulator 26Y (step S6-1). The controller 71Y may store the modulation method, baud rate, bit rate, FEC type, signal band permitted to use, and the like indicated in the transmission mode information in the internal storage area as the setting parameters. In this case, the controller 71Y outputs the setting parameters to the digital signal processor 23Y when the digital signal processor 23Y generates the transmission data signal.

The controller 12 of the connection node device 1 outputs an output optical power designation signal for designating the fundamental output optical power of the fundamental mode to the single-wavelength light source 36, and outputs a modulation method designation signal for designating a fundamental modulation method of the fundamental mode to the optical modulator 37. The receiver 12 outputs the generated transmission mode information to the digital signal processor 32. The digital signal processor 32 takes in the transmission mode information output by the controller 12 and generates a transmission data signal so that the taken-in transmission mode information is included in the free area of the overhead of the transmission frame. The digital signal generator 32 outputs the generated transmission data signal of an electric signal to the optical signal generator 37. The optical modulator 37 performs optical modulation on the continuous light output by the single-wavelength light source 36 with the fundamental output optical power designated by the output optical power designation signal according to a fundamental modulation method of the fundamental mode designated by the modulation method designation signal based on the transmission data signal output by the digital signal processor 32.

The optical modulator 37 outputs an optical signal generated by optical modulation to the IF unit 31. The IF unit 31 takes in the optical signal output from the optical modulator 37. The IF unit 31 outputs the taken-in optical signal to the optical switch 15R. The optical switch 15R transmits an optical signal output from the IF unit 31 to the optical fiber 51R. The optical fiber 51R transmits the optical signal transmitted by the optical switch 15R to the IF unit 22X of the optical communicator 2X (step S5-2).

The IF unit 22X of the optical communicator 2X receives the optical signal transmitted by the optical fiber 51R and outputs the received optical signal to the photodetector 28X. The photodetector 28X receives the optical signal output from the IF unit 22X, and converts the received optical signal into an electric signal to obtain a reception data signal. The photodetector 28X outputs the reception data signal to the digital signal processor 23X. The digital signal processor 23X takes in the reception data signal output from the photodetector 28X.

The digital signal processor 23X reads the transmission mode information from the overhead area of the taken-in reception data signal, and outputs the read transmission mode information to the controller 71X. The controller 71X takes in the transmission mode information output by the digital signal processor 23X, and discards the taken-in transmission mode information when the source address information included in the taken-in transmission mode information is not the address information stored in the internal storage area and given to the optical transceiver 21X. On the other hand, when the address information included in the taken-in transmission mode information matches the address information added to the optical transceiver 21X, the controller 71X outputs an output optical power designation signal indicating the output optical power indicated in the read transmission mode information to the single-wavelength light source 25X. Thus, the single-wavelength light source 25X generates and outputs continuous light with the output optical power designated by the output optical power designation signal, that is, the output optical power indicated by the transmission mode information.

The controller 71X outputs a modulation method designation signal indicating the modulation method indicated in the transmission mode information to the optical modulator 26X. Thus, the optical modulator 26X performs optical modulation according to a modulation method designated by the modulation method designation signal received from the controller 71X, that is, a modulation method indicated in the transmission mode information. The digital signal processor 23X stores the modulation method, baud rate, bit rate, FEC type, signal band permitted to use, and the like indicated in the read transmission mode information in the internal storage area as setting parameters, generates a transmission data signal based on the setting parameters stored in the internal storage area and outputs the signal to the optical modulator 26X (step S6-2). The controller 71X may store the modulation method, baud rate, bit rate, FEC type, signal band permitted to use, and the like indicated in the transmission mode information in the internal storage area as the setting parameters. In this case, the controller 71X outputs the setting parameters to the digital signal processor 23X when the digital signal processor 23X generates the transmission data signal.

The controller 12 of the connection node device 1 refers to the path information table and detects the source address information included in the generated transmission mode information, in this case, the identification information for identifying the optical transmission path 51 corresponding to the address information of the optical transceiver 21X. The controller 12 performs switching processing of connecting the optical transmission path 51 and the optical transmission path 52 based on the detected the identification information for identifying the optical transmission path 51 and the identification information for identifying the optical transmission path 52 detected in the processing of step S3. The controller 12 outputs a switching instruction signal for setting the destination of the optical fiber 51T as the optical fiber 52T to the optical switch 15T of the output port switching unit 14. The controller 12 outputs a switching instruction signal for setting the destination of the optical fiber 51R as the optical fiber 52R to the optical switch 15R.

Figure 4:
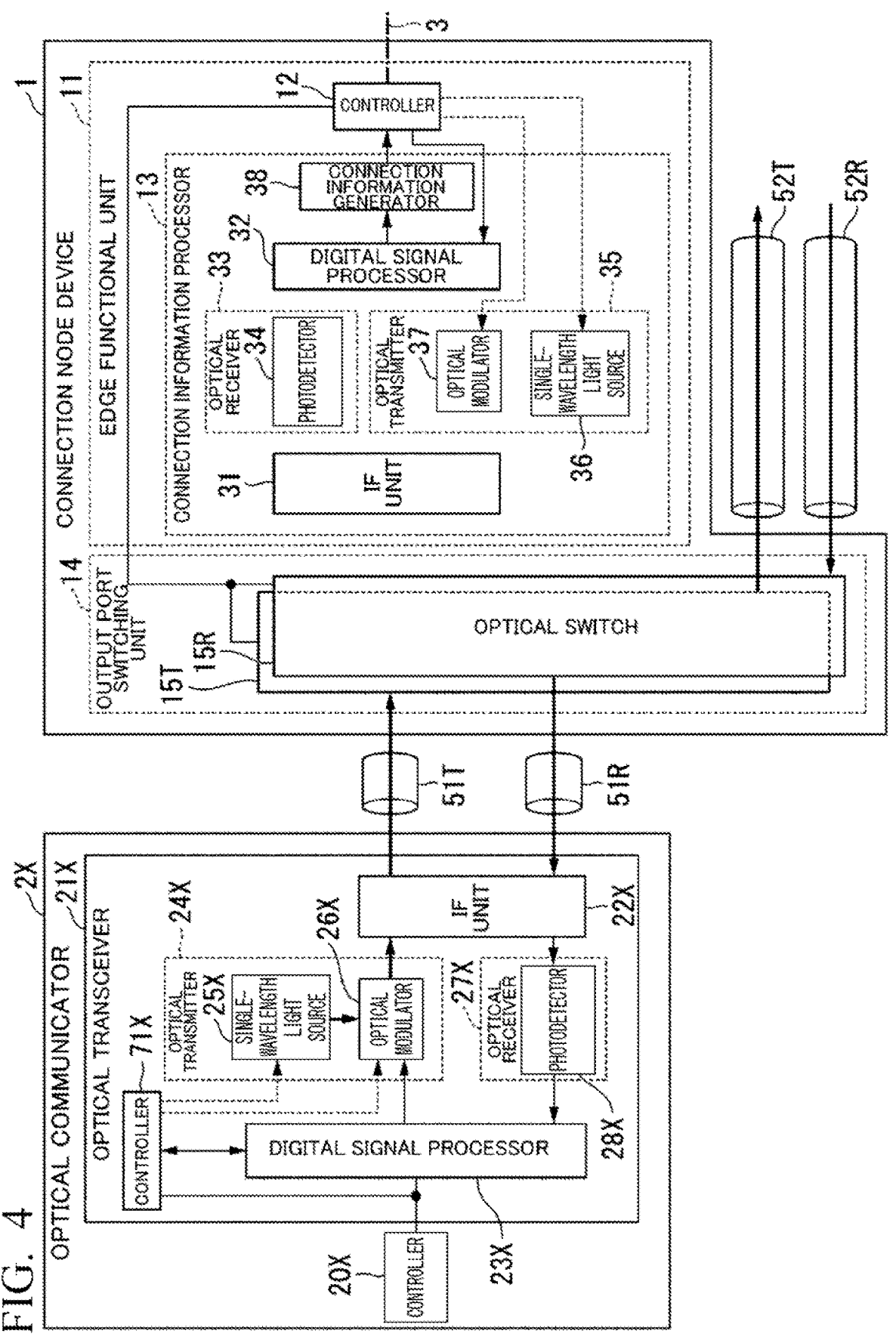
FIG. 4 is a diagram (part 2) illustrating an internal configuration of the connection node device and the optical communicator, and the connection relationship of the optical transmission paths in each of the connection node device and the optical communicator in the first embodiment.

Upon receiving the switching instruction signal from the controller 12, the optical switch 15T connects the optical fiber 51T and the optical fiber 52T. Upon receiving the switching instruction signal from the controller 12, the optical switch 15R connects the optical fiber 51R and the optical fiber 52R (step S7). Thus, as illustrated in FIG. 4, the optical fiber 51T and the optical fiber 52T are connected through the optical switch 15T, and the optical fiber 51R and the optical fiber 52R are connected through the optical switch 15R. Thus, the optical transceiver 21X of the optical communicator 2X and the optical transceiver 21Y of the optical communicator 2Y are connected through the optical transmission path 51 and the optical transmission path 52.

The processing of steps S5-1 and S5-2 may be performed in parallel and may be performed in the order of steps S5-1 and S5-2 or in the reverse order.

In the configuration of the first embodiment, the connection information processor 13 acquires connection information including transmission path information that is information related to an optical transmission path. The output port switching unit 14 is connected to the optical transmission path 51 which is a first optical transmission path, the optical transmission path 52 which is a second optical transmission path, and the connection information processor 13, and sets the destination of the optical transmission path 51 to the connection information processor 13 in the initial state. The controller 12 transmits the transmission mode information to the optical transceiver 21X through the optical transmission path 51, the transmission mode information indicating a transmission mode identified based on the connection information of the optical transmission path 51 acquired by the connection information processor 13 from the optical signal transmitted by the optical transceiver 21X included in the optical communicator 2X connected to the optical transmission path 51, the connection request data included in the optical signal and transmitted by the optical transceiver 21X, and the transmission path information of the optical transmission path 52. As an example, the output port switching unit 14 performs switching processing of switching the destination of the optical transmission path 51 from the connection information processor 13 to the optical transmission path 52 after the controller 12 transmits the transmission mode information. Thus, for example, when the optical communicator 2Y having the optical transceiver 21Y is connected to the optical transmission path 52, and the optical transceivers 21X and 21Y provided in the optical communicators 2X and 2Y are connected through the plurality of optical transmission paths 51 and 52, the optical transceivers can be connected by an optical path of the optimum transmission mode without manual intervention. Therefore, the cost and time required for setting the optical path can be reduced.

In the first embodiment, the controller 12 of the connection node device 1 calculates an end-to-end the transmission path characteristics, that is, between one end to which the optical communicator 2X of the optical transmission path 51 is connected and one end to which the optical communicator 2Y of the optical transmission path 52 is connected, based on the connection information generated by the connection information processor 13 and the transmission path information of the optical transmission path 52. On the other hand, the transmission path characteristics may be calculated in the following manner. The controller 12 calculates the transmission path characteristics of the optical transmission path 51 based on the connection information generated by the connection information processor 13. The controller 12 calculates the transmission path characteristics of the optical transmission path 52 based on the transmission path information of the optical transmission path 52. The controller 12 may calculate the approximate end-to-end the transmission path characteristics based on the calculated transmission path characteristics of the optical transmission path 51 and the transmission path characteristics of the optical transmission path 52. For example, in the case of OSNR and GSNR included in the transmission path characteristics, the controller 12 calculates the OSNR and GSNR of the optical transmission path 51 and the OSNR and GSNR of the optical transmission path 52. The controller 12 calculates an approximate end, to-end OSNR based on the calculated OSNR of the optical transmission path 51 and the OSNR of the optical transmission path 52. Further, an approximate end-to-end GSNR is calculated based on the calculated GSNR of the optical transmission path 51 and the GSNR of the optical transmission path 52. The controller 12 may not calculate the transmission path characteristics of the optical transmission path 52 based on the transmission path information of the optical transmission path 52, but may be configured as follows. The controller 12 calculates the transmission path characteristics of the optical transmission path 52 in advance based on the transmission path information of the optical transmission path 52, and stores the calculated transmission path characteristics of the optical transmission path 52 in advance in an internal storage area. The controller 12 may obtain the transmission path characteristics of the optical transmission path 52 by reading the transmission path characteristics of the optical transmission path 52 from the internal storage area instead of the calculation processing when performing the processing of calculating the transmission path characteristics of the optical transmission path 52.

Second Embodiment

Figure 5:
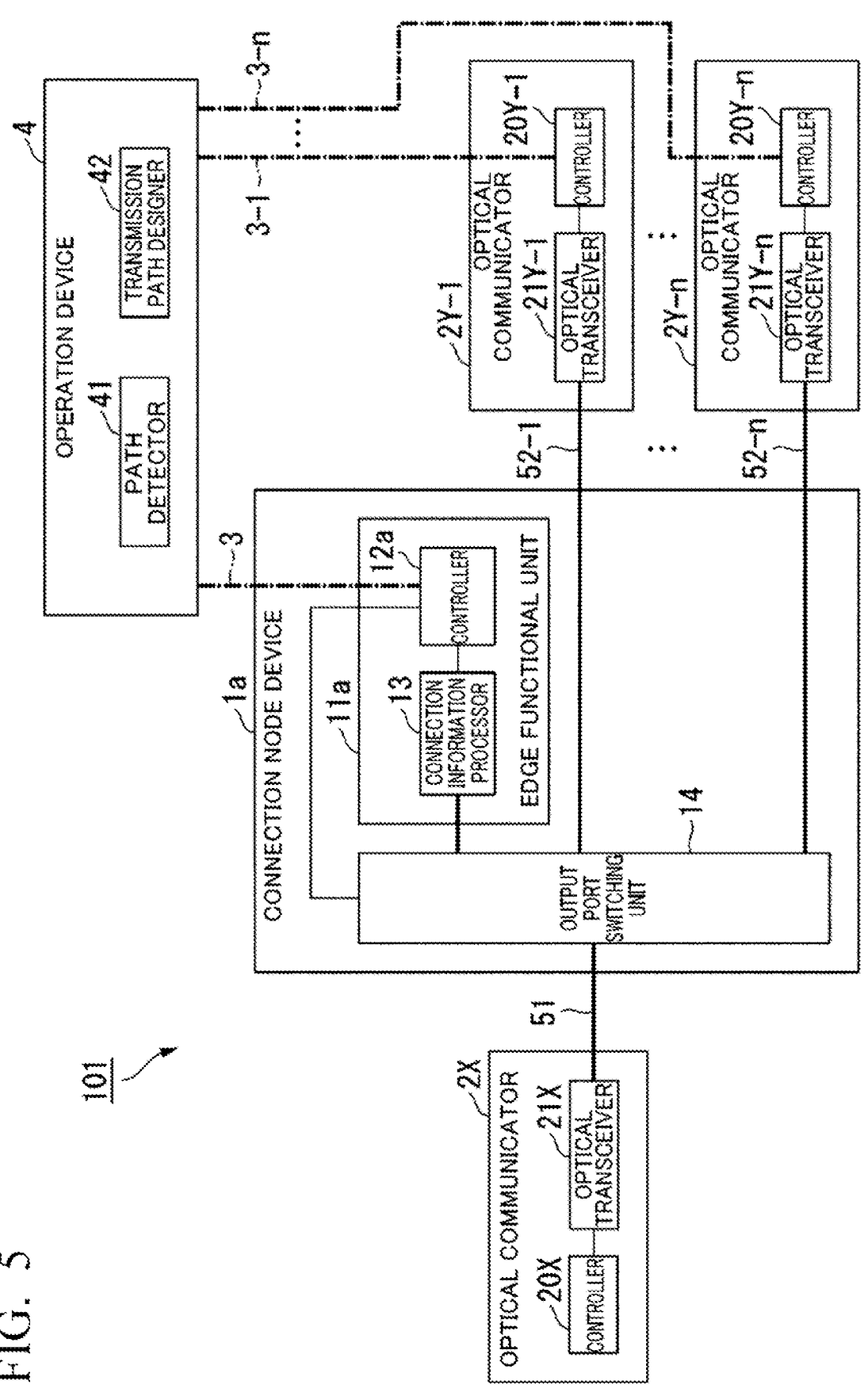
FIG. 5 is a block diagram illustrating the configuration of the optical transmission system according to a second embodiment.

FIG. 5 is a block diagram illustrating the configuration of the optical transmission system 101 according to a second embodiment. In the second embodiment, the same reference numerals are assigned to the same configurations as in the first embodiment, and the different configurations will be described below. The optical transmission system 101 includes a connection node device 1a, an optical communicator 2X, a plurality of optical communicators 2Y-1 to 2Y-n, an operation device 4, an optical transmission path 51, optical transmission paths 52-1 to 52-n, a connection line 3, and the connection lines 3-1 to 3-n for connecting the operation device 4 and the optical communicators 2Y-1 to 2Y-n. Here, n is an integer of 1 or more. The optical transmission path 51 connects the optical communicator 2X and the connection node device 1a. The optical transmission paths 52-1 to 52-n connect the optical communicators 2Y-1 to 2Y-n and the connection node device 1a. The connection line 3 connects the operation device 4 and the connection node device 1a.

The optical communicators 2Y-1 to 2Y-n each have the same configuration as that of the optical communicator 2Y according to the first embodiment, that is, the same configuration as that of the optical communicator 2X. When each functional unit provided in the optical communicators 2Y-1 to 2Y-n is indicated, "X" included in the reference numerals attached to each functional unit provided in the optical communicator 2X is replaced with "Y-1" to "Y-n". Similarly to the optical transceiver 21X of the optical communicator 2X, the optical transceivers 21Y-1 to 21Y-n included in the optical communicators 2Y-1 to 2Y-n are assigned in advance with address information that allows them to be identified.

Similarly to the optical transmission path 52 of the first embodiment, each of the optical transmission paths 52-1 to 52-n includes two optical fibers, and the two optical fibers provided in each of them are indicated by the signs "T" and "R". For example, in the case of the optical transmission path 52-1, the optical fiber thereof are indicated by optical fibers 52T-1 and 52R-1. Each of the connection lines 3-1 to 3-n is a communication line similar to the connection line 3.

The connection node device 1a includes an edge functional unit 11a and an output port switching unit 14. The output port switching unit 14 is connected to the optical transmission path 51, the connection information processor 13 of the connection node device 1a, and the optical transmission paths 52-1 to 52-n, and selects any one of the connection information processor 13 and the optical transmission paths 52-1 to 52-n as the destination of the optical transmission path 51 to switch the destination.

The edge functional unit 11a includes a connection information processor 13 and a controller 12a. The controller 12a stores an address path correspondence table in advance in an internal storage area, in which the pieces of address information of the optical transceivers 21X and 21Y-1 to 21Y-n included in the optical communicators 2X. 2Y-1 to 2Y-n connected to the connection node device 1a are associated with the pieces of the identification information for identifying the optical transmission paths 51 and 52-1 to 52-n to which the optical transceivers 21X and 21Y-1 to 21Y-n corresponding to the respective pieces of address information. The controller 12a may not store the address path correspondence table in advance in the internal storage area, but may acquire the address path correspondence table from an external device on demand.

The controller 12a transmits the connection information output by the connection information generator 38 of the connection information processor 13 and the connection request data to the operation device 4 through the connection line 3. The controller 12a outputs the transmission mode information received from the operation device 4 to the digital signal processor 32. The controller 12a outputs a switching instruction signal for switching the destination to the output port switching unit 14.

The operation device 4 includes a path detector 41 and a transmission path designer 42. The path detector 41 stores a path information table in advance in the internal storage area, in which the address information of the optical transceivers 21X and 21Y-1 to 21Y-n of the optical communicators 2X, 2Y-1 to 2Y-n and the identification information for identifying the optical transmission path corresponding to the address information are associated with each other. The path detector 41 may acquire the path information table from an external device on demand instead of storing the path information table in the internal storage area in advance.

For example, in the case of the optical transmission system 101, the pieces of address information of the optical transceivers 21X and 21Y-1 to 21Y-n included in the optical communicators 2X and 2Y-1 to 2Y-n and the pieces of the identification information for identifying the optical transmission paths 51 and 52-1 to 52-n to which the optical transceivers 21X and 21Y-1 to 21Y-n corresponding to the respective pieces of address information are connected are associated with each other in the path information table. The path detector 41 refers to the path information table and detects identification information for identifying any one optical transmission path 52-i among the optical transmission paths 52-1 to 52-n corresponding to the destination address information included in the connection request data transmitted by the controller 12a of the connection node device 1a (here, i is an arbitrary integer of 1 to n).

The transmission path designer 42 stores transmission path information of each of the optical transmission paths 52-1 to 52-n in an internal storage area in association with the identification information for identifying each of the optical transmission paths 52-1 to 52-n. The transmission path designer 42 may calculate the transmission path information of the optical transmission paths 52-1 to 52-n in advance by predetermined calculation based on the optical signals transmitted by the optical transmission paths 52-1 to 52-n and store it in an internal storage area, or may acquire the information from an external device on demand at a specific timing such as when a network is constructed. The transmission path information of the optical transmission paths 52-1 to 52-n may be obtained in advance by a method other than the predetermined calculation.

The transmission path designer 42 stores information indicating free resources of each of the optical transmission paths 52-1 to 52-$n$ in an internal storage area. Here, the information indicating the free resources includes, for example, information indicating a wavelength, a wavelength band, or an optical transmission path which is not used for communication when determining the free state of resources. It is assumed that the information indicating the free resources is updated by the transmission path designer 42 whenever the communication path is established.

The transmission path designer 42 calculates the transmission path characteristics, for example, by a transmission design tool such as GNPy provided therein, based on the connection information transmitted by the controller 12$a$ of the connection node device 1$a$ and the transmission path information of the optical transmission path 52-$i$ corresponding to the identification information for identifying the optical transmission path 52-$i$ detected by the path detector 41.

The transmission path designer 42 selects configuration information by predetermined selection processing based on the calculated transmission path characteristics, the information indicating free resources corresponding to the identification information for identifying the optical transmission path 52-$i$ detected by the path detector 41, and the desired bit rate information and the specification information of the optical transceiver 21X, included in the connection request data transmitted by the controller 12$a$ of the connection node device 1$a$. The transmission mode is identified by the configuration information selected by the transmission path designer 42. The transmission path designer 42 generates transmission mode information including the selected configuration information and the source address information included in the connection request data. The transmission path designer 42 transmits the generated transmission mode information and the identification information for identifying the optical transmission path 52-$i$ detected by the path detector 41 to the controller 12$a$ of the connection node device 1$a$ through the connection line 3.

The transmission path designer 42 stores a connection line table in advance in the internal storage area, in which the pieces of address information of the optical transceivers 21Y-1 to 21Y-n provided in the optical communicators 2Y-1 to 2Y-n and the connection lines 3-1 to 3-$n$ to which the optical communicators 2Y-1 to 2Y-n corresponding to the pieces of address information are connected are associated with each other. The transmission path designer 42 refers to the connection line table stored in the internal storage area and transmits the generated transmission mode information to the controllers 20Y-1 to 20Y-n of the optical communicators 2Y-1 to 2Y-n through the connection lines 3-1 to 3-$a$ connected to the optical communicators 2Y-1 to 2Y-n provided with the optical transceivers 21Y-1 to 21Y-n corresponding to the destination address information included in the connection request data.

Processing in Optical Communication System of Second Embodiment

Figure 6:
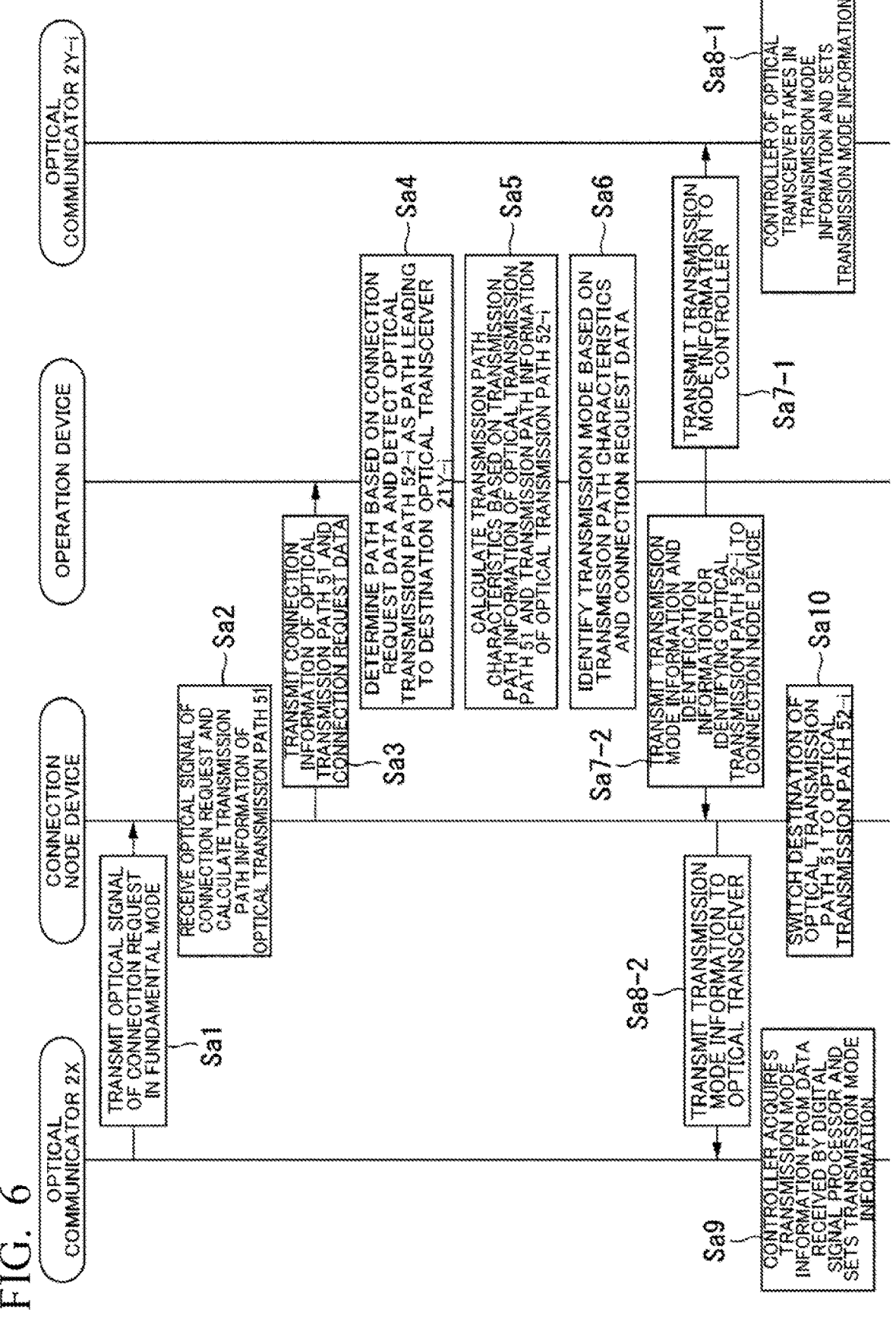
FIG. 6 is a diagram illustrating the processing flow of the optical transmission system in the second embodiment.

FIG. 6 is a flowchart illustrating the processing flow in the optical communication system 101 according to the second embodiment. In the following, as an example, processing in which the optical transceiver 21X included in the optical communicator 2X is connected to the optical transceiver 21Y-i of the optical communicator 2Y-i as a destination will be described. The processing of steps Sa1 and Sa2 in FIG. 6 is the same as the processing of steps S1 and S2 of the first embodiment in FIG. 1. However, in step Sa1, it is assumed that the controller 20X of the optical communicator 2X generates a connection request instruction signal including the address information of the optical transceiver 21Y-i included in the optical communicator 2Y-i as the address information of a destination, and the optical communicator 2Y-i is connected to the optical transmission path 52-$i$ and the connection line 3-$i$.

The controller 12$a$ takes in the connection request data output by the connection information generator 38 and the connection information. The controller 12$a$ transmits the taken-in connection request data and the connection information to the operation device 4 through the connection line 3 (step Sa3).

The path detector 41 of the operation device 4 receives the connection request data transmitted by the controller 12$a$. The path detector 41 refers to the path information table stored in the internal storage area or the path information table acquired on demand, and detects the destination address information included in the received connection request data, in this case, the identification information for identifying the optical transmission path 52-$i$ corresponding to the address information of the optical transceiver 21Y-i. The path detector 41 outputs the identification information for identifying the optical transmission path 52-$i$ to the transmission path designer 42 (step Sa4).

The transmission path designer 42 receives the connection information transmitted by the controller 12$a$ and the connection request data. The transmission path designer 42 takes in the identification information for identifying the optical transmission path 52-$i$ output by the path detector 41. The transmission path designer 42 reads and acquires the transmission path information of the optical transmission path 52-$i$ corresponding to the taken-in identification information for identifying the optical transmission path 52-$i$ from the internal storage area, or acquires the transmission path information of the optical transmission path 52-$i$ on demand. The transmission path designer 42 calculates the transmission path characteristics based on the acquired the transmission path information of the optical transmission path 52-$i$ and the received connection information (step Sa5).

The transmission path designer 42 selects the configuration information by predetermined selection processing based on the calculated transmission path characteristics, the desired bit rate information included in the received connection request data and the specification information of the optical transceiver 21X. The transmission mode is identified by the configuration information selected by the transmission path designer 42. The transmission path designer 42 generates transmission mode information including the selected configuration information and the source address information included in the connection request data (step Sa6).

The transmission path designer 42 refers to the connection line table stored in the internal storage area, and transmits the generated transmission mode information to the controller 20Y-i of the optical communicator 2Y-j through the connection line 3-$i$ connected to the optical communicator 2Y-i provided with the optical transceiver 21Y-i corresponding to the destination address information included in the connection request data (step Sa7-1). The controller 20Y-i of the optical communicator 2Y-i receives the transmission mode information transmitted by the transmission path designer 42 of the operation device 4, and outputs the received transmission mode information to the controller 71Y-i of the optical transceiver 21X-i. Thereafter, the same processing as step S6-1 of the first embodiment is performed by the functional unit of the optical communicator 2Y-i corresponding to each of the functional units provided in the optical communicator 2Y of the first embodiment (step Sa8-1).

The transmission path designer 42 transmits the generated transmission mode information and the identification information for identifying the optical transmission path 52-i detected by the path detector 41 to the connection node device 1a through the connection line 3 (step Sa7-2). The controller 12a of the connection node device 1a receives the transmission mode information transmitted by the transmission path designer 42 of the operation device 4 and the identification information for identifying the optical transmission path 52-i. After the controller 12a receives the transmission mode information and the identification information for identifying the optical transmission path 52-i, the same processing as step S5-2 of the first embodiment is performed by the controller 12a, the connection information processor 13 and the output port switching unit 14 based on the received transmission mode information (step Sa8-2). Thereafter, the same processing as step S6-2 of the first embodiment is performed (step Sa9).

The controller 12a of the connection node device 1a detects the identification information for identifying the optical transmission path 51 from the address path correspondence table stored in the internal storage area or the address path correspondence table acquired on demand based on the source address information included in the received transmission mode information, in this case, the address information added to the optical transceiver 21X. The controller 12a performs switching processing of connecting the optical transmission path 51 and the optical transmission path 52-i based on the detected identification information for identifying the optical transmission path 51 and the received the identification information for identifying the optical transmission path 52-i. The controller 12a outputs a switching instruction signal for setting the destination of the optical fiber 51T as the optical fiber 52T-i to the optical switch 15T of the output port switching unit 14. The controller 12a outputs a switching instruction signal for setting the destination of the optical fiber 51R as the optical fiber 52R-i to the optical switch 15R.

Upon receiving the switching instruction signal from the controller 12a, the optical switch 15T connects the optical fiber 51T and the optical fiber 52T-i. Upon receiving the switching instruction signal from the controller 12a, the optical switch 15R connects the optical fiber 51R and the optical fiber 52R-i (step Sa10). Thus, the optical fiber 51T and the optical fiber 52T-i are connected through the optical switch 15T, and the optical fiber 51R and the optical fiber 52R-i are connected through the optical switch 15R. The optical communicator 2X and the optical communicator 2Y-i are connected through the optical transmission path 51 and the optical transmission path 52-i.

The processing of steps Sa7-1 and Sa7-2 may be performed in parallel and may be performed in the order of steps Sa7-1 and Sa7-2 or in the reverse order.

In the configuration of the second embodiment, the optical communicator 2X which is a first optical communicator is connected to the connection node device 1a through the optical transmission path 51 which is a first optical transmission path. The optical communicators 2Y-1 to 2Y-n which are second optical communicators are connected to the connection node device 1a through the optical transmission paths 52-1 to 52-n which are second optical transmission paths. The operation device 4 is connected to the connection node device 1a and the optical communicators 2Y-1 to 2Y-n. The operation device 4 reads and acquires the transmission path information of the optical transmission path 52-i stored in advance in the internal storage area from the internal storage area, or acquires the transmission path information of the optical transmission path 52-i on demand, identifies the transmission mode based on the acquired transmission path information of the optical transmission path 52-i, the connection information of the optical transmission path 51 acquired by the connection information processor 13 of the connection node device 1a, from the optical signal transmitted by the optical transceiver 21X included in the optical communicator 2X, and the connection request data included in the optical signal transmitted by the optical transceiver 21X included in the optical communicator 2X, and transmits the transmission mode information indicating the identified transmission mode to the x 12a of the connection node device 1a and the optical transceiver 21Y-i included in the optical communicator 2Y-i. The optical transceiver 21X provided in the optical communicator 2X receives the transmission mode information that the controller 12a of the connection node device 1a receives from the operation device 4 and transmits to the optical transmission path 51 and transmits and receives an optical signal through the optical transmission path 51 according to the transmission mode indicated by the received transmission mode information. The optical transceiver 21Y-i provided in the optical communicator 2Y-i transmits and receives an optical signal through the optical transmission path 52-i according to the transmission mode indicated by the transmission mode information received from the operation device 4. After the controller 12a transmits the transmission mode information to the optical communicator 2X through the optical transmission path 51, the output port switching unit 14 of the connection node device 1a performs switching processing to connect the optical transceiver 21X included in the optical communicator 2X and the optical transceiver 21Y-i included in the optical communicator 2Y-i through the optical transmission path 51 and the optical transmission path 52. Thus, when the optical transceivers 21X and 21Y-i provided in the optical communicators 2X and 2Y-i are connected through the plurality of optical transmission paths 51 and 52-i, the optical transceivers 21X and 21Y-i can be connected through the optical path of the optimum transmission mode without manual intervention. Therefore, the cost and time required for setting the optical path can be reduced.

Figure 7:
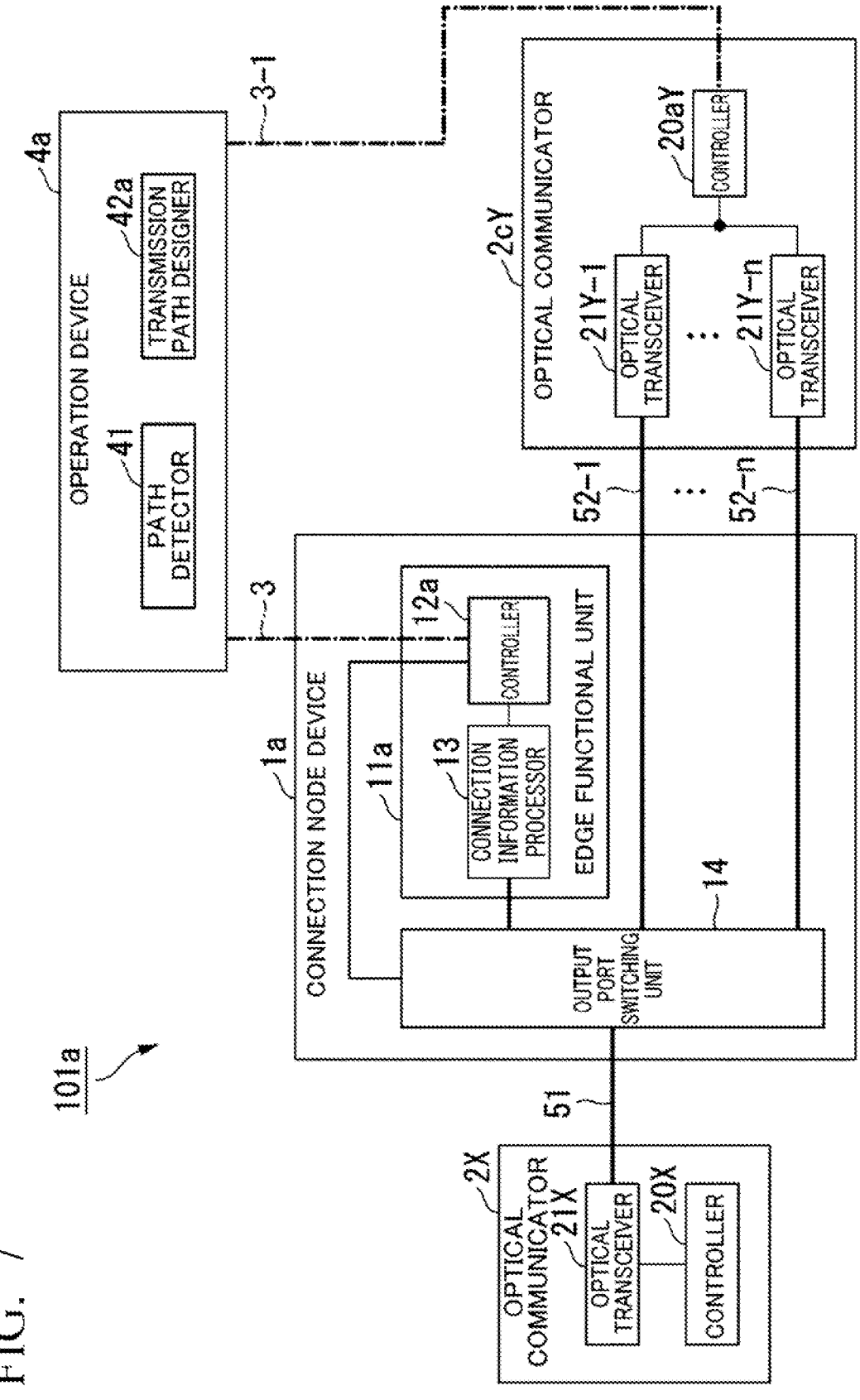
FIG. 7 is a diagram illustrating another configuration example (part 1) of the optical transmission system in the second embodiment.

The optical transmission system 101 of the second embodiment may include one optical communicator 2eY having a plurality of optical transceivers 21Y-1 to 21Y-n and one controller 20a Y as in the optical transmission system 10ta illustrated in FIG. 7, instead of including the optical communicators 2Y-1 to 2Y-n, and a plurality of optical transmission paths 52-1 to 52-n may be connected to the optical transceivers 21Y-1 to 21Y-n. In the optical transmission system 101 illustrated in FIG. 5, the transmission path designer 42 refers to the connection line table stored in the internal storage area and transmits the transmission mode information to the controllers 20Y-1 to 20Y-n of the optical communicators 2Y-1 to 2Y-n through the connection lines 3-1 to 3-n corresponding to the destination address information included in the transmission mode information. On the other hand, in the optical transmission system 101a illustrated in FIG. 7, the transmission path designer 42a provided in the operation device 4a adds the destination address information included in the connection request data to the generated transmission mode information, and transmits it to the controller 20aY of the optical communicator 2eY through the connection line 3-1. Therefore, the transmission path designer 42a does not need to store the connection line table in advance in an internal storage area.

The controller 20a Y has the same configuration as the configuration provided in each of the controllers 20Y-1 to 20Y-n except for the configuration described later. Upon receiving the transmission mode information transmitted by the transmission path designer 42a, the controllers 20Y-1 to 20Y-n output the received transmission mode information to the optical transceivers 21Y-1 to 21Y-n to which the controllers 20Y-1 to 20Y-n are connected. On the other band, upon receiving the transmission mode information transmitted by the transmission path designer 42a through the connection line 3-1, the controller 20aY outputs the transmission mode information to any one of the optical transceivers 21Y-1 to 21Y-n corresponding to the destination address information added to the received transmission mode information.

Due to the above-described configuration, in the optical transmission system 101a, similarly to the optical transmission system 101, since the address information of the optical transceiver 21Y-i requesting connection is used as the destination address information in the connection request data, the optical transceiver 21X can be connected to the optical transceiver 21Y-i corresponding to the destination address information through the optical transmission paths 51 and 52-i, and optical signals can be transmitted and received between the optical transceiver 21X and the optical transceiver 21Y-i according to the same transmission mode.

Third Embodiment

Figure 8:
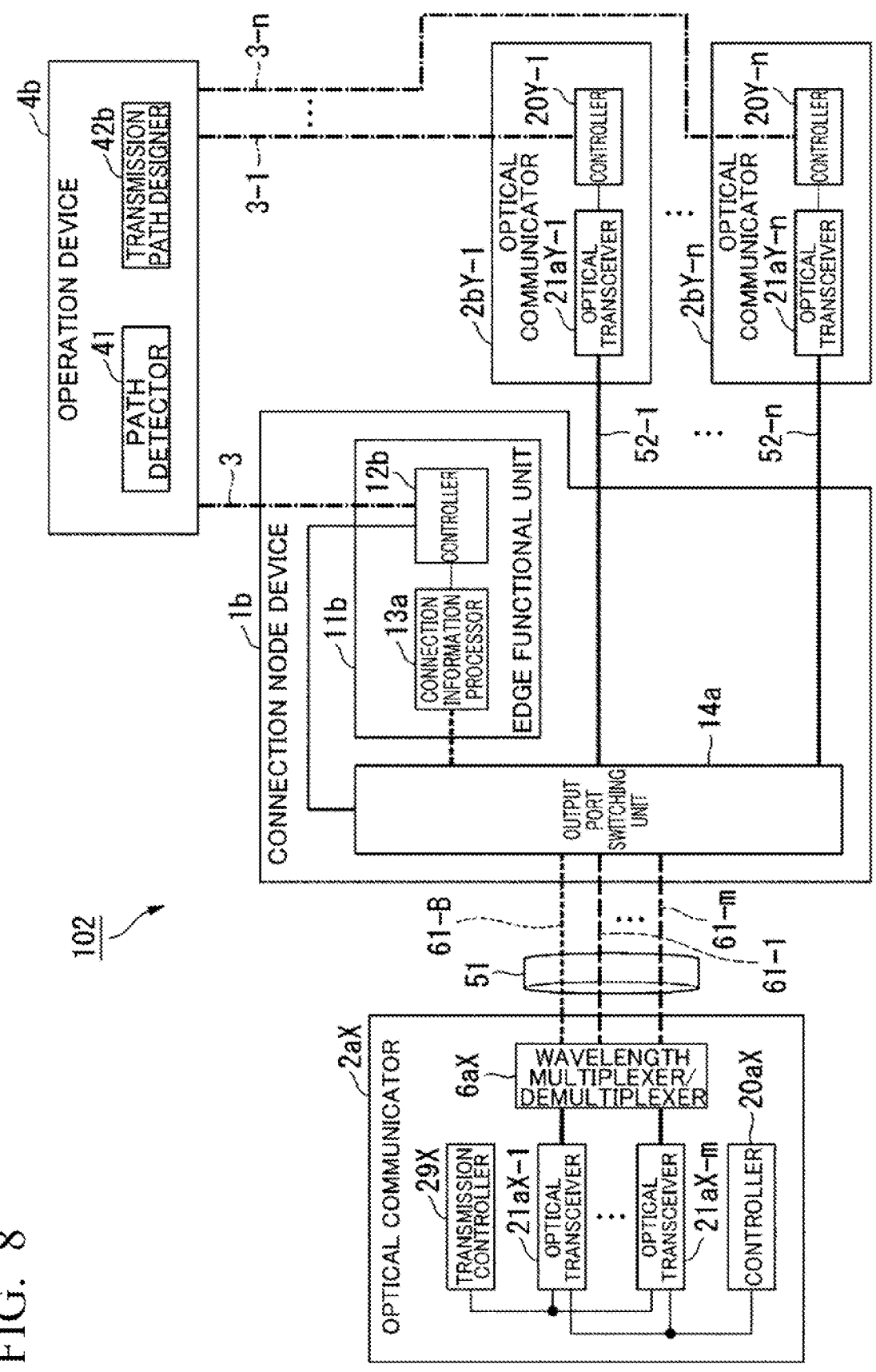
FIG. 8 is a block diagram illustrating the configuration of the optical transmission system according to a third embodiment.

FIG. 8 is a block diagram illustrating the configuration of the optical transmission system 102 according to a third embodiment. In the third embodiment, the same reference numerals are assigned to the same configurations as in the first and second embodiments, and the different configurations will be described below. The optical transmission system 102 includes a connection node device 1b, an optical communicator 2aX, a plurality of optical communicators 2b Y-1 to 2bY-n, an operation device 4b, an optical transmission path 51, optical transmission paths 52-1 to 52-n, a connection line 3 and the connection lines 3-1 to 3-n. The optical communicator 2aX is, for example, a communicator used by a user, and the optical communicators 2b Y-1 to 2b Y-n each are, for example, an optical transmission device owned by a telecommunication carrier, that is, a node device in a communication network, or a white box transponder owned by a telecommunications carrier or a data center operator. The optical transmission path 51 connects the optical communicator 2aX and the connection node device 1b. The optical transmission paths 52-1 to 52-n connect the optical communicators 2b Y-1 to 2b Y-n to the connection node device 1b. The connection line 3 connects the operation device 4b and the connection node device 1b. The connection lines 3-1 to 3-n connect the operation device 4b and the optical communicator 2bY-1 to 2b Y-n.

The internal configuration of the connection node device 1b, the optical communicator 2aX, the optical communicators 2bY-1 to 2bY-n, and the operation device 4b will be described with reference to FIG. 9 in addition to FIG. 8. In addition, among the connection lines illustrated in FIGS. 8 and 9, a thick dotted line indicates the wavelength path of the fundamental wavelength, and a thick broken line indicates the wavelength paths other than the fundamental wavelength. The arrows indicated by thick dotted lines indicate data signals of light transmitted through the wavelength path of the fundamental wavelength.

As illustrated in FIG. 8, the optical communicator 2aX includes a plurality of optical transceivers 21aX-1 to 21aX-m, a wavelength multiplexer/demultiplexer 6aX, a controller 20aX, and a transmission controller 29X. Here, m is an integer of 1 or more, and may have the same value as n or may have a different value from n.

The controller 20aX is connected to each of the optical transceivers 21aX-1 to 21aX-m, and controls the optical transceivers 21aX-1 to 21aX-m and inputs and outputs information to and from the optical transceivers 21aX-1 to 21aX-m. The controller 20aX generates a connection request instruction signal when starting connection to any one optical transceiver 21aY-i of the optical transceivers 21aY-1 to 20aY-n provided in the optical communicators 2bY-1 to 2bY-n.

Figure 9:
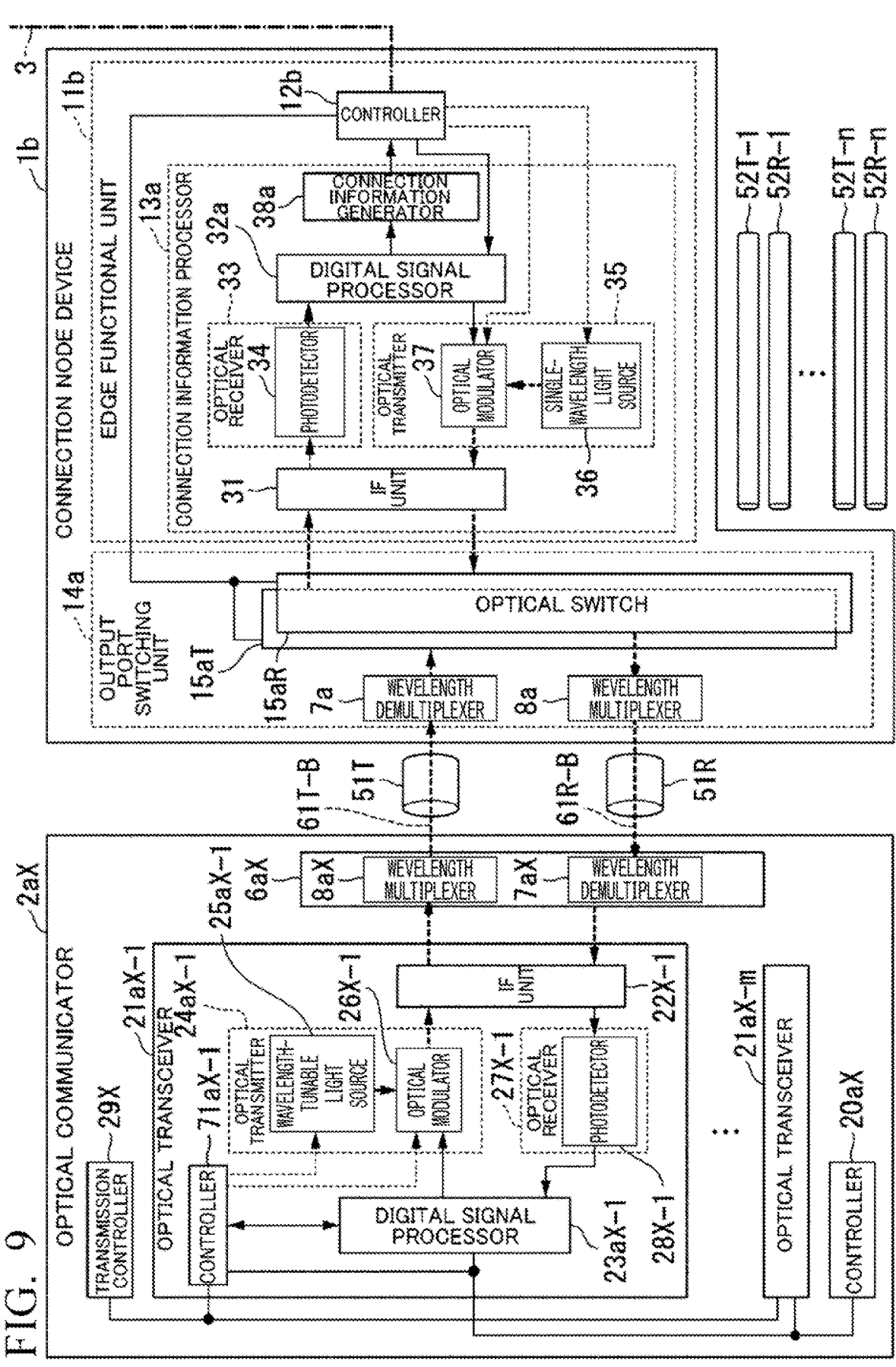
FIG. 9 is a diagram (part 1) illustrating an internal configuration of the connection node device and the optical communicator, and the connection relationship of the optical transmission paths in each of the connection node device and the optical communicator in the third embodiment.

As illustrated in FIG. 9, the optical transceiver 21aX-1 includes an IF unit 22X-1, an optical transmitter 24aX-1, an optical receiver 27X-1, a digital signal processor 23aX-1, and a controller 71aX-1. The IF unit 22X-1 connects the optical transmitter 24aX-1 and the optical fiber 51T through a wavelength multiplexer 8aX provided in the wavelength multiplexer/demultiplexer 6aX. The IF unit 22X-1 connects the optical receiver 27X-1 and the optical fiber 51R through a wavelength demultiplexer 7aX provided in the wavelength multiplexer/demultiplexer 6aX.

The controller 71aX-1 receives a connection request instruction signal from the controller 20aX and generates connection request data of an electric signal requesting connection when starting connection to any of optical transceivers 21aY-1 to 21aY-n provided in the optical communicators 2b Y-1 to 2bY-n. The specification information of the optical transceiver 21aX-1 included in the connection request data in the third embodiment includes, for example, information that a wavelength-tunable light source 25aX-1 provided in the optical transmitter 24aX-1 is of a type that changes and outputs the wavelength and information indicating the range of the wavelength that the wavelength-tunable light source 25aX-1 can generate, that is, the wavelength band of the wavelength-tunable light source 25aX-1, in addition to a modulation method, an FEC type, and a baud rate available in the optical transmitter 24aX-1.

The optical transceivers 21aX-1 to 21aX-m provided in the optical communicator 2aX and the optical transceivers 21aY-1 to 21aY-n provided in the optical communicators 2bY-1 to 2bY-n are assigned in advance with address information that allows them to be identified. The controller 20aX stores a desired bit rate and address information of a destination in advance in an internal storage area. The controller 71aX-1 of the optical transceiver 21aX-1 stores address information added to the optical transceiver 21aX-1 provided therein in advance in an internal storage area. The controller 71aX-1 acquires the specification information of the optical transceiver 21aX-1 from the optical transmitter 24aX-1 and the digital signal processor 23aX-1 and stores it in an internal storage area, for example, at a timing when the optical transceiver 21aX-1 is provided in the optical communicator 2aX. Further, the controller 20aX may not store address information of the destination in advance in an internal storage area, but may take in and acquire address information of the destination designated by a user of the optical communicator 2aX, and may acquire the address information of the destination from the connection node device 1b. Further, the controller 20aX may not store the desired bit rate in the internal storage area in advance, but may receive the input operation of the user and take in and acquire the data of the bit rate designated by the user in advance.

The controller 20*a*X generates a connection request instruction signal including the address information of the optical transceiver 21*a*Y-i and a desired bit rate and outputs it to the controller 71*a*X-1 of the optical transceiver 21*a*X-1, for example, when requesting connection from the optical transceiver 21*a*X-1 to the optical transceiver 21*a*Y-i provided in the optical communicator 2*a*Y-i. The controller 71*a*X-1 reads the address information of the optical transceiver 21*a*Y-i included in the connection request instruction signal received from the controller 20*a*X to determine it as destination address information, and reads the address information of the optical transceiver 21*a*X-1 stored in the internal storage area to determine it as source address information. The controller 71*a*X-1 generates connection request data including the destination address information and the source address information, a desired bit rate included in the connection request instruction signal, and the specification information of the optical transceiver 21*a*X-1 stored in the internal storage area. The controller 71*a*X-1 outputs the generated connection request data to the digital signal processor 23*a*X-1.

The controller 71*a*X-1 collects, for example, optical input information illustrated in PTL 2, including information such as the wavelength multiplexing number, OutPut-Power, and TxOSNR of the optical transmitter 24*a*X-1 collected in advance from information related to the optical transceiver 21*a*X-1, for example, information such as the type of transceiver and the number of transceivers included in the optical transceiver 21*a*X-1. The controller 71*a*X-1 outputs the collected optical input information to the digital signal processor 23*a*X-1.

The optical transmitter 24*a*X-1 includes a wavelength-tunable light source 25*a*X-1 and an optical modulator 26X-1. The wavelength-tunable light source 25*a*X-1 generates continuous light with optical power designated by the output optical power designation signal output by the controller 71*a*X-1, and a wavelength designated by a control signal (hereinafter referred to as a "wavelength designation signal") of an electric signal designating the wavelength output by the controller 71*a*X-1. The wavelength-tunable light source 25*a*X-1 outputs the generated continuous light to the optical modulator 26X-1.

The digital signal processor 23*a*X-1 has the following configuration in addition to the configuration provided in the digital signal processor 23X of the first embodiment. The digital signal processor 23*a*X-1 generates a transmission data signal so that the optical input information output by the controller 71*a*X-1 is included in a communication channel of a transmission frame when transmitting the optical input information by the transmission data signal.

The optical modulator 26X-1 has the same configuration as the optical modulator 26X of the first embodiment. The optical receiver 27X-1 has the same configuration as the optical receiver 27X of the first embodiment. Each of the optical transceivers 21*a*X-2 to 21*a*X-m other than the optical transceiver 21*a*X-1 has the same configuration as the optical transceiver 21*a*X-1. Hereinafter, when the functional units provided in each of the optical transceivers 21*a*X-2 to 21*a*X-m are indicated, the branch number "-1" of the reference numeral of each functional unit provided in the optical transceiver 21*a*X-1 is replaced with the branch numbers "-2" to "−m" of the respective functional units. For example, in the case of the optical transceiver 21*a*X-2, the corresponding digital signal processor is indicated by 23*a*X-2.

The transmission controller 29X is connected to each of the optical transceivers 21*a*X-1 to 21*a*X-m, and outputs a timing signal indicating the timing for transmitting the connection request data to the optical transceivers 21*a*X-1 to 21*a*X-m. The optical transceivers 21*a*X-1 to 21*a*X-m transmit connection request data through a wavelength path 61-B of the fundamental wavelength. Therefore, unless the optical transceivers 21*a*X-1 to 21*a*X-m transmit the connection request data at different timings, there is a possibility that the respective pieces of connection request data may collide with each other. In order to avoid the occurrence of the collision, the transmission controller 29X outputs a timing signal to the optical transceivers 21*a*X-1 to 21*a*X-m, so that the timings at which the optical transceivers 21*a*X-1 to 21*a*X-m transmit the connection request data are different. The techniques disclosed in PTLs 1 and 2, for example, are applied to the procedure in which the connection node device 1*b* connects to the plurality of optical transceivers 21*a*X-1 to 21*a*X-m using the fundamental wavelength.

The optical communicator 2*b*Y-1 includes an optical transceiver 21*a*Y-1 and a controller 20Y-1. The optical transceiver 21*a*Y-1 has the same configuration as the optical transceiver 21*a*X-1. Hereinafter, when the functional units provided in the optical transceiver 21*a*Y-1 are indicated, the branch number "X-1" of the reference sign of each functional unit provided in the optical transceiver 21*a*X-1 is replaced with "Y-|". When the optical communicators 2*b*Y-2 to 2*b*Y-n other than the optical communicator 2*b*Y-1 have the same configuration as the optical communicator 2*b* Y-1, and the functional units of the optical communicators 2Y-2 to 2Y-n are indicated, "−1" included in the reference numeral attached to each of the functional units of the optical communicator 2*h* Y-1 is replaced with "−2" to "−n"

The connection node device 1*b* includes an edge functional unit 11*b* and an output port switching unit 14*a*. The output port switching unit 14*a* includes optical switches 15*a*T and 15*a*R such as WSS (Wavelength Selective Switch) and a fiber patch panel, a wavelength demultiplexer 7*a*, and a wavelength multiplexer 8*a*. The wavelength demultiplexer 7*a* connects the optical fiber SIT and the optical switch 15*a*T, demultiplexes the optical signals wavelength-multiplexed in the optical fiber SIT for each wavelength, and outputs each of the demultiplexed optical signals to the optical switch 15*a*T. The wavelength multiplexer 8*a* connects the optical fiber 51R and the optical switch 15*a*R, multiplexes optical signals of different wavelengths output from the optical switch 15*a*R to perform wavelength multiplexing, and transmits the wavelength-multiplexed optical signal to the optical fiber SIR.

The connection node device 1*b* may include a wavelength demultiplexer 7*a* and a wavelength multiplexer 8*a* outside the output port switching unit 14*a*, and the wavelength demultiplexer 7*a* may be connected to the optical fiber 51T and the optical switch 15*a*T, and the wavelength multiplexer &a may be connected to the optical fiber 51R and the optical switch 15*a*R. Farther, a single wavelength multiplexing/demultiplexing device 6 provided with the wavelength demultiplexer 7*a* and the wavelength multiplexer 8*a* may be provided outside the connection node device 1*b*, the wavelength demultiplexer 7*a* provided in a wavelength multiplexing/demultiplexing device 6 is connected to the optical fiber 51T and the optical switch 15*a*T, and the wavelength multiplexer 8*a* provided in the wavelength multiplexing/ demultiplexing device 6 may be connected to the optical fiber 51R and the optical switch 15aR.

The optical switch 15aT is connected to the optical fiber 51T, the edge functional unit 11b, and the optical fibers 52T-1 to 52T-n provided in the optical transmission paths 52-1 to 52-n. The optical switch 15aT connects the wavelength path 61T-B of the fundamental wavelength among the wavelength paths of the respective wavelengths demultiplexed by the wavelength demultiplexer 7a to the optical receiver 33 of the edge functional unit 11b through the IF unit 31. The optical switch 15aT receives the switching instruction signal and performs switching processing of connecting any one of the wavelength paths other than the wavelength path 61T-B of the fundamental wavelength included in the optical fiber 51T to any one of the wavelength paths included in the optical fibers 52T-1 to 52T-n.

The optical switch 15aR is connected to the wavelength multiplexer 8a, the edge functional unit 11b, and the optical fibers 52R-1 to 52R-n provided in the optical transmission paths 52-1 to 52-n. The optical switch 15aR connects the wavelength path 61R-B of the fundamental wavelength among the wavelength paths included in the optical fiber 51R connected through the wavelength multiplexer 8a to the optical transmitter 35 of the edge functional unit 11b through the IF unit 31. The optical switch 15aR receives the switching instruction signal and performs switching processing of connecting any one of the wavelength paths other than the wavelength path 61R-B of the fundamental wavelength included in the optical fiber 51R to any one of the wavelength paths included in the optical fibers 52R-1 to 52R-n.

The edge functional unit 11b includes a controller 12b and a connection information processor 13a. The connection information processor 13a includes an IF unit 31, a digital signal processor 32a, an optical receiver 33, an optical transmitter 35, and a connection information generator 38a. The digital signal processor 32a has the following configuration in addition to the configuration provided in the digital signal processor 32 of the first and second embodiments. When the optical input information is included in the reception data signal output from the photodetector 34, the digital signal processor 32a reads and acquires the optical input information from the reception data signal. The digital signal processor 32a outputs the acquired optical input information to the connection information generator 38a.

The connection information generator 38a calculates the transmission path information of the optical transmission path 51 based on the reception data signal output from the digital signal processor 32a of the connection information processor 13a. The connection information generator 38a generates connection information including the calculated transmission path information of the optical transmission path 51, the BER of the optical transmission path 51 output by the digital signal processor 32a, and the optical input information. The connection information generator 38a outputs the generated connection information and the connection request data output by the digital signal processor 32a to the controller 12b.

The controller 12b stores an address path correspondence table in advance in the internal storage area, in which the respective pieces of address information of the optical transceivers 21aX-1 to 21aX-m and 21aY-1 to 21aY-n provided in the optical communicators 2aX and 2bY-1 to 2bY-n connected to the connection node device 1b are associated with the pieces of identification information for identifying the optical transmission paths 51 and 52-1 to 52-n to which the optical transceivers 21aX-1 to 21aX-m and 21aY-1 to 21aY-n corresponding to the respective pieces of address information are connected. The controller 12b may not store the address path correspondence table acquired in advance in the internal storage area, but may acquire the address path correspondence table from an external device on demand.

The controller 12b transmits the connection request data output by the connection information generator 38a and the connection information to the operation device 4b through the connection line 3. The controller 12b outputs the transmission mode information received from the operation device 4b to the digital signal processor 32a. The controller 12b outputs a switching instruction signal to the output port switching unit 14a.

The operation device 4b includes a path detector 41 and a transmission path designer 42b. The transmission path designer 42b has the same configuration as the transmission path designer 42 of the second embodiment, except for the configuration described below. Similarly to the transmission path designer 42 of the second embodiment, the transmission path designer 42b selects configuration information by predetermined selection processing based on the calculated transmission path characteristics, information indicating free resources of the optical transmission paths 52-1 to 52-n corresponding to the destination address information included in the connection request data, and the desired bit rate information and the specification information of the optical transceivers 21aX-1 to 21aX-m included in the connection request data acquired by the digital signal processor 32a. However, the configuration information selected by the transmission path designer 42b may further include information related to the central wavelength and information related to the number of WDM wavelengths in addition to the information such as the output optical power, modulation method, baud rate, bit rate, FEC (Forward Error Correction) type, and signal band permitted to use selected by the transmission path designer 42 of the second embodiment.

The wavelength multiplexer/demultiplexer 6aX includes a wavelength multiplexer 8aX and a wavelength demultiplexer 7aX. The wavelength multiplexer 8aX multiplexes optical signals of different wavelengths output by the IF units 22X-1 to 22X-m provided in the optical transceivers 21aX-1 to 21aX-m to perform wavelength multiplexing, and transmits the wavelength-multiplexed optical signal to the optical fiber SIT. The wavelength demultiplexer 7aX demultiplexes the wavelength-multiplexed optical signal transmitted by the optical fiber 51R for each wavelength. The wavelength demultiplexer 7aX outputs each of the demultiplexed optical signals to the IF units 22X-1 to 22X-m corresponding to each wavelength. However, when there are a plurality of optical transceivers 21aX-1 to 21aX-m which are connected in the fundamental mode, the wavelength demultiplexer 7aX outputs an optical signal to all of the optical transceivers 21aX-1 to 21aX-m which are connected in the fundamental mode.

Processing in Optical Communication System
According to Third Embodiment

Figure 10:
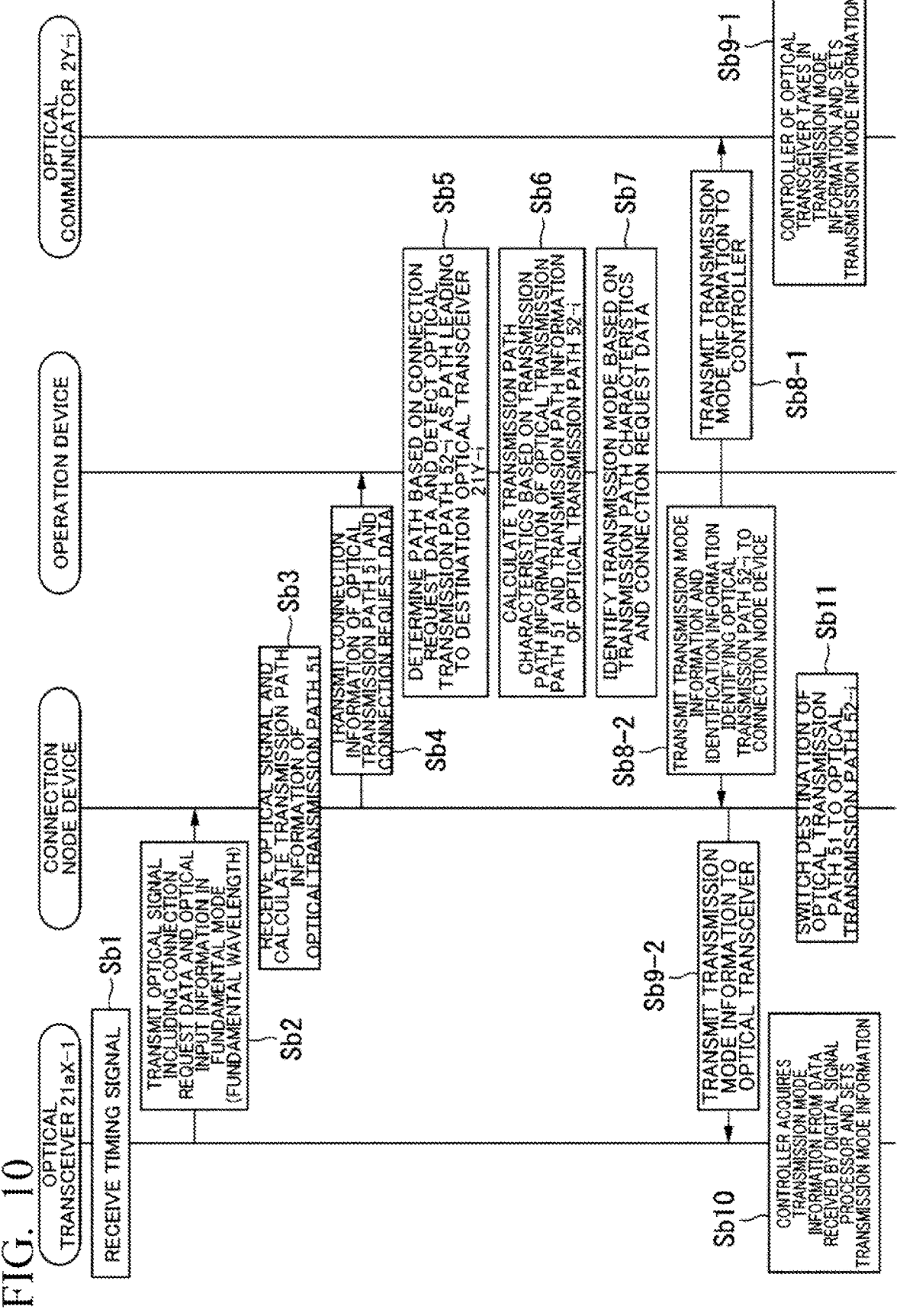
FIG. 10 is a diagram illustrating the processing flow of the optical transmission system according to the third embodiment.

FIG. 10 is a flowchart illustrating the processing flow in the optical transmission system 102. As illustrated in FIG. 9, the optical switch 15aT of the output port switching unit 14a of the connection node device 1b connects the wavelength path 61T-B of the fundamental wavelength of the optical fiber 51T to the optical receiver 33 through the IF unit 31 of the connection node device 1b. The optical switch 15aR connects the wavelength path 61R-B of the fundamental wavelength of the optical fiber 51R to the optical modulator 37 through the IF unit 31 of the connection node device 1*b*.

In the following, as an example, processing of connecting the optical transceiver 21*a*X-1 included in the optical communicator 2*a*X as a source and the optical transceiver 21*a*Y-i of the optical communicator 2*b* Y-i as a destination will be described. The controller 20*a*X of the optical transceiver 21*a*X-1 generates a connection request instruction signal including the address information of the optical transceiver 21*a*Y-i and a desired hit rate in order to connect to the optical transceiver 21*a*Y-i provided in the optical communicator 2*b*Y-i. The controller 20*a*X outputs the generated connection request instruction signal to the controller 71*a*X-1 of the optical transceiver 21*a*X-1. When the controller 71*a*X-1 receives a timing signal output by the transmission controller 29X after taking in the connection request signal output by the controller 20*a*X, the controller 71*a*X-1 starts processing at the timing indicated by the received timing signal (step Sb1).

The controller 71*a*X-1 uses the address information of the optical transceiver 21*a*Y-i included in the taken-in connection request signal as a destination address. The controller 71*a*X-1 uses the address information of the optical transceiver 21*a*X-1 stored in the internal storage area as source address information. The controller 71*a*X-1 generates connection request data including the destination address information and the source address information, a desired bit rate included in the connection request instruction signal, and the specification information of the optical transceiver 21*a*X-1 stored in the internal storage area.

The controller 71*a*X-1 outputs an output optical power designation signal indicating the fundamental output optical power determined in advantage in the fundamental mode to the wavelength-tunable light source 25*a*X-1. The controller 71*a*X-1 outputs a wavelength designation signal of the fundamental wavelength determined in advance in the fundamental mode to the wavelength-tunable light source 25*a*X-1. The controller 71*a*X-1 outputs a predetermined modulation method designation signal of the fundamental mode to the optical modulator 26X-1. The optical modulator 26X-1 starts optical modulation according to a fundamental modulation method designated by the modulation method designation signal.

The wavelength-tunable light source 25*a*X-1 generates continuous fight with the fundamental output optical power designated by the output optical power designation signal and the fundamental wavelength designated by the wavelength designation signal. The wavelength-tunable light source 25*a*X-1 outputs the generated continuous light to the optical modulator 26X-1. The controller 71*a*X-1 outputs the generated connection request data and the collected optical input information to the digital signal processor 23*a*X-1. The digital signal processor 23*a*X-1 takes in the connection request data output by the controller 71*a*X-1 and the optical input information, and generates a transmission data signal so that the taken-in connection request data is included in the free area of the overhead of the transmission frame and the optical input information is included in the communication channel of the transmission frame. The digital signal processor 23*a*X-1 outputs the generated transmission data signal of the electric signal to the optical modulator 26X-1.

The optical modulator 26X-1 optically modulates the continuous light output from the wavelength-tunable light source 25*a*X-1 based on the transmission data signal output from the digital signal processor 23*a*X-1. The optical modulator 26X-1 outputs the optical signal of the fundamental wavelength generated by the optical modulation to the wavelength multiplexer 8*a*X of the wavelength multiplexing/demultiplexer 6*a*X through the IF unit 22X-1. The wavelength multiplexer 8*a*X multiplexes the optical signal of the fundamental wavelength output by the IF unit 22X-1 with the optical signal of the other wavelength to perform wavelength multiplexing, and transmits the wavelength-multiplexed optical signal to the optical fiber 51T. The wavelength path 61T-B of the fundamental wavelength of the optical fiber 51T transmits the optical signal of the fundamental wavelength to the wavelength demultiplexer 7*a* of the connection node device 1*b* (step Sb2).

The wavelength demultiplexer 7*a* demultiplexes the optical signal transmitted by the optical fiber 51T for each wavelength, and outputs each of the demultiplexed optical signals to the optical switch 15*a*T. The optical switch 15*a*T receives the optical signal of the fundamental wavelength transmitted by the wavelength path 61T-B of the fundamental wavelength of the optical fiber SIT, and outputs the received optical signal to the photodetector 34 of the optical receiver 33 through the IF unit 31. The photodetector 34 takes in the optical signal output from the optical switch 15*a*T. The optical signal generator 34 converts the taken-in optical signal into an electric signal to obtain a reception data signal. The photodetector 34 outputs the reception data signal to the digital signal processor 32*a*.

The digital signal processor 32*a* takes in the reception data signal output by the photodetector 34. The digital signal processor 32*a* reads and acquires the connection request data included in the overhead area of the reception data signal. The digital signal processor 32*a* reads and acquires the optical input information included in the communication channel of the reception data signal. The digital signal processor 32*a* acquires the BER of the optical transmission path 51 from the taken-in reception data signal. The digital signal processor 32*a* outputs the acquired connection request data, the optical input information, and the BER of the optical transmission path 51 to the connection information generator 38*a*.

The connection information generator 38*a* takes in the connection request data, the optical input information, and the BER of the optical transmission path 51 output by the digital signal processor 32*a*. When the connection information generator 38*a* takes in the connection request data, the optical input information and the BER of the optical transmission path 51, the connection information generator 38*a* calculates and acquire the transmission path information of the optical transmission path 51 by predetermined calculation based on the reception data signal taken in and output by the digital signal processor 32*a*. The connection information generator 38*a* generates connection information including the calculated transmission path information of the optical transmission path 51, the taken-in optical input information, and the taken-in BER of the optical transmission path 51. The connection information generator 38*a* outputs the taken-in connection request data and the generated connection information to the controller 12*b* (step Sb3).

The controller 12*b* takes in the connection request data and connection information output by the connection information generator 38*a*. The controller 12*b* transmits the taken-in connection request data and the connection information to the operation device 4*b* through the connection line 3 (step Sb4).

The path detector 41 of the operation device 4*b* receives the connection request data transmitted by the controller 12*b*. The path detector 41 refers to the path information table stored in the internal storage area or the path information table acquired on demand, and detects the destination address information included in the received connection request data, in this case, the identification information for identifying the optical transmission path 52-*i* corresponding to the address information of the optical transceiver 21*a*Y-i. The path detector 41 outputs the detected identification information for identifying the optical transmission path 52-*i* to the transmission path designer 42*b* (step Sb5).

The transmission path designer 42*b* receives the connection information and the connection request data transmitted by the controller 12*b*. The transmission path designer 42*b* takes in the identification information for identifying the optical transmission path 52-*i* output by the path detector 41. The transmission path designer 42*b* reads and acquires the transmission path information of the optical transmission path 52-*i* corresponding to the identification information for identifying the optical transmission path 52-*i* from the internal storage area, or acquires the transmission path information of the optical transmission path 52-*i* on demand. The transmission path designer 42*b* calculates the transmission path characteristics based on the acquired the transmission path information of the optical transmission path 52-*i* and the received connection information (step Sb6).

The transmission path designer 42*b* selects the configuration information by predetermined selection processing based on the calculated transmission path characteristics, the desired bit rate information included in the received connection request data and the specification information of the optical transceiver 21*a*X-1. The transmission mode is identified by the configuration information selected by the transmission path designer 42*b*. The transmission path designer 42*b* generates transmission mode information including the selected configuration information and the source address information included in the connection request data (step Sb7).

The transmission path designer 42*b* refers to the connection line table stored in the internal storage area and transmits the generated transmission mode information to the controller 20Y-i of the optical communicator 2*b*Y-i through the connection line 3-*i* connected to the optical communicator 2*b*Y-i provided with the optical transceiver 21*a*Y-i corresponding to the destination address information included in the connection request data (step Sb8-1).

The controller 20Y-i of the optical communicator 2*b* Y-i receives the transmission mode information transmitted by the transmission path designer 42*b*, and outputs the received transmission mode information to the controller 71*a*Y-i of the optical transceiver 21*a*Y-i. The controller 71*a*Y-i takes in transmission mode information output by the controller 20Y-i. The controller 71*a*Y-i outputs the output optical power designation signal indicating the output optical power indicated by the taken-in transmission mode information to the wavelength-tunable light source 25*a*Y-i, and outputs the wavelength designation signal indicating the central wavelength designated by the taken-in transmission mode information to the wavelength-tunable light source 25*a*Y-i. Thus, the wavelength-tunable light source 25*a*Y-i generates and outputs continuous light with the output optical power designated by the output optical power designation signal and the wavelength designated by the wavelength designation signal, that is, continuous light with the output optical power and the central wavelength indicated by the transmission mode information. The wavelength-tunable light source 25*a*Y-i outputs the generated continuous light to the optical modulator 26Y-i.

The controller 71*a*Y-j outputs a modulation method designation signal indicating the modulation method designated by the taken-in transmission mode information to the optical modulator 26Y-i. Thus, the optical modulator 26Y-i performs optical modulation according to a modulation method designated by the modulation method designation signal received from the controller 71*a*Y-i, that is, a modulation method indicated in the transmission mode information. The controller 71*a* Y-i outputs the transmission mode information to the digital signal processor 23*a*Y-i. The digital signal processor 23*a*Y-i takes in the transmission mode information output by the controller 71*a*Y-i, and stores the modulation method, baud rate, bit rate, FEC type, signal band permitted to use, and the like indicated in the taken-in transmission mode information in the internal storage area as setting parameters, generates a transmission data signal based on the setting parameters stored in the internal storage area and outputs the signal to the optical modulator 26Y-i (step Sb9-1). The controller 71*a*Y-i may store the modulation method, baud rate, bit rate, FEC type, signal band permitted to use, and the like indicated in the transmission mode information in the internal storage area as the setting parameters. In this case, the controller 71*a*Y-i outputs the setting parameter to the digital signal processor 23*a*Y-i when the digital signal processor 23*a*Y-i generates the transmission data signal.

The transmission path designer 42*b* of the operation device 4*b* transmits the transmission mode information indicating the identified transmission mode and the identification information for identifying the optical transmission path 52-*i* detected by the path detector 41 to the connection node device 1*b* through the connection line 3 (step Sb8-2).

The controller 12*b* of the connection node device 1*b* receives the transmission mode information transmitted by the transmission path designer 42*b* and the identification information for identifying the optical transmission path 52-*i*. The controller 12 outputs an output optical power designation signal for designating the fundamental output optical power of the fundamental mode to the single-wavelength light source 36, and outputs a modulation method designation signal for designating a fundamental modulation method of the fundamental mode to the optical modulator 37. The controller 12*b* outputs the received transmission mode information to the digital signal processor 32*a*. The digital signal processor 32*a* takes in the transmission mode information output by the controller 12*b*. The digital signal processor 32*a* generates a transmission data signal so that the taken-in transmission mode information is included in the free area of the overhead of the transmission frame. The digital signal generator 32*a* outputs the generated optical signal to the optical modulator 37. The optical modulator 37 optically modulates the continuous light of the fundamental wavelength output by the single-wavelength light source 36 according to a modulation method of a predetermined fundamental mode based on the transmission data signal output by the digital signal processor 32*a*.

The optical modulator 37 outputs an optical signal generated by optical modulation to the IF unit 31. The IF unit 31 takes in the optical signal of the fundamental wavelength output from the optical modulator 37. The IF unit 31 outputs the taken-in optical signal to the optical switch 15*a*R. The optical switch 15*a*R outputs the optical signal of the fundamental wavelength output by the IF unit 31 to the wavelength multiplexer 8*a*. The wavelength multiplexer 8*a* multiplexes the optical signals of a plurality of wavelengths including the optical signal of the fundamental wavelength output by the optical switch 15*a*R to perform wavelength multiplexing, and transmits the wavelength-multiplexed optical signal to the optical fiber 51R. The wavelength path 61R-B of the fundamental wavelength of the optical fiber 51R transmits the optical signal transmitted by the optical switch 15aR to the wavelength demultiplexer 7aX of the optical communicator 2aX (step Sb9-2).

The wavelength demultiplexer 7aX demultiplexes the optical signal transmitted by the optical fiber 51R for each wavelength. The wavelength demultiplexer 7aX outputs each of the demultiplexed optical signals to the IF units 22X-1 to 22X-m corresponding to each wavelength. In the case of the optical signal of the fundamental wavelength, the wavelength demultiplexer 7aX outputs the optical signal of the fundamental wavelength to optical receivers 27X-1-27X-m provided in all the optical transceivers 21aX-1 to 21aX-m connected to the edge functional unit 11b of the connection node device 1b at the fundamental wavelength through the IP units 22X-1 to 22X-m. The IF unit 22X-1 of the optical transceiver 21aX-1 takes in an optical signal of the fundamental wavelength output by the wavelength demultiplexer 7aX. The IF unit 22X-1 outputs the taken-in optical signal of the fundamental wavelength to the photo-detector 28X-1. The photodetector 28X-1 receives the optical signal output from the IF unit 22X-1, and converts the received optical signal into an electric signal to obtain a reception data signal including the transmission mode information. The photodetector 28X-1 outputs the reception data signal including the transmission mode information to the digital signal processor 23aX-1. The digital signal processor 23aX-1 takes in a reception data signal including the transmission mode information output by the photodetector 28X-1.

The digital signal processor 23aX-1 reads transmission mode information from an overhead area of the reception data signal. The digital signal processor 23aX-1 outputs the read transmission mode information to the controller 71aX-1. The controller 71aX-1 takes in the transmission mode information output by the digital signal processor 23aX-1, and discards the read transmission mode information when the address information included in the taken-in transmission mode information is not the address information added to the optical transceiver 21aX-1 stored in the internal storage area. On the other hand, the controller 71aX-1 outputs the output optical power designation signal indicating the output optical power indicated by the taken-in transmission mode information to the wavelength-tunable light source 25aX-1 when the address information included in the taken-in transmission mode information matches the address information added to the optical transceiver 21aX-1. The digital signal processor 23aX-1 outputs a wavelength designation signal indicating the central wavelength designated by the read transmission mode information to the wavelength-tunable light source 25aX-1. Thus, the wavelength-tunable light source 25aX-1 generates and outputs continuous light with the output optical power designated by the output optical power designation signal and the wavelength designated by the wavelength designation signal, that is, continuous light with the output optical power and the central wavelength indicated in the transmission mode information. The wavelength-tunable light source 25aX-1 outputs the generated continuous light to the optical modulator 26X-1.

The controller 71aX-1 outputs a modulation method designation signal indicating the modulation method designated by the taken-in transmission mode information to the optical modulator 26X-1. The optical modulator 26X-1 performs optical modulation according to the modulation method designated by the modulation method designation signal received from the controller 71aX-1. Thus, the optical modulator 26X-1 stops the optical modulation in the fundamental mode and starts the optical modulation in the modulation method designated in the transmission mode information. The controller 71aX-1 outputs the transmission mode information to the digital signal processor 23aX-1. The digital signal processor 23aX-1 takes in the transmission mode information output by the controller 71aX-1, and stores the modulation method, baud rate, bit rate, FEC type, signal band permitted to use, and the like indicated in the taken-in transmission mode information in the internal storage area as setting parameters. When generating a transmission data signal, the digital signal processor 23aX-1 generates a transmission data signal based on the setting parameters stored in the internal storage area and outputs the signal to the optical modulator 26X-1 (step Sb10). The controller 71aX-1 may store the modulation method, baud rate, bit rate, FEC type, signal band permitted to use, and the like indicated in the transmission mode information in the internal storage area as the setting parameters. In this case, the controller 71aX-1 outputs the setting parameter to the digital signal processor 23aX-1 when the digital signal processor 23aX-1 generates the transmission data signal.

The controller 12b of the connection node device 1b detects the identification information for identifying the optical transmission path 51 from the address path correspondence table stored in the internal storage area or the address path correspondence table acquired on demand based on the source address information included in the received transmission mode information, in this case, the address information added to the optical transceiver 21aX-1. The controller 12b generates a switching instruction signal for connecting the wavelength path of the optical transmission path 51, which is the wavelength path of the central wavelength designated in the transmission mode information, and the wavelength path of the optical transmission path 52-i, which is the wavelength path of the central wavelength designated in the transmission mode information, based on the identification information for identifying the optical transmission path 51, the received identification information for identifying the optical transmission path 52-i, and the central wavelength designated in the transmission mode information. The controller 12b outputs the generated switching instruction signal to the output port switching unit 14a.

Figure 11:
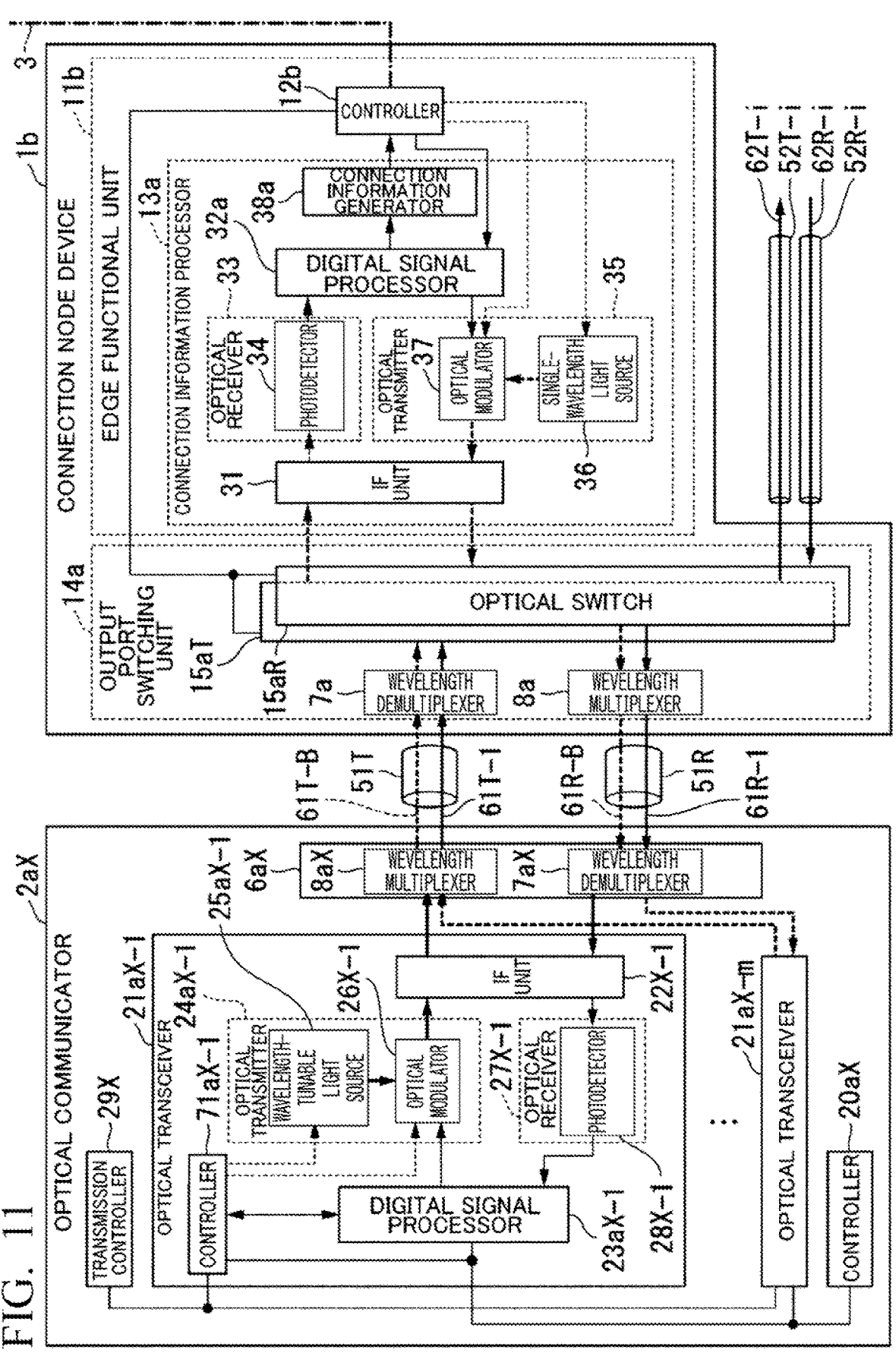
FIG. 11 is a diagram (part 2) illustrating an internal configuration of the connection node device and the optical communicator, and the connection relationship of the optical transmission paths in each of the connection node device and the optical communicator in the third embodiment.

More specifically, as illustrated in FIG. 11, the controller 12b outputs a switching instruction signal for setting a destination of the wavelength path 61T-1 of the optical fiber 51T, which is the wavelength path of the central wavelength designated in the transmission mode information to the wavelength path 62T-i of the optical fiber 52T-i, which is the wavelength path of the central wavelength designated in the transmission mode information, to the optical switch 15aT of the output port switching unit 14a. The controller 12b outputs a switching instruction signal for setting a destination of the wavelength path 61R-1 of the optical fiber SIR, which is the wavelength path of the central wavelength designated in the transmission mode information, to the wavelength path 62R-i of the optical fiber 52R-i, which is the wavelength path of the central wavelength designated in the transmission mode information, to the optical switch 15aR.

Upon receiving the switching instruction signal from the controller 12b, the optical switch 15aT connects the wavelength path 61T-1 of the optical fiber 51T and the wavelength path 62T-i of the optical fiber 52T-i. Upon receiving the switching instruction signal from the controller 12b, the optical switch 15aR connects the wavelength path 61R-1 of the optical fiber 51R to the wavelength path 62R-i of the optical fiber 52R-i (step Sb11). Thus, the optical transceiver 21aX-1 and the optical transceiver 21aY-i are connected through the wavelength path 61T-1 and the wavelength path 62T-i, and the wavelength path 61R-1 and the wavelength path 62R-i.

Figure 12:
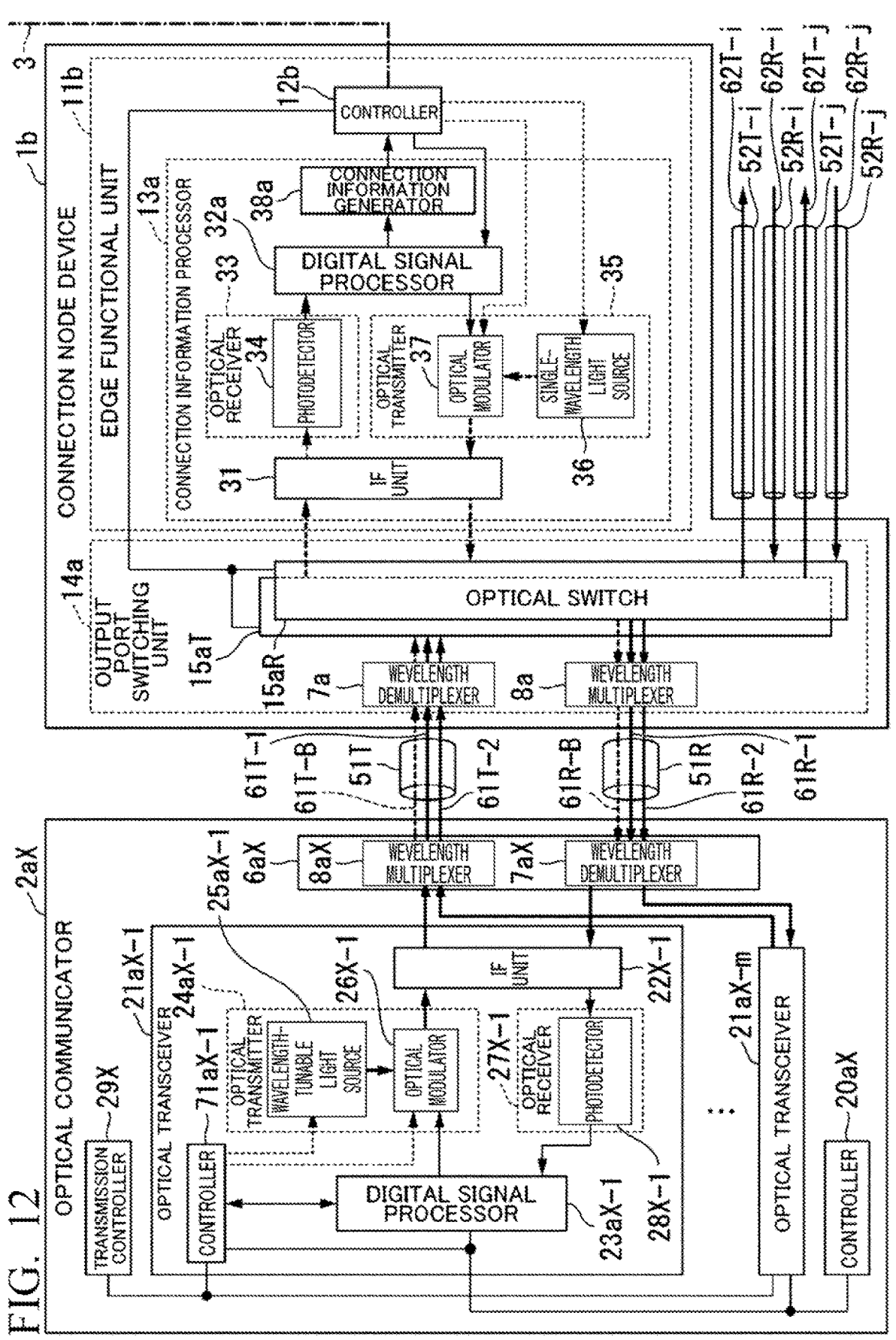
FIG. 12 is a diagram (part 3) illustrating an internal configuration of the connection node device and the optical communicator, and the connection relationship of the optical transmission paths in each of the connection node device and the optical communicator in the third embodiment.

Then, for example, it is assumed that the optical transceiver 21aX-m transmits connection request data using the optical transceiver 21aY-j of the optical communicator 2b Y-j as destination address information to the connection node device 1b through the wavelength path 61T-B of the fundamental wavelength at a timing indicated by the timing signal received from the transmission controller 29X. In this case, as illustrated in FIG. 12, the optical transceiver 21aX-m and the optical transceiver 21aY-j are connected through the wavelength path 61T-2 included in the optical transmission path 51 and the wavelength path 62T-j included in the optical transmission path 52, and the wavelength path 61R-2 included in the optical transmission path 51 and the wavelength path 62R-j included in the optical transmission path 52. Here, j is an arbitrary integer of 1 to n and is an integer different from i.

The processing of steps Sb8-1 and Sb8-2 may be performed in parallel and may be performed in the order of steps Sb8-1 and Sb8-2 or in the reverse order.

In the configuration of the third embodiment, the optical transceiver 21aX-s (here, s is an arbitrary integer of 1 to m) corresponding to the source address information in the connection request data, which is the optical transceivers 21aX-1 to 21aX-m provided in the optical communicator 2aX receives the transmission mode information that the controller 12b of the connection node device 1b receives from the operation device 4b and transmits to the optical transmission path 51, and transmits and receives an optical signal through the wavelength path included in the optical transmission path 51, which is the wavelength path of the central wavelength designated by the received transmission mode information. The optical transceiver 21aY-i provided in the optical communicator 2bY-i transmits and receives an optical signal through the wavelength path included in the optical transmission path 52-i, which is the wavelength path of the central wavelength designated by the transmission mode information received from the operation device 4b. After the controller 12b of the connection node device 1b transmits the transmission mode information to the optical communicator 2aX through the optical transmission path 51, the output port switching unit 14a of the connection node device 1b performs switching processing to connect the optical transceiver 21aX-s included in the optical communicator 2aX and the optical transceiver 21aY-i included in the optical communicator 2bY-i through the wavelength path designated by the transmission mode information included in the optical transmission path 51 and the wavelength path designated by the transmission mode information included in the optical transmission path 52-i. Thus, when the optical transceivers 21aX-s and 21Y-i provided in the optical communicators 2aX and 2bY-i are connected through the wavelength path designated by the transmission mode included in the plurality of optical transmission paths 51 and 52-i, the optical transceivers 21aX-s and 21Y-i can be connected through the optical path of the optimum transmission mode without manual intervention. Therefore, the cost and time required for setting the optical path can be reduced.

In the third embodiment, the connection information generator 38a of the connection node device 1b is configured to generate the transmission path information of the optical transmission path 51 whenever the digital signal processor 32a outputs the connection request data, the BER, and the optical input information to the connection information generator 38a. However, the following may be performed. The pieces of transmission path information of the wavelength paths included in the optical transmission path 51 are not different, but the transmission path information of each of the wavelength paths included in the optical transmission path 51 is the same as the transmission path information of the optical transmission path 51. Therefore, the connection information generator 38a stores the calculated transmission path information of the optical transmission path 51 in the internal storage area. When the digital signal processor 32a then receives the connection request data, and outputs the connection request data, the BER, and the optical input information to the connection information generator 38a, the connection information generator 38a may not calculate the transmission path information of the optical transmission path 51 again, but may read the transmission path information of the optical transmission path 51 stored in the internal storage area to generate the connection information.

In the third embodiment, the optical input information is transmitted to the connection node device 1b by the optical transceivers 21aX-1 to 21aX-m, and is transmitted the operation device 4b by the connection node device 1b. The optical input information is information related to the optical transceivers 21aX-1 to 21aX-m, for example, information which can be generated in advance if information such as the type of the transceiver and the number of transceivers is known. Therefore, the transmission path designer 42b of the operation device 4b may store the optical input information generated by itself in an internal storage area in association with the address information. In this case, when calculating the transmission path characteristics, the transmission path designer 42b reads the optical input information corresponding to the source address information included in the connection request data stored in the internal storage area to calculate the transmission path characteristics. Furthermore, the digital signal processors 23aX-1 to 23aX-m do not need to transmit the optical input information, and the optical input information is not included in the connection information generated by the connection information generator 38a of the connection node device 1b.

Figure 13:
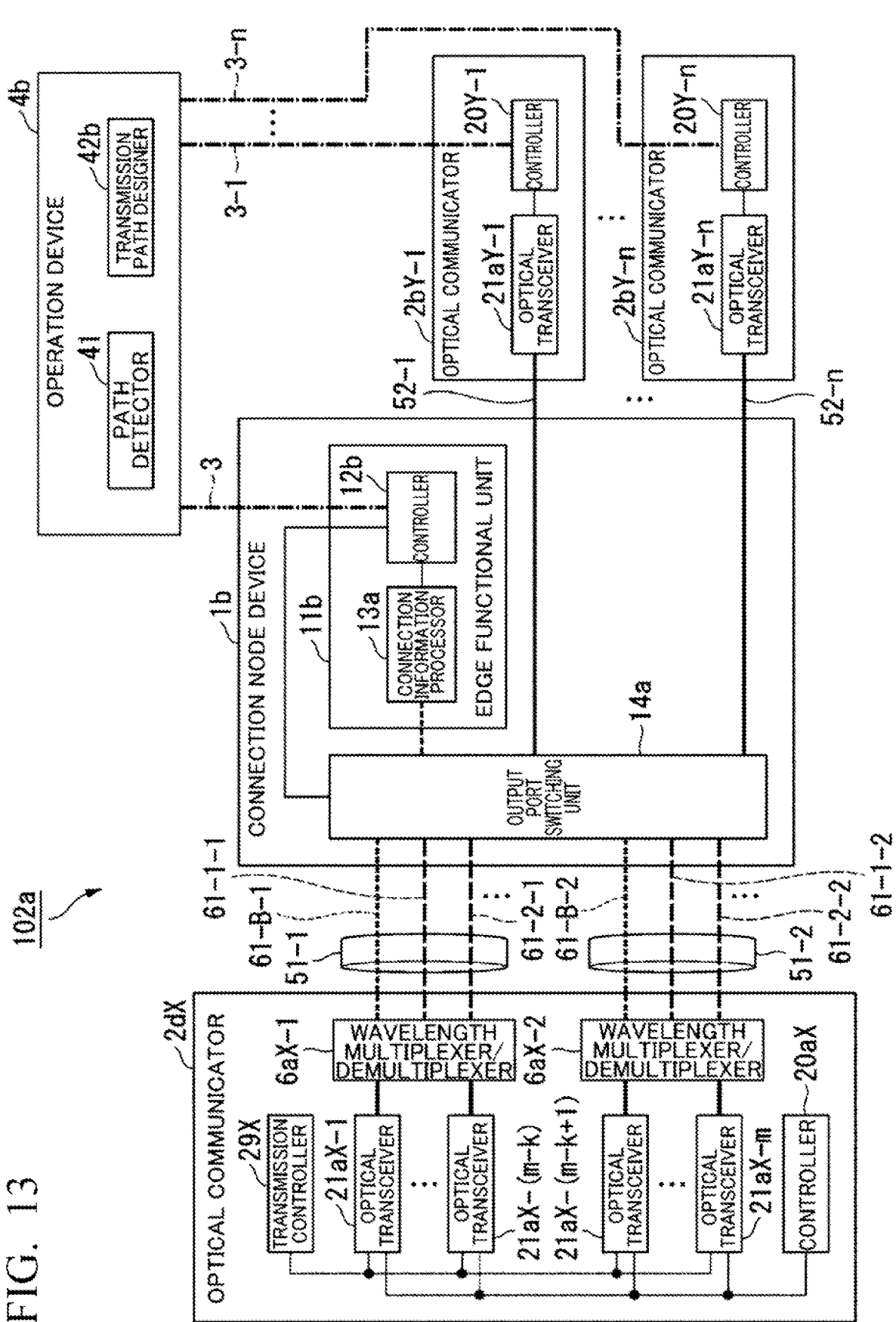
FIG. 13 is a diagram illustrating another configuration example (part 1) of the optical transmission system according to the third embodiment.

In the optical transmission system 102 of the third embodiment, the optical transceivers 21aX-1 to 21aX-m and the connection node device 1b are connected by one optical transmission path 51. On the other hand, the optical transceivers 21aX-1 to 21aX-m may be configured as in the optical transmission system 102a illustrated in FIG. 13 in which they are connected to different optical transmission paths 51-1, 51-2. As illustrated in FIG. 13, in the optical transmission system 102a, an optical communicator 2dX and a connection node device 1b are connected to two optical transmission paths 51-1 and 51-2. The wavelength multiplexer/demultiplexers 6aX-1 and 6aX-2 included in the optical communicator 2dX have the same configuration as the wavelength multiplexer/demultiplexer 6aX. The output port switching unit 14a of the connection node device 1b includes two wavelength demultiplexers 7a including a wavelength demultiplexer 7a connected to the optical fiber 51T-1 included in the optical transmission path 51-1 and the optical switch 15aT and a wavelength demultiplexer 7a connected to the optical fiber 51T-2 included in the optical transmission path 51-2 and the optical switch 15aT. The output port switching unit 14a includes two wavelength multiplexers 8a including a wavelength multiplexer 8a connected to the optical fiber 51R-1 included in the optical transmission path 51-1 and the optical switch 15*a*R and a wavelength multiplexer 8*a* connected to the optical fiber 51R-2 included in the optical transmission path 51-2 and the optical switch 15*a*R.

In the optical transmission system 102*a*, the optical transceivers 21*a*X-1 to 21*a*X-(m-k) provided in the optical communicator 2*d*X are connected to the optical transmission path 51-1 through the wavelength multiplexing/demultiplexer 6*a*X-1, and the optical transceivers 21*a*X-(m–k+1) to 21*a*X-m are connected to the optical transmission path 51-2 through the wavelength multiplexing/demultiplexer 6*a*X-2. Here, k is an integer of 1 to (m–1). In this case, the optical transceivers 21*a*X-1 to 21*a*X-m transmit connection request data in the order according to the timing indicated by the timing signal output by the transmission controller 29X, and are connected to any one of the optical transceivers 21*a*Y-1 to 21*a*Y-n through the wavelength paths 61-1-1, 61-2-1, and the like of the optical transmission path 51-1 or the wavelength paths 61-1-1, 61-2-1, and the like of the optical transmission path 51-2, to which each optical transceiver is connected.

In the third embodiment, when the number of WDM wavelengths is included in the transmission mode information, the controllers 71*a*X-1 to 71*a*X-m may output the transmission mode information to the controller 20*a*X. When the controller 20*a*X takes in the transmission mode information output by any one of the controllers 71*a*X-1 to 71*a*X-m, the controller 20*a*X refers to the number of WDM wavelengths included in the taken-in transmission mode information. When the number of optical transceivers 21*a*X-1 to 21*a*X-m already connected to the optical transceivers 21*a*Y-1 to 21*a*Y-n provided in the optical communicators 2*b* Y-1 to 2*b*Y-n is the number of referred WDM wavelengths, the controller 20*a*X outputs a communication stop instruction signal to the controllers 71*a*X-1 to 71*a*X-m which are the output source of the transmission mode information so that the optical transceivers 21*a*X-1 to 21*a*X-m including the controllers 71*a*X-1 to 71*a*X-m which are the output source of the transmission mode information cannot perform communication using an optical signal. Thus, communication using optical signals exceeding the number of wavelengths that can be multiplexed by the wavelength multiplexer 8*a*X provided in the wavelength multiplexing/demultiplexer 6*a*X can be prevented. Further, since the transmittable distance becomes short when the number of WDM wavelengths increases, the optical signal transmitted by the optical communicator 2*d*X may not reach the optical communicators 2*b* Y-1 to 2*b*Y-n which are the destinations of the optical transceivers 21*a*X-1 to 21*a*X-m. Even when the number of WDM wavelengths is increased, the number of optical transceivers 21*a*X-1 to 21*a*X-m for transmitting optical signals is limited by the communication stop instruction signal, whereby the transmitted optical signals can be prevented from not reaching the optical communicators 2*b* Y-1 to 2*b*Y-n.

In the first, second and third embodiments, it is necessary for the connection node devices 1, 1*a* and 1*b* to transmit the transmission mode information to the optical transmission path 51 before the switching processing by the output port switching units 14 and 14*a* is performed. In this case, in the processing of steps S5-2, Sa8-2, Sb9-2, there is a time difference until the optical switches 15R and 15*a*R output the optical signal including the transmission mode information after the controllers 12, 12*a*, and 12*b* output the transmission mode information to the digital signal processors 32 and 32*a*. Therefore, the time difference is measured in advance, and the controllers 12, 12*a*, and 12*b* need to perform processing of outputting the switching instruction signal in steps S7. Sa10, and Sb11 after the lapse of the time measured in advance after the transmission mode information is output to the digital signal processors 32 and 32*a*.

In order to ensure the start timing of the processing in steps S7, Sa10 and Sb11 more reliably, the following processing may be performed. For example, when the controllers 71X and 71*a*X-1 to 71*a*X-m of the optical transceivers 21X and 21*a*X-1 to 21*a*X-m take in the transmission mode information, information indicating the completion of the reception of the transmission mode information is output to the digital signal processors 23X and 23*a*X-1 to 23*a*X-m according to the fundamental mode. The digital signal processors 23X and 23*a*X-1 to 23*a*X-m transmit information indicating completion of reception of the transmission mode information to the connection node devices 1, 1*a*, and 1*b*. The controllers 12, 12*a*, and 12*b* of the connection node devices 1, 1*a*, and 1*b* may output the switching instruction signal to the output port switching units 14 and 14*a* at the timing at which information indicating the completion of reception of the transmission mode information transmitted by the optical transceivers 21X and 21*a*X-1 to 21*a*X-m is received.

Further, in order to ensure the start timing of the processing in steps S7, Sa10 and Sb11 more reliably, the following processing may be performed. In the processing of steps S6-2, Sa9, and Sb10, the digital signal processors 32 and 32*a* of the connection node devices 1, 1*a*, and 1*b* detects the optical modulation in the fundamental mode of the optical transceivers 21X and 21*a*X-1 to 21*a*X-m based on the presence of an optical signal of the fundamental mode transmitted by the optical transceivers 21X and 21*a*X-1 to 21*a*X-m when the optical modulators 26X and 26X-1 to 26X-m stop optical modulation in the fundamental mode. The digital signal processors 32 and 32*a* may notify the controllers 12, 12*a*, and 12*b* of the fact that optical modulation in the fundamental mode of the optical transceivers 21X and 21*a*X-1 to 21*a*X-m, that is, optical output in the fundamental mode is stopped, and the controllers 12, 12*a*, and 12*b* may output the switching instruction signal to the output port switching units 14 and 14*a* at the timing of receiving the notification.

Another Configuration Example of Second and Third Embodiments

Hereinafter, for convenience of explanation, a case where the light source used for generating the optical signal on the side transmitting the connection request data is a single-wavelength light source will be described as another configuration example of the second embodiment, and a case where the light source used for generating the optical signal on the side transmitting the connection request data is a wavelength-tunable light source will be described as another configuration example of the third embodiment. In addition, in the other configuration examples of the second and third embodiments illustrated below, the same reference numerals are assigned to the same configurations as in the first to third embodiments.

(Configuration to Avoid Collision of Connection Request Data (Part 1)

Figure 14:
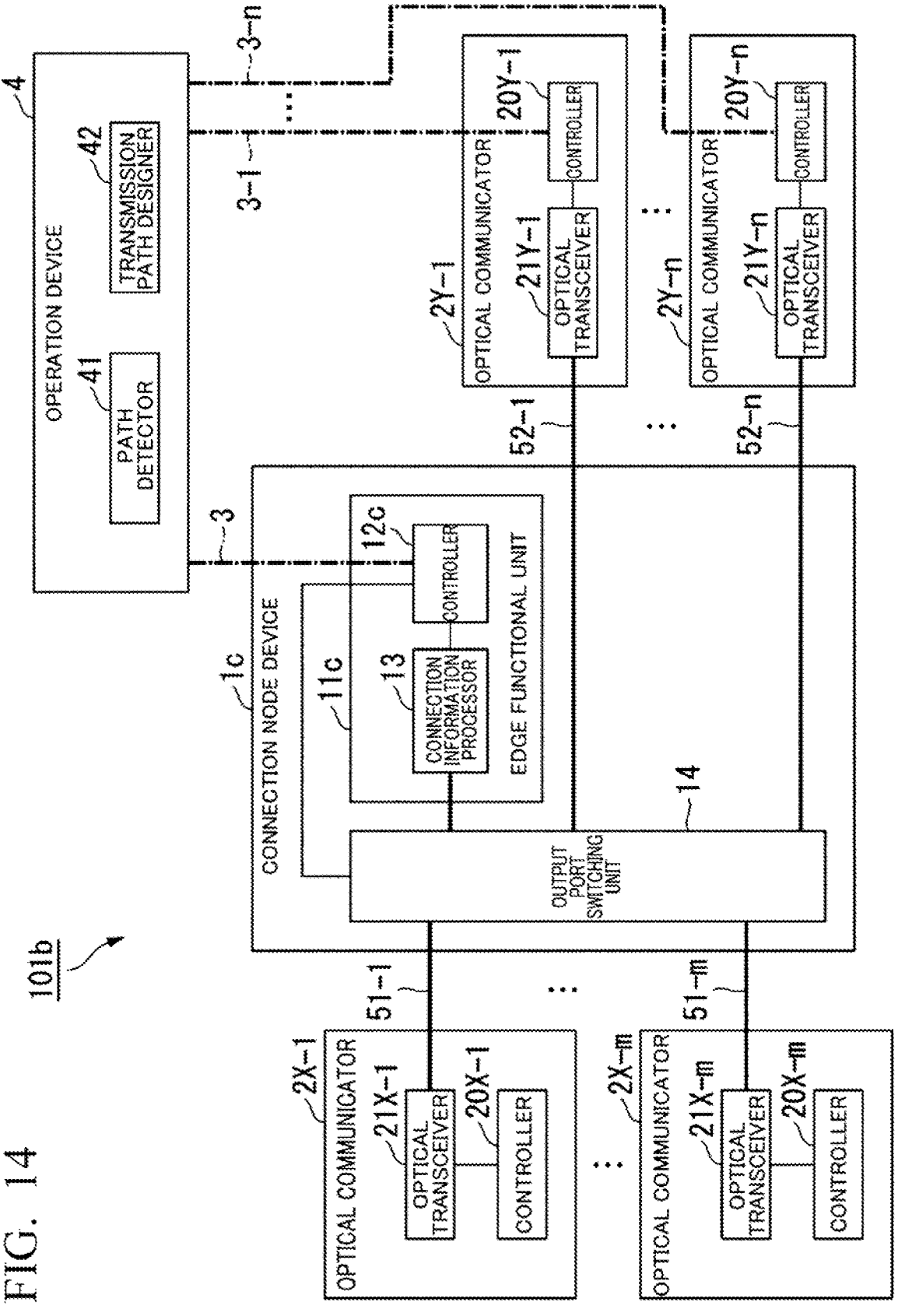
FIG. 14 is a diagram illustrating another configuration example (part 2) of the optical transmission system according to the second embodiment.

FIG. 14 is a block diagram of the configuration of the optical transmission system 101*b* as another configuration example of the second embodiment. The optical transmission system 101*b* includes optical communicators 2X-1-2X-m, a connection node device 1*c*, optical communicators 2Y-1 to 2Y-n, an operation device 4, optical transmission paths 51-1 to 51-*m* for connecting the optical communicators 2X-1 to 2X-m to the connection node device 1*e*, optical transmission paths 52-1 to 52-*n* for connecting the optical communicators 2Y-1 to 2Y-n to the connection node device 1*c*, a connection line 3 for connecting the operation device 4 to the connection node device 1*c*, and the connection lines 3-1 to 3-*n* for connecting the operation device 4 and the optical communicators 2Y-1 to 2Y-n.

The connection node device 1*e* includes an edge functional unit 11*e* and an output port switching unit 14. The output port switching unit 14 is connected to the optical transmission paths 51-1 to 51-*m*, the connection information processor 13 of the edge functional unit 11*e*, and the optical communicators 2Y-1 to 2Y-n. In the initial state, the output port switching unit 14 sets the destination of the optical transmission paths 51-1 to 51-*m* as the connection information processor 13 of the edge functional unit 11*e*. Upon receiving the switching instruction signal from the controller 12*e*, the output port switching unit 14 performs switching processing of connecting any one of the optical transmission paths 51-1 to 51-*m* to any one of the optical transmission paths 52-1 to 52-*n* according to the received switching instruction signal.

The edge functional unit 11*e* includes a connection information processor 13 and a controller 12*c*. The information receiver 12*e* has the following configuration in addition to the configuration provided in the controller 12*c* of the second embodiment. In the optical transmission system 101*b*, for example, as in the optical transmission system 102 illustrated in FIG. 8, one optical communicator 2*a*X does not include a plurality of optical transceivers 21*a*X-1 to 21*a*X-m, but each of the plurality of optical communicators 2X-1 to 2X-m includes one of the optical transceivers 21X-1 to 21X-m. Therefore, the timings of transmitting the connection request data cannot be made different using the transmission controller 29X unlike the optical transmission system 102.

The controller 12*c* outputs the timing for transmitting the connection request data and the timing information including the address information of the optical transceivers 21X-1 to 21X-m for permitting transmission of the connection request data to the digital signal processor 32 of the connection information processor 13 so that the timings for transmitting the connection data can be made different. Thereafter, the timing information is transmitted to the optical transceivers 21X-1 to 21X-m by processing similar to the case of transmitting the transmission mode information using the transmission data signal.

Each of the optical communicators 2X-1 to 2X-m has the same configuration as the optical communicator 2X of the first embodiment, but a configuration of processing when receiving an optical signal including the timing information is added. The digital signal processors 23X-1 to 23X-m provided in the optical communicators 2X-1 to 2X-m read the timing information when the timing information is included in the reception data signals output by the optical receivers 28X-1 to 28X-m. The digital signal processors 23X-1 to 23X-m output the read timing information to the controllers 71X-1 to 71X-m connected to the respective processors. When the address information included in the timing information output by the digital signal processors 23X-1-23X-m is the address information stored in the internal storage area and given to the optical transceivers 21X-1 to 21X-m provided therein, the controllers 71X-1 to 71X-m output connection request data according to the timing indicated by the timing information. Thus, the timings at which the optical transceivers 21X-1 to 21X-m transmit the connection request data can be made different.

(Configuration to Avoid Collision of Connection Request Data (Part 2)

Figure 15:
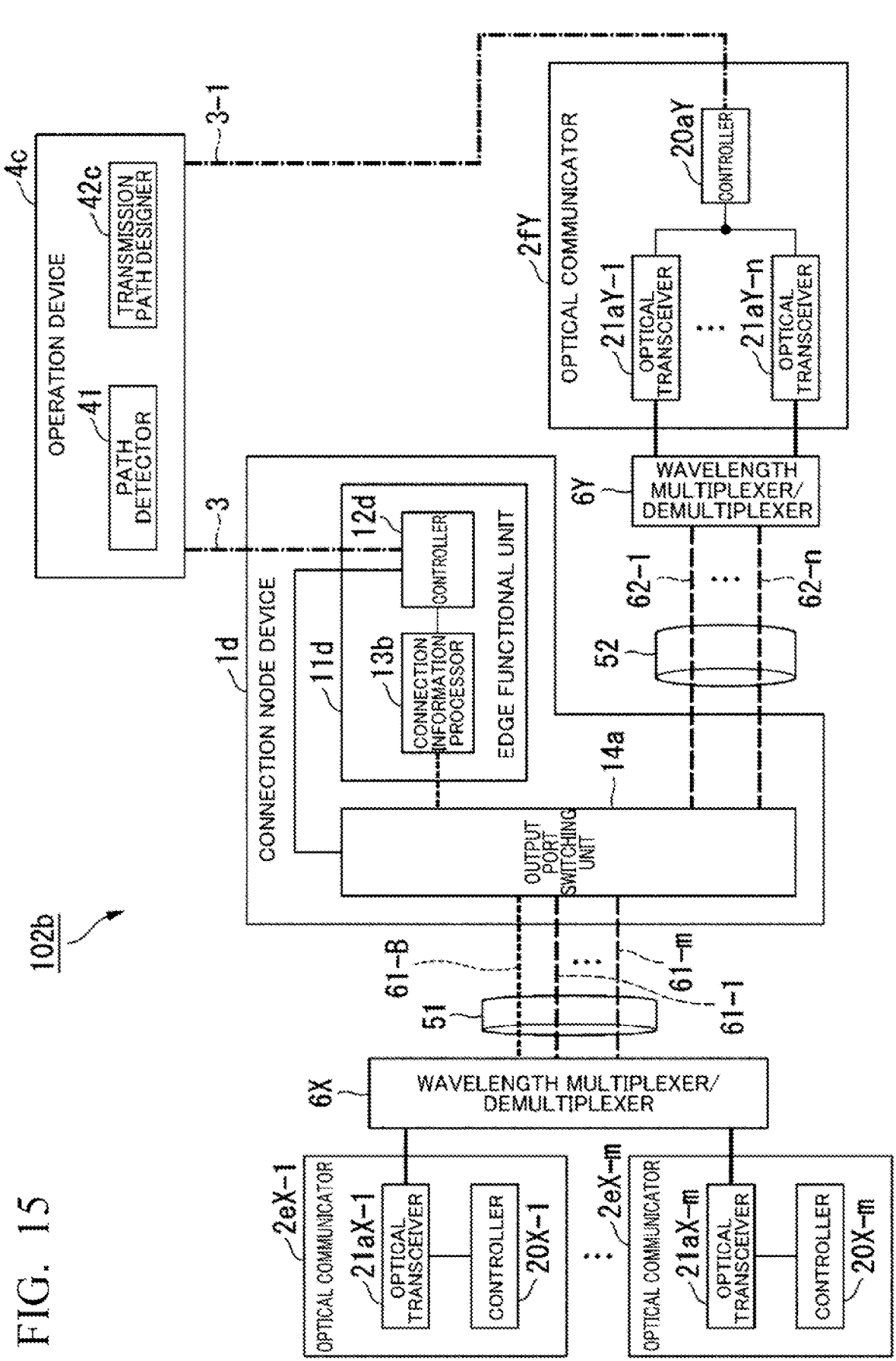
FIG. 15 is a diagram illustrating another configuration example (part 2) of the optical transmission system according to the third embodiment.

FIG. 15 is a block diagram of the configuration of the optical transmission system 102*b* as another configuration example of the third embodiment. The optical transmission system 102*b* includes optical communicators 2*e*X-1-2*e*X-*m*, a connection node device 1*d*, an optical communicator 2*f*Y, an operation device 4*c*, a wavelength multiplexing/demultiplexing device 6X, a wavelength multiplexing/demultiplexing device 6Y, an optical transmission path 51, an optical transmission path 52, a connection line 3, and a connection line 3-1 for connecting the operation device 4*c* and the optical communicator 2*f*Y. The optical transmission path 51 connects the wavelength multiplexing/demultiplexing device 6X and the connection node device 1*d*. The optical transmission path 52 connects the wavelength multiplexing/demultiplexing device 6Y and the connection node device 1*d*. The connection line 3 connects the operation device 4 and the connection node device 1*d*. The connection line 3-1 connects the operation device 4*e* and the optical communicator 2*f*Y.

The optical communicators 2*e*X-1 to 2*ex-m* include optical transceivers 21*a*X-1 to 21*a*X-m and controllers 20X-1 to 20X-m, respectively. The optical communicator 2*f*Y includes optical transceivers 21*a*Y-1 to 21*a*Y-n and a controller 20*a*Y. The operation device 4*c* includes a path detector 41 and a transmission path designer 42*c*.

The transmission path designer 42*c* has the same configuration as the transmission path designer 42*b* of the third embodiment except for the configuration described below. The transmission path designer 42*b* refers to the connection line table stored in the internal storage area and transmits the transmission mode information to the controllers 20Y-1 to 20Y-n of the optical communicators 2*b*Y-1 to 2*b*Y-n through the connection lines 3-1 to 3-*n* corresponding to the destination address information included in the connection request data. On the other band, the transmission path designer 42*c* adds the destination address information included in the connection request data to the generated transmission mode information and transmits it to the controller 20*a* Y of the optical communicator 2*f*Y through the connection line 3-1. Therefore, the transmission path designer 42*c* does not need to store the connection line table in advance in an internal storage area. As described with reference to FIG. 7, upon receiving the transmission mode information to which the destination address information transmitted by the transmission path designer 42*c* through the connection line 3-1 is added, the controller 20*a* Y outputs the transmission mode information to any one of the optical transceivers 21*a*Y-1 to 21*a*Y-n corresponding to the destination address information added to the received transmission mode information.

The wavelength multiplexing/demultiplexing devices 6X and 6Y are formed by configuring the wavelength multiplexing/demultiplexer 6*a*X provided in the optical transmission system 102 illustrated in FIG. 8 as a single device. The wavelength multiplexing/demultiplexing device 6X includes a wavelength demultiplexer 7*a*X and a wavelength multiplexer 8*a*X. The wavelength multiplexing/demultiplexing device 6Y includes a wavelength demultiplexer 7*a*Y and a wavelength multiplexer 8*a*Y. Similarly to the optical communicator 2*a*X of the optical transmission system 102 illustrated in FIG. 8, the optical communicator 2*f*Y may include the wavelength multiplexing/demultiplexing device 6Y as an internal functional unit, that is, a wavelength multiplexer/demultiplexer 6aY.

The connection node device 1d includes an edge functional unit 11d and an output port switching unit 14a. The output port switching unit 14a connects the wavelength path 61-B of the fundamental wavelength included in the optical transmission path 51 to the connection information processor 13b of the edge functional unit 11d, and performs switching processing of connecting any one of the wavelength paths 61-1 to 61-m included in the optical transmission path 51 to any one of the wavelength paths 62-1 to 62-n included in the optical transmission path 52 in response to the switching instruction signal from the controller 12d.

The edge functional unit 11d includes a connection information processor 13b and a controller 12d. The connection information processor 13b and the controller 12d have the following configurations in addition to the configurations provided in the connection information processor 13a and the controller 12b of the third embodiment. In the optical transmission system 102b, each of the plurality of optical communicators 2eX-1 to 2eX-m includes one of the optical transceivers 21aX-1 to 21aX-m, similarly to the case of the optical transmission system 101b illustrated in FIG. 14. Therefore, the timings of transmitting the connection request data cannot be made different using the transmission controller 29X unlike the optical transmission system 102 illustrated in FIG. 8.

The connection information processor 13b and the controller 12d have a configuration for making the wavelength of the fundamental wavelength to be assigned to the optical transceivers 21aX-1 to 21aX-m different in order to prevent the connection request data from colliding with each other in the wavelength path 61-B of the fundamental wavelength. The connection information processor 13b includes, for example, a wavelength-tunable light source having the same configuration as the wavelength-tunable light source 25aX-1 illustrated in FIG. 9 instead of the single-wavelength light source 36. Hereinafter, when the wavelength-tunable light source provided in the connection information processor 13b is indicated, a reference numeral "36a" and the wavelength-tunable light source 36a is used. The digital signal processor 32a is connected to the wavelength-tunable light source 36a and outputs a wavelength designation signal to the wavelength-tunable light source 36a.

The controller 12d assigns different fundamental wavelengths to the optical transceivers 21aX-1 to 21aX-m. Therefore, the controller 12d selects in advance fundamental wavelengths to be assigned to the optical transceivers 21aX-1 to 21aX-m, and stores the selected fundamental wavelengths and the respective pieces of address information of the optical transceivers 21aX-1 to 21aX-m corresponding to the fundamental wavelengths in an internal storage area in advance. The controller 12d outputs fundamental wavelength designation information including the address information of each of the optical transceivers 21aX-1 to 21aX-m stored in the internal storage area and the corresponding fundamental wavelengths to the digital signal processor 32a of the connection information processor 13b. Thereafter, the fundamental wavelength designation information is transmitted to the optical transceivers 21aX-1 to 21aX-m by processing similar to the case of transmitting the transmission mode information using a transmission data signal through the fundamental mode before the fundamental wavelength is changed, that is, the wavelength path 61-B of the optical transmission path 51.

The optical transceivers 21aX-1 to 21aX-m have the same configuration as the optical transceivers 21aX-1 to 21aX-m of the third embodiment, but the configuration of processing when receiving an optical signal including the fundamental wavelength designation information is added. The digital signal processors 23aX-1 to 23aX-m provided in the optical transceivers 21aX-1 to 21aX-m read the fundamental wavelength designation information when the fundamental wavelength designation information is included in the reception data signals output from the optical receivers 28X-1 to 28X-m. The digital signal processors 23aX-1 to 23aX-m output the read fundamental wavelength designation information to the controllers 71aX-1 to 71aX-m connected to the respective processors. The controllers 71aX-1 to 71aX-m take in the fundamental wavelength designation information output by the digital signal processors 23aX-1 to 23aX-m, and read their own address information included in the taken-in fundamental wavelength designation information, that is, the fundamental wavelengths corresponding to the address information stored in the internal storage area. The controllers 71aX-1 to 71aX-m output the read wavelength designation signal for designating the fundamental wavelengths to the wavelength-tunable light sources 25aX-1 to 25aX-m corresponding thereto.

As a result, the optical transceivers 21aX-1 to 21aX-m generate optical signals with different fundamental wavelengths. When transmitting the transmission mode information, the controller 12d reads the fundamental wavelength corresponding to the source address information included in the transmission mode information from the internal storage area, for example. The controller 12d generates a wavelength designation signal based on the read information indicating the fundamental wavelength. The controller 12d outputs the generated wavelength designation signal to the wavelength-tunable light source 36a. The wavelength-tunable light source 36a generates and outputs continuous light of the fundamental wavelength designated by the wavelength designation signal. Thus, the fundamental wavelength of the continuous light generated by the wavelength-tunable light source 36a is changed. The controller 12d outputs the transmission mode information to the digital signal processor 32a. The digital signal processor 32a takes in the transmission mode information output by the controller 12d and generates a transmission data signal including the taken-in transmission mode information. The digital signal generator 32a outputs the generated optical signal to the optical modulator 37. The optical modulator 37 generates an optical signal by modulating the continuous light of the changed fundamental wavelength, which is output from the wavelength-tunable light source 36a, based on the transmission data signal.

Thus, the optical transceivers 21aX-1 to 21aX-m and the connection node device 1d are connected by different fundamental wavelengths, and collision of connection request data can be avoided. However, in this case, when the optical transceivers 21aX-1 to 21aX-m transmit connection request data with the respective fundamental wavelengths assigned thereto, the pieces of connection request data may collided with each other in the photodetector 34 of the connection node device 1b. In order to avoid this collision, the connection node device 1d needs to individually terminate wavelength paths of a plurality of different fundamental wavelengths. For example, it is assumed that the maximum number of fundamental wavelengths assigned by the connection node device 1d is determined in advance. The optical receiver 33 of the connection information processor 13b of the connection node device 1d includes a number of photodetectors 34 matching the maximum number of fundamental wavelengths, and the optical switch 15aT of the output port switching unit 14a connects the output of the wavelength demultiplexer 7a and a plurality of photodetectors 34 so that the plurality of photodiodes 34 are connected to different fundamental wavelengths. Thus, the controller 12d of the connection node device 1d can separately take in the pieces of connection request data transmitted by the optical transceivers 21aX-1 to 21aX-m. In place of the optical receiver 33 having the plurality of photodetectors 34, the edge functional unit 11d may include a number of connection information processors 13b matching the maximum number of fundamental wavelengths.

In the configurations (part 1) and (part 2) for avoiding the collision of the connection request data, the timing information or the initial setting information for avoiding the collision of the connection request data such as fundamental wavelength setting information is transmitted from the controllers 12c and 12d of the connection node devices 1e and 1d to the optical transceivers 21X-1 to 21X-m and 21aX-1 to 21aX-m. A means for transmitting the initial setting information for avoiding the collision of these pieces of connection request data from the connection node devices 1c and 1d may be applied to, for example, the optical transmission system 102 illustrated in FIG. 8, and may be used in combination with a means for setting the timings of transmitting the connection request data to be different using the transmission controller 29X. By using these in combination, the collision of the connection request data can be avoided more reliably. In the optical transmission system 102 illustrated in FIG. 8, the controller 12b of the connection node device 1b may transmit the initial setting information including information indicating the transmission timing of the connection request data to the transmission controller 29X of the optical communicator 2aX in advance. The transmission controller 29X may transmit information indicating completion of the reception of the initial setting information to the controller 12b as a response so that they share the timings of transmitting and receiving the connection request data. After that, the transmission controller 29X may output the timing signal to the optical transceivers 21aX-1 to 21aX-m based on the information indicating the transmission timing of the connection request data included in the initial setting information.

A configuration for transmitting the timing information provided in the controller 12c of the optical transmission system 101b illustrated in FIG. 14 may be added to the controller 12d of the optical transmission system 102b illustrated in FIG. 15 so that the controller 12d uses both or either one of the means for changing the fundamental wavelength and the means for transmitting the timing signal.

As a method for avoiding collision of connection request data, the following method may be applied. When there is no response from the connection node devices 1e and 1d for a predetermined time after each of the optical transceivers 21X-1 to 21X-m and 21aX-1 to 21aX-m transmits the connection request data, for example, when transmission mode information addressed thereto is not obtained, the optical transceivers 21X-1 to 21X-m and 21aX-1 to 21aX-m may stop the optical output in the fundamental mode for a predetermined time or a time determined at random. Thus, the probability of collision of the connection request data can be reduced.

(Configuration in which Connection Node Device Includes Wavelength Converter)

Figure 16:
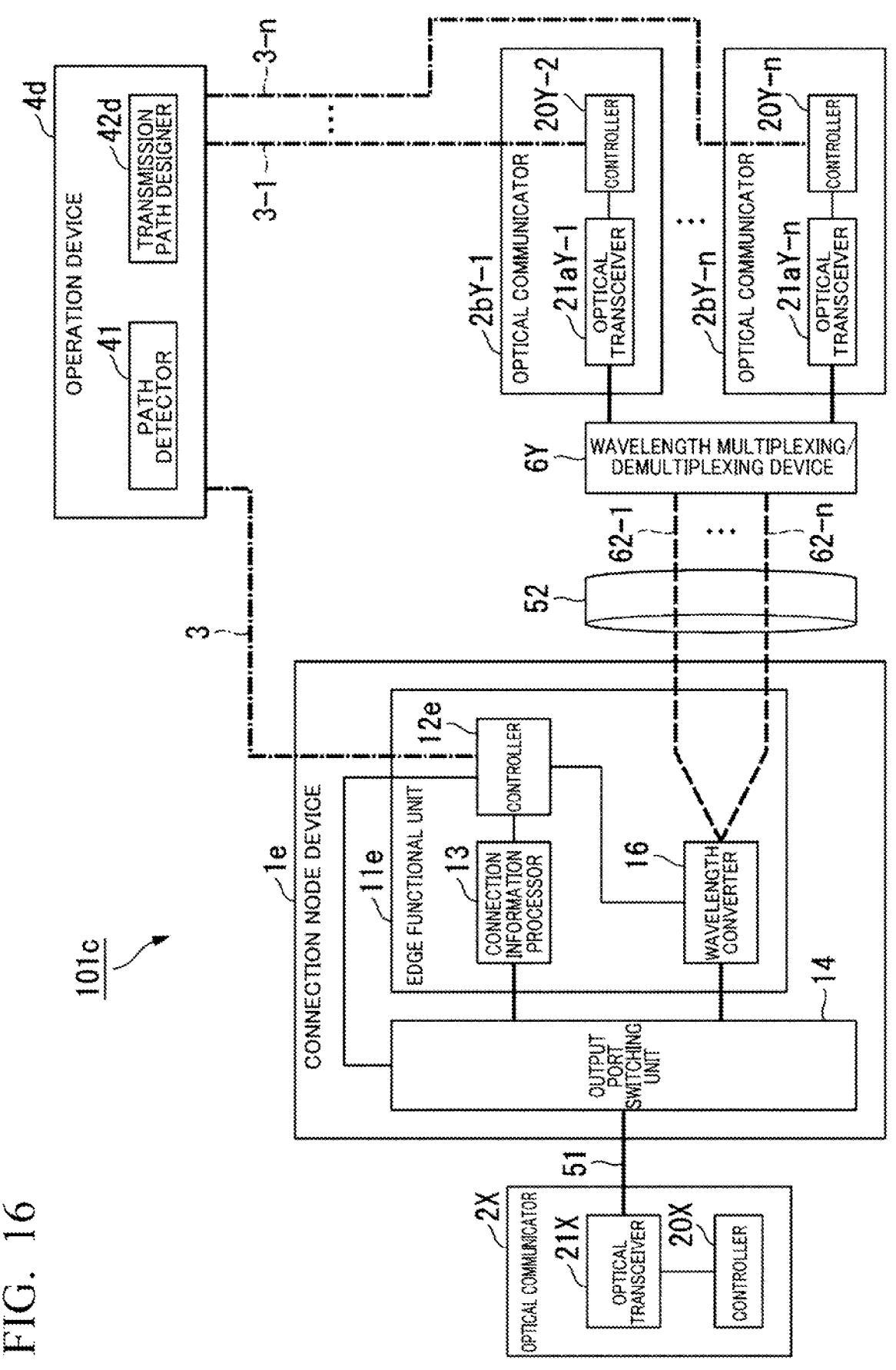
FIG. 16 is a diagram illustrating a configuration example (part 3) of the optical transmission system according to the second embodiment.

FIG. 16 is a block diagram of the configuration of an optical transmission system 101e as another configuration example of the second embodiment. The optical transmission system 101c includes a connection node device 1e, an optical communicator 2X, a plurality of optical communicators 2b Y-1 to 2bY-n, an operation device 4d, a wavelength multiplexing/demultiplexing device 6Y, an optical transmission path 51, an optical transmission path 52, a connection line 3 and connection lines 3-1 to 3-n. The optical transmission path 51 connects the optical communicator 2X and the connection node device 1e. The optical transmission path 52 connects the wavelength multiplexing/demultiplexing device 6Y and the connection node device 1e. The connection line 3 connects the operation device 4d and the connection node device 1e. The connection lines 3-1 to 3-n connect the operation device 4d and the optical communicators 2bY-1 to 2b Y-n, respectively.

The connection node device 1e includes an edge functional unit 11e and an output port switching unit 14. The edge functional unit 11e includes a controller 12e, a connection information processor 13, and a wavelength converter 16. The controller 12e has the same configuration as the controller 12a of the second embodiment except for the configuration described below. That is, the controller 12e transmits information that the connection node device 1e has a wavelength converter 16 and information indicating a convertible wavelength band of the wavelength converter 16 (hereinafter, the two pieces of information are collectively referred to as "wavelength converter information"), the connection information output by the connection information processor 13, and the connection request data to the operation device 4d through the connection line 3. The controller 12e outputs the information of the central wavelength included in the transmission mode information transmitted by the transmission path designer 42d of the operation device 4d to the wavelength converter 16.

The operation device 4d includes a path detector 41 and a transmission path designer 42d. The transmission path designer 42d has the same configuration as the transmission path designer 42 of the second embodiment, except for the configuration described below. The transmission path designer 42 stores the transmission path information of each of the optical transmission paths 52-1 to 52-n in advance in an internal storage area or acquires the transmission path information of each of the optical transmission paths 52-1 to 52-n on demand. On the other hand, the transmission path designer 42d stores the transmission path information of the optical transmission path 52 in advance in an internal storage area or acquires the transmission path information of the optical transmission path 52 on demand. The transmission path designer 42d selects configuration information by predetermined selection processing based on the calculated transmission path characteristics, the information indicating free resources of the optical transmission path 52 corresponding to the destination address information detected by the path detector 41, the desired bit rate information included in the connection request data, the specification information of the optical transceiver 21X, and the wavelength converter information. The transmission path designer 42d generates transmission mode information including the selected configuration information.

With the above configuration, the optical transmission system 101c performs the following processing. This processing will be described with reference to the flowchart illustrated in FIG. 6. First, the processing of steps Sa1 and Sa2 illustrated in FIG. 6 is performed. However, in step Sa1, it is assumed that the controller 20X of the optical communicator 2X generates a connection request instruction signal including the address information of the optical transceiver 21aY-i included in the optical communicator 2bY-i as the destination address information, and the optical communicator 2aY-i is connected to the connection line 3-i. In the processing of step Sa3, the controller 12e transmits wavelength converter information in addition to the connection information and the connection request data to the operation device 4d through the connection line 3.

The path detector 41 of the operation device 4d detects identification information for identifying the optical transmission path 52 corresponding to the address information of the optical transceiver 21aY-i based on the connection request data in processing of step Sa4. In the processing of step Sa5, the transmission path designer 42d takes in the identification information for identifying the optical transmission path 52 output by the path detector 41. The transmission path designer 42d reads and acquires the transmission path information of the optical transmission path 52 corresponding to the taken-in identification information for identifying the optical transmission path 52 from the internal storage area, or acquires the transmission path information of the optical transmission path 52 on demand. The transmission path designer 42d calculates the transmission path characteristics based on the acquired the transmission path information of the optical transmission path 52 and the received connection information.

In the processing of step Sa6, the transmission path designer 42d selects the configuration information by pre-determined selection processing based on the calculated transmission path characteristics, the received wavelength converter information, the desired bit rate information included in the received connection request data and the specification information of the optical transceiver 21X. The transmission path designer 42d generates transmission mode information including the selected configuration information and the source address information included in the connection request data.

In the processing of step Sa7-1, the transmission path designer 42d refers to the connection line table stored in the internal storage area, and transmits the generated transmission mode information to the controller 20Y-i of the optical communicator 2b Y-i through the connection line 3-i corresponding to the destination address information included in the connection request data. After that, instead of the processing of step Sa8-1, the same processing as that of step Sb9-1 illustrated in FIG. 10 is performed by the controller 20Y-i and the optical transceiver 21aY-i.

Thus, in the optical transceiver 21aY-i, the wavelength-tunable light source 25aY-i generates continuous light with the output optical power indicated in the transmission mode information and the central wavelength indicated in the transmission mode information, and outputs it to the optical modulator 26Y-i. The optical modulator 26Y-i performs optical modulation according to the modulation method indicated in the transmission mode information. The digital signal processor 23aY-i generates a transmission data signal based on the modulation method, baud rate, bit rate, FEC type, signal band permitted to use, and the like indicated in the transmission mode information and outputs the signal to the optical modulator 26Y-i.

In the processing of step Sa7-2, the transmission path designer 42d transmits the generated transmission mode information and the identification information for identifying the optical transmission path 52 detected by the path detector 41 to the connection node device 1e through the connection line 3. Thereafter, the processing of steps Sa8-2 and Sa9 is performed by the controller 12e of the connection node device 1e, the connection information processor 13, the output port switching unit 14 and the optical transceiver 21X of the optical communicator 2X.

In the processing of step Sa10, the controller 12e of the connection node device 1e outputs information indicating the central wavelength included in the transmission mode information received through the connection line 3 to the wavelength converter 16. The controller 12e detects the identification information for identifying the optical transmission path 51 from the address path correspondence table stored in the internal storage area or the address path correspondence table acquired on demand based on the source address information included in the transmission mode information, in this case, the address information of the optical transceiver 21X. The controller 12e generates a switching instruction signal based on the identification information for identifying the optical transmission path 51 and the identification information for identifying the optical transmission path 52 received from the transmission path designer 42d of the operation device 4d. The controller 12e outputs the generated switching instruction signal to the output port switching unit 14. Thus, the output port switching unit 14 connects the optical transmission path 51 and the wavelength converter 16.

When the optical transceiver 21X of the optical communicator 2X transmits an optical signal to the connection node device 1e through the optical transmission path 51, the output port switching unit 14 of the connection node device 1e outputs the optical signal received through the optical transmission path 51 to the wavelength converter 16. The wavelength converter 16 takes in the optical signal output by the output port switching unit 14. The wavelength converter 16 converts the wavelength of the taken-in optical signal into the central wavelength given from the controller 12e and transmits it to the optical transmission path 52. Here, the central wavelength given from the controller 12e is the central wavelength indicated in the transmission mode information. Therefore, the wavelength of the optical signal transmitted to the optical transmission path 52 by the wavelength converter 16 becomes the same as the wavelength of the optical signal transmitted by the optical transceiver 21aY-1 provided in the optical communicator 2bY-i. Therefore, when the wavelength path of the central wavelength indicated in the transmission mode information is defined as a wavelength path 62-i, the wavelength converter 16 and the optical transceiver 21aY-i are connected by the wavelength path 62-i, The optical signal transmitted to the optical transmission path 52 by the wavelength converter 16 is transmitted to the wavelength demultiplexer 7aY provided in the wavelength multiplexing/demultiplexing device 6Y through the wavelength path 62-i. The wavelength demultiplexer 7aY demultiplexes the wavelength-multiplexed optical signal transmitted through the optical transmission path 52 for each wavelength. The wavelength demultiplexer 7aY outputs the demultiplexed optical signals to the optical transceivers 21aY-1 to 21aY-n corresponding to each wavelength. Thus, the optical signal transmitted by the optical transceiver 21X of the optical communicator 2X reaches the optical transceiver 21aY-i of the optical communicator 2bY-i.

In the optical transmission system 101c, since the edge functional unit 11e of the connection node device 1e includes the wavelength converter 16, even if the optical transceiver 21X of the optical communicator 2X includes a light source such as the single-wavelength light source 25X which cannot change the wavelength, the wavelength converter 16 can convert the wavelength into an arbitrary wavelength. Therefore, by using the connection node device 1e, the wavelength can be switched using the optical transceiver 21X which is lower in cost than the optical transceiver 21aX-1 including the wavelength-tunable light source 25aX-1, and any one of the optical transceivers 21aY-1 to 21aY-n can be connected through any one of the wavelength paths 62-1 to 62-n included in the optical transmission path 52.

Other Configuration Example

In addition to the configurations illustrated in the optical transmission systems 101, 101a, 101b, 101c, 102, 102a and 102b, the following configuration may be employed. For example, in the optical transmission system 102 illustrated in FIG. 8, the optical communicator 2aX may not include the wavelength multiplexer/demultiplexer 6aX, and one set of ends of m optical transmission paths (denoted by 51-1 to 51-m) may be connected to the optical transceivers 21aX-1 to 21aX-m, respectively, and the other set of ends of the optical transmission paths 51-1 to 51-m may be connected to the output port switching unit 14a.

The optical transmission system 102a illustrated in FIG. 13 may include the optical communicator 2fY illustrated in FIG. 15 and the wavelength multiplexing/demultiplexing device 6Y connected to the optical communicator 2fY instead of the optical communicator 2bY-1 connected to the optical transmission path 52-1, and the wavelength multiplexing/demultiplexing device 6Y may be connected to the optical transmission path 52-1. The optical transmission system 102a illustrated in FIG. 13 may include the optical communicators 2b Y-1 to 2bY-n illustrated in FIG. 16 and the wavelength multiplexing/demultiplexing device 6Y connected to the optical communicators 2bY-1 to 2b Y-n instead of the optical communicator 2bY-1 connected to the optical transmission path 52-1, and the wavelength multiplexing/demultiplexing device 6Y may be connected to the optical transmission path 52-l. The optical transmission system 102a illustrated in FIG. 13 may include the optical communicator 2fY illustrated in FIG. 15 instead of the optical communicators 2b Y-1 to 2bY-n, and the optical transceivers 21aY-1 to 21aY-n may be connected to the optical transmission paths 52-1 to 52-n, respectively. The optical transmission system 102a illustrated in FIG. 13 may include two optical communicators 2aX illustrated in FIG. 8 instead of the optical communicator 2dX, the wavelength multiplexer/demultiplexer 6aX of one optical communicator 2aX may be connected to the optical transmission path 51-1, and the wavelength multiplexing/demultiplexer 6aX of the other optical communicator 2aX may be connected to the optical transmission path 51-2.

In the optical transmission system 101b illustrated in FIG. 14, one optical communicator including the optical transceivers 21X-1 to 21X-m, one controller 20aX connected to the optical transceivers 21X-1 to 21X-m, and the transmission controller 29X connected to the optical transceivers 21X-1 to 21X-m may be applied instead of the optical communicators 21X1-1 to 21X-m, and the optical transceivers 2X1-1 to 2X-m may be connected to the optical transmission paths 51-1 to 51-m, respectively. The optical transmission system 101b illustrated in FIG. 14 may include the optical communicator 2eY illustrated in FIG. 7 instead of the optical communicators 2Y-1 to 2Y-n, and the optical transceivers 21Y-1 to 21Y-n may be connected to the optical transmission paths 52-1 to 52-n, respectively.

The optical transmission system 101c illustrated in FIG. 16 may include the optical communicators 2X-1 to 2X-m illustrated in FIG. 14 instead of the optical communicator 2X, a plurality of optical transmission paths 51-1 to 51-m may be connected to the output port switching unit 14 instead of one optical transmission path 51, and the optical transceivers 21X-1 to 21X-m may be connected to the optical transmission paths 51-1 to 51-m, respectively. The optical transmission system 101c illustrated in FIG. 16 may include, instead of the optical communicator 2X and the optical transmission path 51, one optical communicator including the optical transceivers 21X-1 to 21X-m, one controller 20aX connected to the optical transceivers 21X-1 to 21X-m, and the transmission controller 29X connected to the optical transceivers 21X-1 to 21X-m and the optical transmission paths 51-1 to 51-m connected to the optical transceivers 21X-1 to 21X-m and the output port switching unit 14.

In the optical transmission system 102 illustrated in FIG. 8, the optical communicator 2aX may be externally provided with the wavelength multiplexer/demultiplexer 6aX as the wavelength multiplexing/demultiplexing device 6X as in the optical transmission system 102b illustrated in FIG. 15, instead of being internally provided with the wavelength multiplexer/demultiplexer 6aX. Similarly, in the optical transmission system 102a illustrated in FIG. 13, the optical communicator 24X may be externally provided with the wavelength multiplexer/demultiplexers 6X-1 and 6X-2 as wavelength multiplexing/demultiplexing devices 6aX-1 and 6aX-2 as in the optical transmission system 102b illustrated in FIG. 15, instead of being internally provided with the wavelength multiplexer/demultiplexers 6aX-1 and 6aX-1.

For example, in the third embodiment and the other configuration example of the third embodiment, instead of the optical transceivers 21aX-1 to 21aX-m including the wavelength-tunable light sources 25aX-1 to 25a-m illustrated in FIG. 9, an optical transceiver having the same configuration as the optical transceiver 21X having the single-wavelength light source 25X illustrated in FIG. 2 may be applied. A configuration without the operation devices 4, 4a, 4b, 4c and 4d as in the optical transmission system 100 illustrated in FIG. 1 may be applied to the configuration including the operation devices 4, 4a, 4b, 4c and 4d.

In the first to third embodiments and the other configuration examples of the respective embodiments, the controller 12 of the first embodiment and the transmission path designers 42, 42a. 42b, 42c, and 42d of the second and third embodiments select the configuration information for identifying the transmission mode by predetermined selection processing based on the transmission path characteristics, the desired bit rate information, and the specification information of the optical transceivers 21X, 21X-1 to 21X-m, 21aX, and 21aX-1 to 21aX-m. On the other hand, the transmission mode may be identified in the following manner.

For example, some patterns of combinations of the transmission path characteristics, the desired bit rate information, and the specification information of the optical transceivers 21X, 21X-1 to 21X-m, 21aX, and 21aX-1 to 21aX-m are selected. Configuration information for each selected pattern is selected, a transmission mode information table in which the selected configuration information is associated with each combination of the transmission path characteristics, the desired bit rate information, and the specification information of the optical transceivers 21X, 21X-1 to 21X-m. 21aX, and 21aX-1 to 21aX-m is generated in advance, and stored in advance in the internal storage areas of the controller 12 and the transmission path designers 42, 42a, 42b, 42c, and 42d. In such a configuration, instead of the processing of selecting the configuration information, the controller 12 and the transmission path designers 42, 42a, 42b, 42c, and 42d may refer to the transmission mode information table stored in the internal storage area, read the combination of pieces of configuration information corresponding to the combination of the transmission path characteristics, the desired bit rate information, and the specification information of the optical transceivers 21X. 21X-1 to 21X-m. 21aX, and 21aX-1 to 21aX-m, and generate transmission mode information including the read combination of pieces of configuration information and the source address information included in the connection request data.

Further, different numbers (hereinafter referred to as "transmission mode numbers") are given to each record of the transmission mode information table, and the transmission mode information table in which the transmission mode numbers are added is stored in advance in the internal storage areas of the controllers 12b and 12d and the controllers 71X, 71X-1 to 71X-m, 71aX, 71aX-1 to 71aX-m, 71Y, 71Y-1 to 71Y-n, 71aY, and 71aY-1 to 71aY-n, in addition to the internal storage areas of the controller 12 and transmission path designers 42, 42a, 42b, 42c, and 42d. The reason why the transmission mode information table is also stored in the internal storage areas of the controllers 12b and 12d of the connection node devices 1b and 1d is that the controllers 12b and 12d generate the switching instruction signal to be output to the output port switching unit 14a based on the central wavelength included in the transmission mode information.

The controller 12 and the transmission path designers 42, 42a, 42b, 42c, and 42d refer to the transmission mode information table stored in the internal storage area and detect a transmission mode number corresponding to the combination of the transmission path characteristics, the desired bit rate information, and the specification information of the optical transceivers 21X, 21X-1 to 21X-m, 21aX, and 21aX-1 to 21aX-m. The controller 12 and transmission path designers 42, 42a, 42b, 42c, and 42d generate transmission mode information including the detected transmission mode number and the source address information included in the connection request data.

When taking in the transmission mode information transmitted by the controller 12 and the transmission path designers 42, 42a, 42b, 42c, and 42d, the controllers 12b and 12d and the controllers 71X, 71X-1 to 71X-m, 71aX, 71aX-1 to 71aX-m, 71Y. 71Y-1 to 71Y-n. 71a Y, and 71aY-1 to 71aY-n refer to the transmission mode information table in the internal storage area and read the configuration information corresponding to the transmission mode number included in the taken-in transmission mode information. By such a procedure, the controllers 12b, 12d and the controllers 71X, 71X-1 to 71X-m, 71aX, 71aX-1 to 71aX-m. 71Y, 71Y-1 to 71Y-n. 71aY, and 71aY-1 to 71aY-n may be notified of the transmission mode identified using the transmission mode number.

In the second and third embodiments and the other configuration examples of the respective embodiments, the transmission path designers 42, 42a, 42b, 42c, and 42d calculate the end-to-end transmission path characteristics between the source and the destination based on the connection information received from the connection node devices 1a, 1b, 1c, 1d, and 1e and the transmission path information of the optical transmission paths 52 and 52-i corresponding to the destination address information included in the connection request data. On the other hand, the following configuration may be employed.

The controllers 12a, 12b, 12c, 12d, and 12e of the connection node devices 1a, 1b, 1c, 1d, and 1e calculate the transmission path characteristics based on the connection information of the optical transmission paths 51 and 51-1 to 51-m, and transmit the calculated transmission path characteristics to the operation devices 4, 4a, 4b, 4c, and 4d instead of the connection information. The transmission path designers 42, 42a, 42b, 42c, and 42d of the operation devices 4, 4a, 4b, 4c, and 4d calculate the transmission path characteristics of the optical transmission paths 52, 52-1-52-n corresponding to the destination address information included in the connection request data based on the transmission path information of the optical transmission paths 52 and 52-1 to 52-n stored in the internal storage area or the transmission path information of the optical transmission paths 52 and 52-1 to 52-n acquired on demand. The transmission path designers 42, 42a, 42b, 42c, and 42d may calculate the approximate end-to-end transmission path characteristics based on the transmission path characteristics received from the controllers 12a, 12b, 12c, 12d, and 12e and the transmission path characteristics calculated based on the transmission path information of the optical transmission paths 52 and 52-i. The transmission path designers 42, 42a, 42b, 42c, and 42d may be configured as follows rather than calculating the transmission path characteristics of the optical transmission paths 52 and 52-1 to 52-n based on the transmission path information of the optical transmission paths 52 and 52-1 to 52-n. The transmission path designers 42, 42a, 42b, 42c, and 42d calculate the transmission path characteristics of the optical transmission paths 52 and 52-1 to 52-n based on the transmission path information of the optical transmission paths 52 and 52-1 to 52-n in advance, and store the calculated transmission path characteristics of the optical transmission paths 52 and 52-1 to 52-n in an internal storage area in advance. With such a configuration, instead of the processing of calculating the transmission path characteristics of the optical transmission paths 52 and 52-1 to 52-n, the transmission path designers 42, 42a, 42b, 42c, and 42d can acquire the transmission path characteristics of the optical transmission paths 52 and 52-1 to 52-n by performing processing of reading the transmission path characteristics of the optical transmission paths 52 and 52-1 to 52-n from the internal storage area.

In the first to third embodiments and other configuration examples of the respective embodiments, the output port switching unit. 14 includes two optical switches 15T and 15R, and the output port switching unit 14a includes two optical switches 15aT and 15aR. On the other hand, the output port switching units 14 and 14a may be provided with one optical switch, and the port may be divided into a port for the transmission direction and a port for the reception direction by the port setting in one optical switch.

For example, WSS, a fiber patch panel, or the like is applied as the output port switching unit 14a. On the other band, AWG (Arrayed Waveguide grating) may be applied as the output port switching unit 14a. For example, an AWG is applied to the output port switching unit 14a of the optical transmission system 102b illustrated in FIG. 15, a wavelength path of 1,530 nm or more and less than 1,540 nm is output to the connection information processor 13b, and a wavelength path of 1,540 nm or more and less than 1,560 om is output to the optical transmission path 52. The controller 12d transmits information indicating that the connection node device 1d has an AWG as the output port switching unit 14a and information indicating a wavelength path preset in the AWG to the operation device 4c together with the connection information and the like. The transmission path designer 42c of the operation device 4c generates transmission mode information by adding information indicating that the AWG is provided and information indicating a wavelength path preset in the AWG received from the controller 12*d*. Thus, by applying the AWG to the output port switching unit 14*a*, the optical transceivers 21*a*X-1 to 21*a*X-m can switch to the optical transmission path 52 from the connection to the connection node device 1*d* by changing the wavelengths of the wavelength-tunable light sources 25*a*X-1 to 25*a*X-m provided therein according to the transmission mode information. Therefore, the controller 12*d* does not need to output the switching instruction signal to the output port switching unit 14*a*.

Fourth Embodiment

Figure 17:
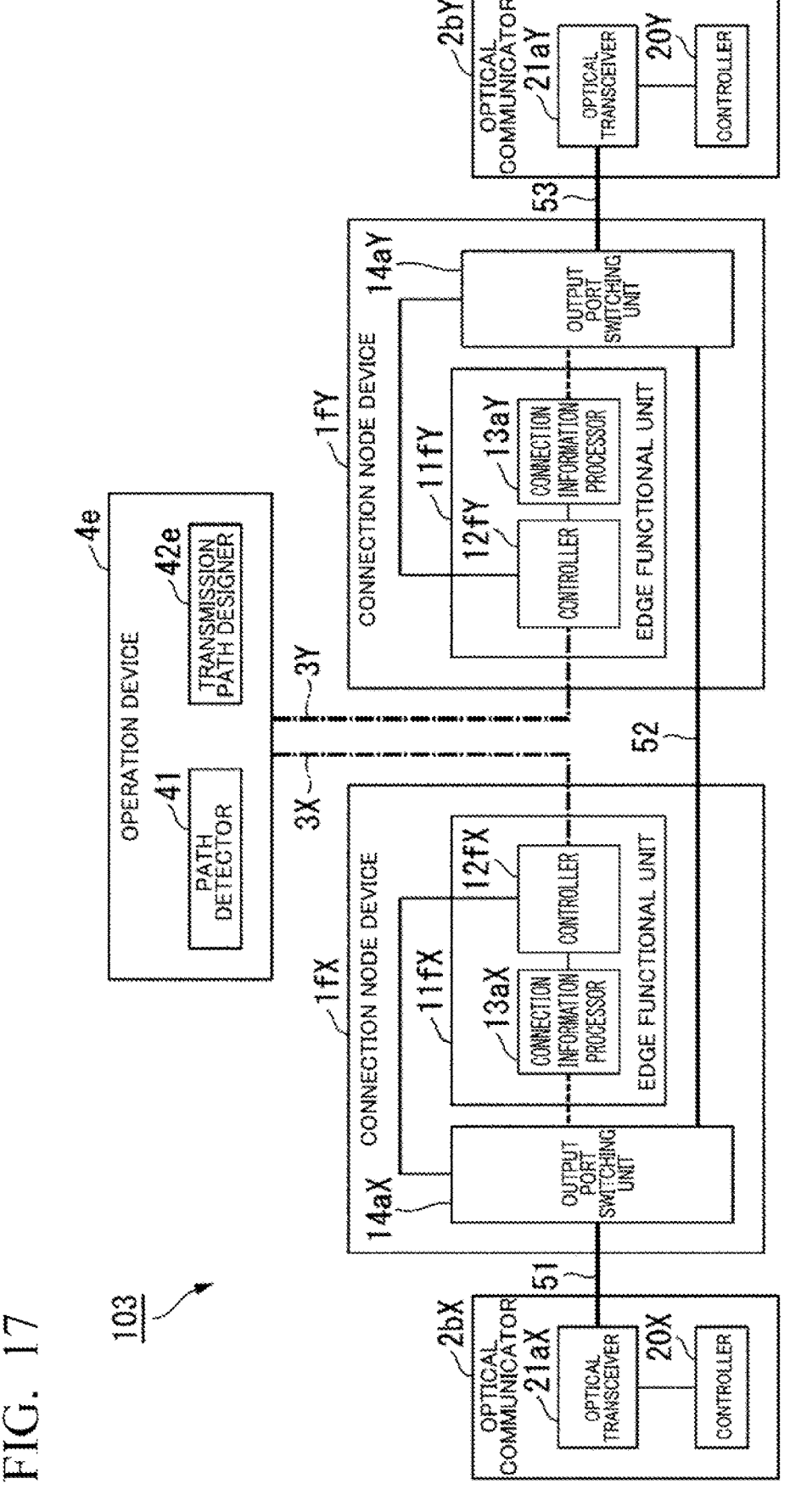
FIG. 17 is a block diagram illustrating the configuration of the optical transmission system according to a fourth embodiment.

FIG. 17 is a block diagram illustrating the configuration of an optical transmission system 103 according to a fourth embodiment. In the fourth embodiment, the same reference numerals are assigned to the same configurations as in the first to third embodiments, and the different configurations will be described below. The optical transmission system 103 includes optical communicators 2*b*X, 2*b*Y, connection node devices 1*f*X and 1*f*Y, an operation device de, an optical transmission path 51 for connecting the optical transceiver 21*a*X of the optical communicator 2*b*X and the output port switching unit 14*a*X of the connection node device 1*f*X, an optical transmission path 53 for connecting the optical transceiver 21*a*Y of the optical communicator 2*b*Y and the output port switching unit 14*a*Y of the connection node device 1*f*Y, an optical transmission path 52 for connecting the output port switching unit 14*a*X of the connection node device 1*f*X and the output port switching unit 14*a*Y of the connection node device 1*f*Y, a connection line 3X for connecting the connection node device 1*f*X and the operation device 4*e*, and a connection line 3Y for connecting the connection node device 1*f*Y and the operation device 4*e*. Here, the optical transmission path 52 is, for example, an optical transmission path constituting a carrier network owned by a telecommunication carrier, and the optical transmission paths 51 and 53 are, for example, dark fibers. The optical communicators 2*b*X and 26Y are, for example, communicators used by a user.

The optical transceivers 21*a*X and 21*a*Y provided in the optical communicators 2*b*X and 2*b*Y have the same configuration as the optical transceiver 21*a*X-1 of the optical transmission system 102 illustrated in FIG. 8. Hereinafter, when the functional units provided in the optical transceivers 21*a*X and 21*a*Y are indicated, branch numbers "X-1" of the reference numerals of the respective functional units provided in the optical transceiver 21*a*X-1 are replaced with "X" and "Y", respectively.

The output port switching units 14*a*X and 14*a*Y provided in the connection node devices 1*f*X and 1*f*Y have the same configuration as the output port switching unit 14*a* of the connection node device 1*b* of the optical transmission system 102 illustrated in FIG. 8. Hereinafter, when the functional units provided in the output port switching units 14*a*X and 14*a*Y are indicated, the signs "a" of the respective functional units provided in the output port switching unit. 14*a* are replaced with "aX" and "aY", respectively.

The connection information processors 13*a*X and 13*a*Y have the same configuration as the connection information processor 13*a* of the connection node device 1*b* of the optical transmission system 102 illustrated in FIG. 8. Hereinafter, when the functional units provided in the connection information processors 13*a*X and 13*a* Y are indicated, the branch numbers "a" of the reference numerals of the respective functional units provided in the connection information processor 13*a* are replaced with "aX" and "aY", respectively.

The controllers 12*f*X and 12Y provided in the connection node devices 1X and 1*f*Y have the following configuration in addition to the configuration provided in the controller 12*b* of the connection node device 1*b* of the optical transmission system 102 illustrated in FIG. 8. The connection node devices 1*f*X and 1*f*Y are assigned in advance with identification information for identifying them. The controller 12*f*X stores the identification information for identifying the connection node device 1*f*X in an internal storage area in advance. When transmitting the connection information and the connection request data to the operation device 4*e*, the controller 12*f*X adds the identification information for identifying the connection node device 1*f*X stored in the internal storage area to the connection information and the connection request data and transmits the same to the operation device 4*e*. Similarly, the controller 12*f*Y stores the identification information for identifying the connection node device 1*f*Y in an internal storage area in advance. When transmitting the connection information and the connection request data to the operation device de, the controller 12*f*Y adds the identification information for identifying the connection node device HY stored in the internal storage area to the connection information and the connection request data and transmits the same to the operation device 4*e*.

The operation device 4*e* includes a path detector 41 and a transmission path designer 42*e*. The transmission path designer 42*e* stores the transmission path information of the optical transmission path 52 in advance in association with the identification information for identifying the optical transmission path 52 in an internal storage area. The transmission path designer 42*e* may calculate the transmission path information of the optical transmission path 52 by predetermined calculation based on an optical signal transmitted by the optical transmission path 52 and store it in an internal storage area in advance, and may acquire the transmission path information from an external device on demand at a specific timing such as when a network is constructed. The transmission path information of the optical transmission path 52 may be obtained in advance by a method other than the predetermined calculation.

The transmission path designer 42*e* stores information indicating free resources of the optical transmission path 52 in an internal storage area in advance. Here, the information indicating the free resources includes, for example, information indicating a wavelength, a wavelength band, or an optical transmission path which is not used for communication when determining the free state of resources. It is assumed that the information indicating the free resources stored in the internal storage area of the transmission path designer 42*e* is updated by the transmission path designer 42*e* whenever the communication path is established. The transmission path designer 42*e* stores a connection line table in an internal storage area in which the identification information for identifying the connection node device 1X is associated with the connection line 3X, and the information for identifying the connection node device 1Y is associated with the connection line 3Y.

The transmission path designer 42*e* stores a connection status table 43 illustrated in FIG. 18 in an internal storage area. The record format of the connection status table 43 includes items of "source address information", "destination address information", "connection node device", "destination optical transmission path", and "received data". The source address information included in the connection request data is written in the item of "source address information". The destination address information included in the connection request data is written in the item of "destination address information".

The identification information for identifying the connection node devices 11X and HY received by the transmission path designer 42e together with the connection request data is written in the item of "connection node device". The identification information for identifying the optical transmission path 52 corresponding to the destination address information included in the connection request data detected by the path detector 41 is written in the item of "destination optical transmission path". The connection information received by the transmission path designer 42e and the connection request data are written in the item of "received data".

In order to connect the optical transceiver 21aX and the optical transceiver 21aY, the transmission path designer 42e refers to the connection status table 43 to calculate the transmission path characteristics of the optical transmission path reaching the optical transmission path 53 from the optical transmission path 51 through the optical transmission path 52. The transmission path designer 42e identifies the transmission mode to be applied to the optical transmitters 24aX and 24a Y based on the calculated transmission path characteristics.

Processing in Optical Transmission System of Fourth Embodiment

Figure 19:
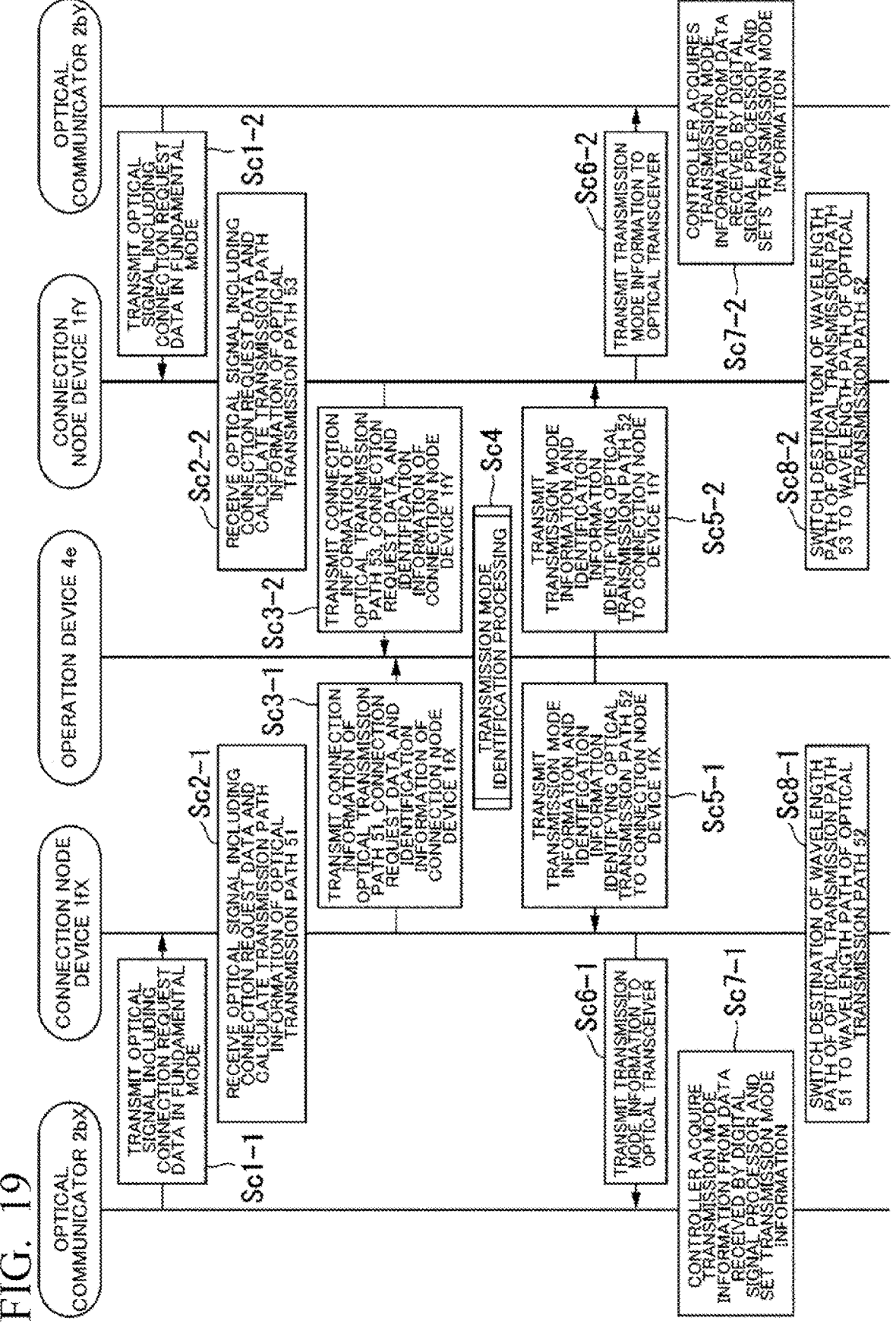
FIG. 19 is a diagram illustrating the processing flow of the optical transmission system according to the fourth embodiment.

Next, processing of the optical transmission system 103 of the fourth embodiment will be described with reference to FIGS. 19 and 20. FIG. 19 is a flowchart illustrating the processing flow in the optical transmission system 103 of the fourth embodiment. In the initial state, the output port switching unit 14aX of the connection node device 1/X connects the wavelength path of the fundamental wavelength of the optical transmission path 51 to the connection information processor 13aX of the edge functional unit 11/X of the connection node device 1/X. In the initial state, the output port switching unit 14aY of the connection node device 1/Y connects the wavelength path of the fundamental wavelength of the optical transmission path 53 to the connection information processor 13aY of the edge functional unit 11/Y of the connection node device 1/Y.

In the following description, the processing in which the optical transceiver 21aX provided in the optical communicator 2bX connects to the optical transceiver 21aY of the optical communicator 2bY as a destination and the optical transceiver 21aY provided in the optical communicator 2bY connects to the optical transceiver 21aX of the optical communicator 2bX as a destination will be described.

The controller 20X of the optical communicator 2bX generates a connection request instruction signal including the address information of the optical transceiver 21aY and a desired bit rate in order to connect to the optical transceiver 21aY provided in the optical communicator 2bY. The controller 20X outputs the generated connection request instruction signal to the controller 71aX of the optical transceiver 21aX. The controller 71aX takes in the connection request signal output by the controller 20X, and sets address information of the optical transceiver 21aY included in the taken-in connection request signal as a destination address. The controller 71aX uses address information of the optical transceiver 21aX stored in the internal storage area as source address information. The controller 71aX generates connection request data including the destination address information and the source address information, a desired bit rate included in the connection request instruction signal, and the specification information of the optical transceiver 21aX stored in the internal storage area. Thereafter, the same processing as step Sb2 in FIG. 10 is performed by the optical transceiver 21aX of the optical communicator 2bX (step Sc1-1).

The controller 20Y of the optical communicator 2bY generates a connection request instruction signal including the address information of the optical transceiver 21aX and a desired bit rate in order to connect to the optical transceiver 21aX provided in the optical communicator 2bX. The controller 20Y outputs the generated connection request instruction signal to the controller 71aY of the optical transceiver 21aY. The controller 71aY takes in the connection request signal output by the controller 20Y, and sets address information of the optical transceiver 21aX included in the taken-in connection request signal as a destination address. The controller 71aY uses address information of the optical transceiver 21aY stored in the internal storage area as source address information. The controller 71aY generates connection request data including the destination address information and the source address information, a desired bit rate included in the connection request instruction signal, and the specification information of the optical transceiver 21aY stored in the internal storage area. Thereafter, the same processing as step Sb2 in FIG. 10 is performed by the optical transceiver 21aY of the optical communicator 2bY (step Sc1-2).

In step Sc2-1, the same processing as step Sb3 in FIG. 10 is performed in the output port switching unit 14aX and the connection information processor 13aX of the connection node device 11X. Here, the transmission path information calculated by the connection information generator 38aX of the connection node device 1/X is the transmission path information of the optical transmission path 51, and the connection information generator 38aX generates connection information of the optical transmission path 51. In step Sc2-2, the same processing as step Sb3 of FIG. 10 is performed by the output port switching unit 14aY and the connection information processor 13aY of the connection node device 1/Y. Here, the transmission path information calculated by the connection information generator 38aY of the connection node device 1/Y is the transmission path information of the optical transmission path 53, and the connection information generator 38aY generates the connection information of the optical transmission path 53.

The controller 12/X takes in the connection information of the optical transmission path 51 output by the connection information generator 38aX and the connection request data. The controller 12/X transmits the taken-in connection information of the optical transmission path 51, the taken-in connection request data, and the identification information for identifying the connection node device 1/X stored in the internal storage area to the operation device 4e through the connection line 3X (step Sc3-1). The controller 12/Y takes in the connection information of the optical transmission path 53 output by the connection information generator 38a Y and the connection request data. The controller 12Y transmits the taken-in connection information of the optical transmission path 53, the taken-in connection request data, and the identification information for identifying the connection node device 1/Y stored in the internal storage area to the operation device 4e through the connection line 3Y (step Sc3-2).

The operation device 4e performs transmission mode identification processing (step Sc4). FIG. 20 is a flowchart illustrating the flow of processing of a subroutine of transmission mode identification processing. Hereinafter, the processing when, after the processing of step Sc3-1, the operation device 4e receives the connection information of the optical transmission path 51 transmitted by the controller 12fX of the connection node device 11X, and the identification information for identifying the connection node device 1fX will be described.

The path detector 41 of the operation device 4e receives the connection request data transmitted by the controller 12fX of the connection node device 1fX and the identification information for identifying the connection node device 11X. The path detector 41 refers to the path information table stored in the internal storage area or the path information table acquired on demand, and detects destination address information included in the received connection request data, in this case, the identification information for identifying the optical transmission path 52 corresponding to the address information of the optical transceiver 21aY. The path detector 41 outputs the detected identification information for identifying the optical transmission path 52 and the received identification information for identifying the connection node device LIX to the transmission path designer 42e.

The transmission path designer 42e receives the connection information of the optical transmission path 51 transmitted by the controller 121X of the connection node device 11X, the connection request data, and the identification information for identifying the connection node device 1fX. The transmission path designer 42e takes in the identification information for identifying the optical transmission path 52 output by the path detector 41 and the identification information for identifying the connection node device 1fX. In this case, the combination of the connection information of the optical transmission path 51 received by the transmission path designer 42e from the controller 12fX of the connection node device 1fX, the connection request data, and the identification information for identifying the connection node device 1fX and the combination of the identification information for identifying the optical transmission path 52 taken in by the transmission path designer 42e as an output of the path detector 41 and the identification information for identifying the connection node device 1fX match each other in that the combinations are the identification information for identifying the connection node device 1fX. Therefore, the transmission path designer 42e determines that the combinations are in a correspondence relation, and performs the following processing based on the connection information of the optical transmission path 51, the identification information for identifying the optical transmission path 52 and the identification information for identifying the connection node device 1fX.

The transmission path designer 42e generates one new record in the connection status table 43 stored in the internal storage area. The transmission path designer 42e writes the source address information included in the received connection request data, in this case, the address information of the optical transceiver 21aX in the item of "source address information" of the generated record. The transmission path designer 42e writes the destination address information included in the received connection request data, in this case, the address information of the optical transceiver 21aY, in the item of "destination address information" of the record.

The transmission path designer 42e writes the identification information for identifying the connection node device 1fX in the item of "connection node device" of the record. The transmission path designer 42e writes the identification information for identifying the optical transmission path 52 taken in as the output of the path detector 41 in the item of "destination optical transmission path" of the record. The transmission path designer 42e writes the received connection information of the optical transmission path 51 and the connection request data in the item of "received data" of the record.

For example, when the processing of step Sd1 executed due to the processing of step Sc3-1 in FIG. 19 is completed earlier than the processing of step Sd1 executed due to the processing of step Sc3-2, the record related to the optical transceiver 21aY of the optical communicator 2bY is not generated in the connection status table 43 of the transmission path designer 42e at the time of completion of the processing of step Sd1 executed due to the processing of step Sc3-1. On the other hand, when the processing of step Sd1 executed due to the processing of step Sc3-2 is completed earlier than the processing of step Sd1 executed due to the processing of step Sc3-1, the record related to the optical transceiver 21aY of the optical communicator 2bY is generated in the connection status table 43 of the transmission path designer 42e at the time of completion of the processing of step Sd1 executed due to the processing of step Sc3-1.

In order to determine which of these states is, the transmission path designer 42e refers to the connection status table 43, determines whether there is a record in which the address information of the optical transceiver 21aY written in the item of "destination address information" of a newly generated record is written in the item of "source address information", and adds "1" to the value of a processing number counter provided in the internal storage area. Here, the initial value of the processing number counter is "0" (step Sd2).

The transmission path designer 42e determines that there is no record in which the address information of the optical transceiver 21aY written in the item of "destination address information" of a newly generated record is written in the item of "source address information" (step Sd2: No). In this case, the processing of step Sd1 executed due to step Sc3-2 is not completed. Therefore, the transmission path designer 42e waits for a predetermined time until a record related to the optical transceiver 21aY of the optical communicator 2b Y is generated in the connection status table 43 (step Sd3).

When it is determined that there is a record in which the address information of the optical transceiver 21aY written in the item of "destination address information" of a newly generated record is written in the item of "source address information" (step Sd2: Yes), the transmission path designer 42e determines whether the value of the processing number counter stored in the internal storage area is "2" or more (step Sd4).

The reason for performing the determination processing in step Sd4 is to stop either one of the transmission mode identification processing in step Sc4 related to the optical transceiver 21aX of the optical communicator 2bX performed after the processing in step Sc3-1 or the transmission mode identification processing in step Sc4 related to the optical transceiver 21aY of the optical communicator 2bY performed after the processing in step Sc3-2 so that both steps of processing are not executed in parallel. When the value of the processing number counter is "1", it means that the determination processing of step Sd2 is performed only once, and in the determination processing, the record is generated by the preceding transmission mode identification processing of step Sd1, in the connection status table 43. Therefore, in this case, the preceding transmission mode identification processing is preferentially performed, and the succeeding transmission mode identification processing is stopped.

When it is determined that the value of the processing number counter stored in the internal storage area is not equal to or more than "2" (step Sd4: No), the transmission path designer 42*e* terminates the processing. On the other hand, when it is determined that the value of the processing number counter stored in the internal storage area is "2" or more (step Sd4: Yes), the transmission path designer 42*e* performs the following determination processing.

The transmission path designer 42*e* determines whether two connection target records stored in the connection status table 43, that is, a record in which the address information of the optical transceiver 21*a*X is written in the item of "source address information" and a record in which the address information of the optical transceiver 21*a*Y written in the item of "destination address information" of the record is written in the item of "source address information" satisfy connection conditions (step Sd5). Here, the connection conditions are, for example, that in the two connection target records stored in the connection status table 43, the address information written in the item of "source address information" in one record matches the address information written in the item of "destination address information" of the other record, and the contents of the item of "destination optical transmission path" match each other.

In this case, the address information of the optical transceiver 21*a*Y is written in the item of "destination address information" of the record in which the item of "source address information" is the address information of the optical transceiver 21*a*X. Further, the address information of the optical transceiver 21*a*X is written in the item of "destination address information" of the record in which the item of "source address information" is the address information of the optical transceiver 21*a*Y. Therefore, the first connection condition that the address information written in the item of "source address information" in one record matches the address information written in the item of "destination address information" of the other record is satisfied. The identification information for identifying the optical transmission path 52 is written in the item of "destination optical transmission path" of the record in which the item of "source address information" is the address information of the optical transceiver 21*a*X, and the identification information for identifying the optical transmission path 52 is written in the item of "destination optical transmission path" of the record in which "source address information" is the address information of the optical transceiver 21*a*Y. Therefore, the second connection condition that the contents of the item of "destination optical transmission path" match each other is also satisfied.

Therefore, the transmission path designer 42*e* determines that the connection conditions are satisfied (step Sd5: Yes). The transmission path designer 42*e* reads the connection information of the optical transmission path 51 from the item of "received data" of the record in which "source address information" is the address information of the optical transceiver 21*a*X. The transmission path designer 42*e* reads the connection information of the optical transmission path 53 from the item of the "reception data" of the record in which "source address information" is the address information of the optical transceiver 21*a* Y.

The transmission path designer 42*e* reads and acquires the transmission path information of the optical transmission path 52 from the internal storage area, or acquires the transmission path information of the optical transmission path 52 on demand. The transmission path designer 42*e* calculates the transmission path characteristics using a transmission design tool such as GNPy provide therein, for example, based on the read connection information of the optical transmission path 51 and the read connection information of the optical transmission path 53 and the acquired the transmission path information of the optical transmission path 52 (step Sd6).

The transmission path designer 42*e* selects the configuration information by predetermined selection processing based on the calculated transmission path characteristics, information indicating free resources of the optical transmission path 52 corresponding to the destination address information stored in the internal storage area and detected by the path detector 41, and the desired bit rate information and the specification information of the optical transceivers 21*a*X and 21*a*Y included in the connection request data written in the item of "received data" of the record in which the item of "source address information" is the address information of the optical transceiver 21*a*X and the record in which the item of "source address information" is the address information of the optical transceiver 21*a*Y. The transmission path designer 42*e* generates transmission mode information including the selected configuration information and the source address information included in the connection request data (step Sd7), and returns to the processing of the flowchart illustrated in FIG. 19.

On the other hand, when it is determined that the connection conditions are not satisfied (step Sd5: No), the transmission path designer 42*e* notifies the outside of the fact that the connection cannot be performed, and terminates the processing.

The transmission path designer 42*e* refers to the connection line table stored in the internal storage area, and transmits the generated transmission mode information and the identification information for identifying the optical transmission path 52 detected by the path detector 41 to the controller 12*f*X of the connection node device 1*f*X through the connection line 3X (step Sc5-1). The transmission path designer 42*e* refers to the connection line table stored in the internal storage area, and transmits the generated transmission mode information and the identification information for identifying the optical transmission path 52 detected by the path detector 41 to the controller 12*f*Y of the connection node device 1*f*Y through the connection line 3Y (step Sc5-2). The processing of steps Sc5-1 and Sc5-2 may be performed in parallel and may be performed in the order of steps Sc5-1 and Sc5-2 or in the reverse order.

Thereafter, in the connection node device 1*f*X, the same processing as step Sb9-2 in FIG. 10 is performed in the edge functional unit 11*f*X and the output port switching unit 14*a*X (step Sc6-1), and the same processing as step Sb10 is performed in the optical transceiver 21*a*X of the optical communicator 2*b*X (step Sc7-1). In the connection node device 1*f*Y, the same processing as step Sb9-2 in FIG. 10 is performed in the edge functional unit 11*f*Y and the output port switching unit 14*a*Y (step Sc6-2), and the same processing as step Sb10 is performed in the optical transceiver 21*a*Y of the optical communicator 2*b*Y (step Sc7-2).

The controller 12*f*X of the connection node device 1*f*X performs the same processing as step Sb11 in FIG. 10, that is, the switching processing of connecting the wavelength path of the central wavelength designated by the transmission mode information, which is the wavelength path of the optical transmission path 52 corresponding to the identification information for identifying the received optical transmission path 52 and the wavelength path of the central wavelength designated by the transmission mode information, which is the wavelength path of the optical transmission path 51 (step Sc8-1). The controller 12/Y of the connection node device 1/Y performs the same processing as step Sb11 in FIG. 10, that is, the switching processing of connecting the wavelength path of the central wavelength designated by the transmission mode information, which is the wavelength path of the optical transmission path 52 corresponding to the identification information for identifying the received optical transmission path 52 and the wavelength path of the central wavelength designated by the transmission mode information, which is the wavelength path of the optical transmission path 53 (step Sc8-2). Thus, the optical transceiver 21aX and the optical transceiver 21aY are connected by the wavelength path of the central wavelength designated by the transmission mode information, which is the wavelength path included in the optical transmission path 51, the optical transmission path 52, and the optical transmission path 53.

As for the timing at which steps Sc8-1 and Sc8-2 are performed, any one of the following methods may be used. The methods include a method of performing the processing of steps Sc8-1 and Sc8-2 after the above-mentioned pre-measured time has elapsed, a method of performing the processing of steps Sc8-1 and Sc8-2 at the timing of receiving information indicating that the reception of the transmission mode information has been completed, and a method of performing the processing of steps Sc8-1 and Sc8-2 upon receiving a notification that the optical output in the fundamental mode has stopped In the optical transmission system 103, the configuration of the transmission mode information table may be applied, or the configuration for notifying the optical transceivers 21aX and 21aY and the controllers 12/X and 12/Y of the connection node devices 11X and 1/Y of the transmission mode identified by the transmission mode number may be applied.

In the configuration of the fourth embodiment, the operation device 4e is connected to the connection node device 1X and the connection node device 1/Y, reads and acquires transmission path information of the optical transmission path 52 which is a second optical transmission path stored in the internal storage area from the internal storage area, or acquires the transmission path information of the optical transmission path 52 on demand, identifies the transmission mode based on the acquired the transmission path information of the optical transmission path 52, the connection information of the optical transmission path 51 which is a first optical transmission path, which the connection information processor 13aX of the connection node device 1X acquires from an optical signal transmitted by the optical transceiver 21aX provided in the optical communicator 2bX which is a first optical communicator, the connection request data included in the optical signal transmitted by the optical transceiver 21aX provided in the optical communicator 2bX, the connection information of the optical transmission path 53 which is a third optical transmission path, which the connection information processor 13aY of the connection node device 1/Y acquires from the optical signal transmitted by the optical transceiver 21aY provided in the optical communicator 2bY which is a second optical communicator, and the connection request data included in the optical signal transmitted by the optical transceiver 21a Y provided in the optical communicator 2bY, and transmits the transmission mode information indicating the identified transmission mode to the controller 12X of the connection node device 1/X and the controller 12/Y of the connection node device 1/Y. The output port switching unit 14aX of the connection node device 11X performs switching processing after the controller 12/X transmits the transmission mode information to the optical transceiver 21aX through the optical transmission path 51, and the output port switching unit 14aY of the connection node device 1/Y performs switching processing after the controller 12/Y transmits the transmission mode information to the optical transceiver 21aY of the optical communicator 2b Y through the optical transmission path 53. Thus, the optical transceiver 21aX provided in the optical communicator 2bX and the optical transceiver 21aY provided in the optical communicator 2bY are connected through the optical transmission path 51, the optical transmission path 52 and the optical transmission path 53. The optical transceiver 21aX provided in the optical communicator 2bX receives the transmission mode information received from the operation device 4e by the controller 12/X of the connection node device 11X and transmitted to the optical transmission path 51, and transmits and receives an optical signal through the optical transmission path 51 according to the transmission mode indicated by the received transmission mode information. The optical transceiver 21aY provided in the optical communicator 2bY receives the transmission mode information received from the operation device 4e by the controller 12/Y of the connection node device 1/Y and transmitted to the optical transmission path 53, and transmits and receives an optical signal through the optical transmission path 53 according to the transmission mode indicated by the received transmission mode information. Thus, when the optical transceivers 21aX and 21aY provided in the optical communicators 2bX and 2bY are connected through the plurality of optical transmission paths 51, 52 and 53, the optical transceivers 21aX and 21aY can be connected through the optical path of the optimum transmission mode without manual intervention. Therefore, the cost and time required for setting the optical path can be reduced.

Figure 20:
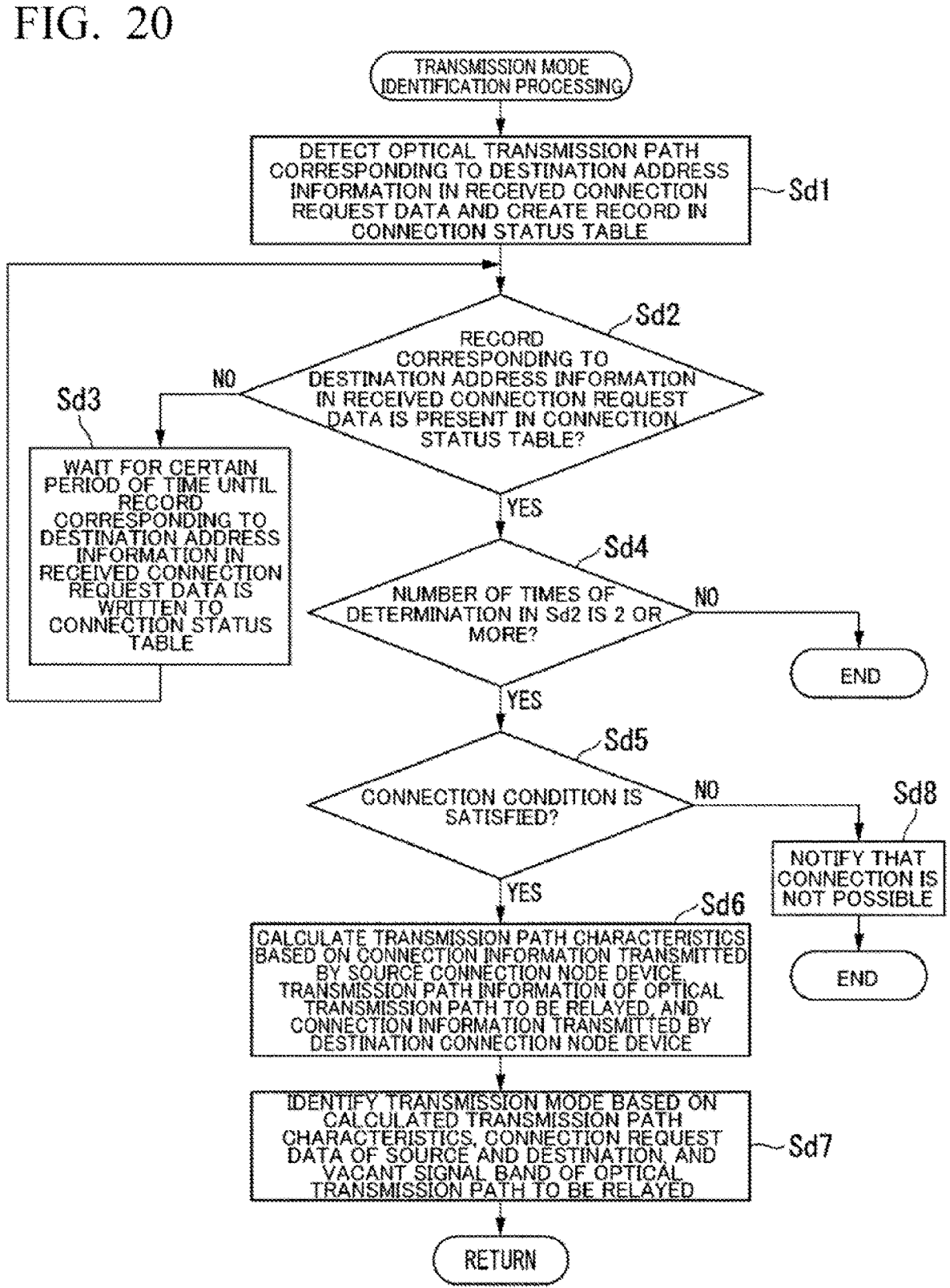
FIG. 20 is a diagram illustrating the flow of transmission mode identification processing in the fourth embodiment.

In addition, in step Sd8 illustrated in FIG. 20 of the fourth embodiment, in addition to notifying the outside of the fact that the connection is not possible, the optical transceiver 21aX of the optical communicator 2bX and the optical transceiver 21aY of the optical communicator 2bY may be notified of the fact that the connection is not possible through the wavelength path of the fundamental wavelength.

Another Configuration Example (Part 1) of Fourth Embodiment

Although the optical transmission system 103 of the fourth embodiment includes two connection node devices 1/X and 1/Y, the optical transmission system may include a larger number of connection node devices having the same configuration (hereinafter referred to as connection node devices 1f-1 to 1f-k, and the connection lines connected to the connection node devices 1f-1 to 1f-k are denoted as 3-1 to 3-k, where k is an integer of 3 or more). It is assumed that a plurality of optical transceivers, that is, functional units having the same configuration as the optical transceivers 21aX and 21aY, are connected to each of the connection node devices 1f-1 to 1f-k, for example, in the form illustrated in the second and third embodiments and the other configuration examples of the respective embodiments. In this case, it is assumed that the transmission path designer 42e of the operation device 4c receives, for example, the connection information of the optical transmission path to which the connection node device 1f-1 is connected, transmitted by the controller 12f-1 of the connection node device 1f-1, the connection request data for requesting connection to an optical transceiver provided in an optical communicator connected to any one of the connection node devices 1*f*-2 to 1*f-k*, and the identification information for identifying the connection node device 1X-1.

The transmission path designer 42*e* starts transmission mode identification processing of step Sc4 of FIG. 19, and waits for a predetermined time as illustrated in the processing of step Sd3 of FIG. 20 when a record related to an optical transceiver provided in a destination optical communicator is not generated in the connection status table 43. If a record related to an optical transceiver provided in a destination optical communicator is not generated in the connection status table 43 even after the predetermined time is waited for, the connection node devices 1*f*-2 to 1*f-k* may have failed to transmit connection information and the like. In preparation for such a case, the transmission path designer 42*e* of the operation device 4*e* may transmit a trigger signal for transmitting the connection information and the like to all the connection node devices 1*f*-2 to 1*f-k* other than the connection node device 1*f*-1 through the connection lines connected to each of the connection node devices 1*f*-2 to 1*f-k* so that the connection information and the like are retransmitted by the connection node devices 1*f*-2 to 1*f-k*.

Another Configuration Example (Part 2) of Fourth Embodiment

For example, it is assumed that the optical transceiver 21*a*X of the optical communicator 2*b*X of the fourth embodiment transmits the connection request data with the optical transceiver 21*a*Y of the optical communicator 2*b*Y as a destination, and the controller 12*f*Y of the connection node device 1*f*Y receives a trigger signal for retransmitting the connection information and the like transmitted by the transmission path designer 42*e* of the operation device 4*e*. The controller 12Y transmits a transmission path information acquisition instruction signal for allowing all the optical communicators connected to the connection node device 1*f*Y in the fundamental mode to acquire the transmission path information by communication in the fundamental mode. Here, the following description will be made on the assumption that only one optical communicator 2*b*Y is connected to the connection node device 1*f*Y as illustrated in FIG. 17, for example.

The photodetector 28Y of the optical receiver 27Y of the optical transceiver 21*a*Y provided in the optical communicator 2*b*Y receives an optical signal including a transmission path information acquisition instruction signal transmitted by the optical transmission path 53, converts the received optical signal into a reception data signal of an electric signal, and outputs it to the digital signal processor 23*a*Y. The digital signal processor 23*a*Y takes in the reception data signal output from the photodetector 28Y, reads the transmission path information acquisition instruction signal from the taken-in reception data signal, and outputs the read transmission path information acquisition instruction signal to the controller 71*a*Y. When the controller 71*a*Y takes in the transmission path information acquisition instruction signal output by the digital signal processor 23*a* Y, the controller 71*a*Y acquires information related to the optical transmission path 53 from the reception data signal taken in by the digital signal processor 23*a*Y. Here, the information related to the optical transmission path 53 may be the transmission path information of the optical transmission path 53 calculated by predetermined calculation by the controller 71*a*Y based on the reception data signal taken in by the digital signal processor 23*a* Y, and may be the information necessary for calculating the transmission path information of the optical transmission path 53.

The controller 71*a*Y outputs the acquired information related to the optical transmission path 53 to the digital signal processor 23*a*Y in order to transmit the information to the connection node device 1*f*Y. When the controller 71*a*Y has connection request data whose connection is suspended, the controller 71*a*Y outputs the connection request data again to the digital signal processor 23*a*Y together with the calculated transmission path information of the optical transmission path 53.

In this case, the connection information generator 38*a*Y of the connection node device 1*f*Y can acquire the connection information of the optical transmission path 53 based on the information related to the optical transmission path 53 transmitted by the optical communicator 2*b* Y instead of the processing of calculating the transmission path information of the optical transmission path 53. More specifically, when the information related to the optical transmission path 53 is the transmission path information of the optical transmission path 53, the connection information generator 38*a* Y can acquire the transmission path information of the optical transmission path 53 without performing the processing of calculating the transmission path information of the optical transmission path 53. When the information related to the optical transmission path 53 is information necessary for calculating the transmission path information related to the optical transmission path 53, the transmission path information of the optical transmission path 53 can be acquired by calculating the transmission path information of the optical transmission path 53 by predetermined calculation.

Farther, when the destination address information included in the connection request data to be transmitted again by the controller 71*a*Y of the optical transceiver 21*a*Y is the address information of the optical transceiver 21*a*X of the optical communicator 2*b*X, the optical transceiver 21*a*X and the optical transceiver 21*a*Y can be connected by a trigger signal. Thus, the transmission path designer 42*e* of the operation device 4*e* can actively acquire the transmission path information of the optical transmission path 53 and the connection request data from the optical transceiver 21*a*Y of the optical communicator 2*b*Y and connect the optical transceiver 21*a*X and the optical transceiver 21*a*Y by transmitting a trigger signal rather than waiting for a predetermined time in the processing of step Sd3 of FIG. 20.

The transmission path information of the optical transmission path 53 calculated by the controller 71*a*Y of the optical transceiver 21*a*Y and the transmission path information of the optical transmission path 53 calculated by predetermined calculation based on information required for calculating the transmission path information of the optical transmission path 53 by the connection information generator 38*a* Y of the connection node device 1*f*Y are the transmission path information of the optical transmission path 53 in the direction from the connection node device 1*f*Y to the optical communicator 2*b*Y. On the other hand, in the fourth embodiment, the transmission path information of the optical transmission path 53 calculated by the connection information generator 38*a*Y of the connection node device 1*f*Y is the transmission path information of the optical transmission path 53 in the direction from the optical communicator 2*b*Y to the connection node device 1*f*Y. The characteristics of the optical fiber 53T and the optical fiber 53R included in the optical transmission path 53 can be generally regarded to be the same. Therefore, even if the transmission path information of any optical transmission path 53 is used, the same transmission path characteristics can be calculated, and the same transmission mode can be identified.

The controller 12/Y of the connection node device 1/Y may transmit a transmission path information acquisition instruction signal to an optical transceiver provided in a newly connected optical communicator. The transmission path information acquisition instruction signal and the information related to the optical transmission path 53 acquired by the controller 71aY of the connection node device 1/Y may be transmitted using a free area of the overhead of a transmission frame, and may be transmitted using a communication channel of the transmission frame or a payload area of the transmission frame. Also, in the first to fourth embodiments and the other configuration examples of the respective embodiments, even when acquiring the transmission path information of the optical transmission paths 51, 51-1 to 51-*m*, a means for acquiring the transmission path information of the optical transmission path 53, a means for calculating the transmission path information of the optical fibers 51R, and 51R-1 to 51R-m may be applied rather than calculating the transmission path information of the optical fibers 51T and 51T-1 to 51T-m provided in the optical transmission paths 51 and 51-1 to 51-*m*.

In the fourth embodiment, instead of the optical communicators 2bX and 2bY, the optical communicator 2X having the optical transceiver 21X having the single-wavelength light source 25X and the optical communicator 2Y having the optical transceiver 21Y having the single-wavelength light source 25Y may be connected to the connection node devices 1/X and 1/Y, respectively.

In the first to fourth embodiments, the connection request data and the transmission mode information are transmitted using a free area of the overhead area of a transmission frame. On the other hand, the connection request data and the transmission mode information may be transmitted through the communication channel of the transmission frame or may be transmitted through the payload area of the transmission frame.

In the first to fourth embodiments described above, connection information including BER is generated, but connection information not including BER may be generated.

In the third and fourth embodiments, the optical input information is transmitted using a communication channel. On the other hand, the optical input information may be transmitted through the GCC (General Communication Channel) of the frame header.

In the first and second embodiments described above, since there is only one optical transceiver 21X for transmitting the connection request data, the controller 12 and the transmission path designer 42 of the operation device 4 need not include the source address information included in the connection request data when generating the transmission mode information. In the fourth embodiment, since one optical transceiver 21aX and 21aY is connected to each of the connection node devices 1X and 1/Y, the operation device 4e does not have to include the source address information included in the connection request data when generating the transmission mode information. In the third embodiment, even when m=1, the source address information included in the connection request data may not be included when generating the transmission mode information. When the source address information is not included in the transmission mode information, the controllers 71X, 71Y. 71aX, 71aY, 71X-1, 71Y-1, 71aX-1, and 71aY-1 of the optical transceivers 21X, 21Y, 21aX, 21aY, 21X-1, 21Y-1, 21aX-1, and 21aY-1 upon taking in the transmission mode information output by the digital signal processors 23X, 23Y, 23aX, 23aY. 23X-1, 23Y-1, 23aX-1, and 23aY-1 do not need to determine whether the taken-in transmission mode information includes the address information assigned to the optical transceivers 21X, 21Y, 21aX, 21aY, 21X-1, 21Y-1, 21aX-1, and 21aY-1 stored in the internal storage area, and the taken-in transmission mode information can be used as the transmission mode information corresponding to the connection request data generated by themselves.

In the first to fourth embodiments and the other configuration examples, the fundamental output optical power in the fundamental mode may not be determined in advance. In this case, when the optical signal is transmitted in the fundamental mode, the single-wavelength light sources 25X, 25Y, 25X-1 to 25X-m, and 25Y-1 to 25Y-m, and the wavelength-tunable light sources 25aX. 25aY, 25aX-1 to 25aX-m, and 25aY-1 to 25aY-m generate the optical signal with the output optical power of the initial value.

The transmission path designer 42e of the fourth embodiment calculates the end-to-end transmission path characteristics between the source and the destination based on the connection information received from each of the connection node devices 1/X and 1/Y and the transmission path information of the optical transmission path 52 corresponding to the destination address information included in the connection request data. On the other hand, the following configuration may be employed.

The controllers 121X and 12/Y of the connection node devices 11X and 1/Y calculate the transmission path characteristics based on the connection information of the optical transmission paths 51 and 53, and transmit the calculated transmission path characteristics to the operation device 4e instead of the connection information. The transmission path designer 42e of the operation device 4e calculates the transmission path characteristics of the optical transmission path 52 based on the transmission path information of the optical transmission path 52 stored in the internal storage area. The transmission path designer 42e may calculate the approximate end-to-end transmission path characteristics based on the transmission path characteristics of the optical transmission path 51 transmitted by the controllers 12/X and 12/Y, the transmission path characteristics of the optical transmission path 53, and the transmission path characteristics of the optical transmission path 52 calculated based on the transmission path information of the optical transmission path 52. The transmission path designer 42e may calculate the transmission path characteristics of the optical transmission path 52 in advance based on the transmission path information of the optical transmission path 52 instead of calculating the transmission path characteristics of the optical transmission path 52 based on the transmission path information of the optical transmission path 52, store the calculated transmission path characteristics of the optical transmission path 52 in the internal storage area, and read the transmission path characteristics of the optical transmission path 52 from the internal storage area instead of the processing of calculating the transmission path characteristics of the optical transmission path 52.

In the first to fourth embodiments and other configuration examples of the respective embodiments, the following configurations may be employed. For example, the connection information generators 38, 38a, and 38aX provided in the connection node devices 1, 1a, 1b, 1c. 1d, 1e, and 11X calculate the transmission path information of the optical transmission path 51 a plurality of times. In the fourth embodiment, the connection information generator 38aY included in the connection node device 1/Y further calculates the transmission path information of the optical transmission path 53 a plurality of times. The controller 12 and the transmission path designers 42, 42a, 42b, 42c, 42d, and 42e acquire all the pieces of transmission path information calculated a plurality of times by the connection information generators 38, 38a, 38aX, and 38aY. The controller 12 and the transmission path designers 42, 42a, 42b, 42c, 42d, and 42e calculate a plurality of transmission path characteristics corresponding to each of the plurality of pieces of acquired transmission path information, and identify a plurality of transmission modes corresponding to the plurality of calculated transmission modes. The controller 12 and the transmission path designers 42, 42a, 42b, 42c, 42d, and 42e may select one transmission mode by majority vote among the plurality of identified transmission modes, that is, the transmission mode of the type appearing most frequently in the plurality of types of transmission modes, and may use the selected transmission mode as the final transmission mode.

In the first to fourth embodiments and other configuration examples of the respective embodiments, in the case of the connection node devices 1, 1a, 1c, 1e, 1X, and 1fY, a wavelength-tunable light source similar to, for example, the wavelength-tunable light source 25aX, which is a wavelength-tunable light source in which the wavelength of continuous light to be generated is determined in advance as the fundamental wavelength may be applied instead of the single-wavelength light sources 36, 36X, and 36Y provided in the connection information processors 13, 13a, 13aX, and 13aY. At the timing when the connection information processors 13, 13a, 13aX, and 13aY are provided in the connection node devices 1, 1a, 1b, 1c, 1d, 1e, 1X, and 1Y, the controllers 12, 12a, 12b, 12c, 12e, 12fX, and 12fY of the connection node devices 1, 1a, 1b, 1c, 1e, 1fX, and 1fY may output a wavelength designation signal designating the fundamental wavelength to the wavelength-tunable light source so that the wavelength of the wavelength-tunable light source is set to the fundamental wavelength. Similarly, a wavelength-tunable light source similar to, for example, the wavelength-tunable light source 25aX, which is a wavelength-tunable light source in which the wavelength of continuous light to be generated is determined in advance as the fundamental wavelength may be applied instead of the single-wavelength light sources 25X, 25X-1 to 25X-m, 25Y, and 25Y-1 to 25Y-n provided in the optical transceivers 21X, 21X-1 to 21X-m, 21Y, and 21Y-1 to 21Y-n. At the timing when the optical transceivers 21X, 21X-1 to 21X-m, 21Y, and 21Y-1 to 21Y-n are provided in the optical communicators 2X, 2X-1 to 2X-m, 2Y, 2eY. 2Y-1 to 2Y-n, the controllers 20X, 20X-1 to 20X-m, 20Y, 20aY, and 20Y-1 to 20Y-n of the optical communicators 2X, 2X-1 to 2X-m. 2Y, and 2Y-1 to 20Y-n may output a wavelength designation signal designating the fundamental wavelength to the wavelength-tunable light source through the controllers 71X, 71X-1 to 71X-m, 71Y, 71Y-1 to 71Y-n so that the wavelength of the wavelength-tunable light source is set to the fundamental wavelength.

In the first to fourth embodiments and other configuration examples of the respective embodiments, the controllers 71X, 71X-1 to 71X-m. 71aX-1 to 71aX-m, 71aX, and 71aY may generate connection request data. On the other hand, the controllers 20X, 20aX, 20X-1 to 20X-m, and 20Y may store the address information assigned to the optical transceivers 21X. 21X-1 to 21X-m. 21aX-1 to 21aX-m, 21aX, and 21aY connected thereto in an internal storage area, and generate the connection request data instead of a connection request instruction signal, and output the generated connection request data to the controllers 71X, 71X-1 to 71X-m, 71aX-1 to 71aX-m, 71aX, and 71aY provided in the optical transceivers 21X, 21X-1 to 21X-m. 21aX-1 to 21aX-m. 21aX, and 21aY, which are connection sources. In this case, since the controllers 71X, 71X-1 to 71X-m, 71aX-1 to 71aX-m, 71aX, and 71aY only need to take in the connection request data output by the controllers 20X, 20aX, 20X-1 to 20X-m, and 20Y and output the taken-in connection request data, it is not necessary to generate the connection request data.

In the first to fourth embodiments and the other configuration examples of the respective embodiments, the connection information generators 38, 38a, 38aX, and 38aY may be implemented as follows. For example, in the case of the connection node device 1 of the first embodiment, the IF unit 31, the optical receiver 33, the optical transmitter 35, and the digital signal processor 32 of the connection information processor 13 are inserted into the main body of the connection node device 1 as one hardware package. In this case, the connection information generator 38 and the controller 12 may be functional units generated by executing a computer program in a CPU (central processor) of the main body of the connection node device 1. Further, a CPU may be further provided in a hardware package including the IF unit 31, the optical receiver 33, the optical transmitter 35, and the digital signal processor 32. A computer program may be executed by the CPU in the hardware package to generate the functional unit of the connection information generator 38. A computer program may be executed by the CPU in the main body of the connection node device 1 to generate the functional unit of the controller 12. Further, the connection information generators 38, 38a, 38aX, and 38aY may not be realized as software as described above, but an OTDR (Optical Time Domain Reflectometer) may be provided as the connection information generator 38 in the hardware package, and the transmission path information may be acquired by measurement by the OTDR.

The connection information generators 38, 38a, 38aX, and 38aY may be provided outside the connection information processors 13, 13a, 13b, 13aX, and 13aY. In this case, the connection information generators 38, 38a, 38aX, and 38a Y, and the controllers 12, 12a, 12b, 12c, 12d, 12e, 12fX, and 12fY may be integrated with each other. Further, a part of the processing of the connection information generators 38, 38a, 38aX, and 38aY may be performed by both or either one of the digital signal processors 32, 32a, 32aX, and 32a Y and the controllers 12, 12a, 12b, 12c, 12d, 12e, 12fX, and 12fY. Further, a part of the processing of the connection information generators 38, 38a, 38aX, and 38aY may be performed by the digital signal processors 32, 32a, 32aX, and 32aY, the remaining processing may be performed by the controllers 12, 12a, 12b, 12c, 12d, 12d, 12e, 12fx, 12e, 12fX, and 12fY, the connection information generators 38, 38a, 38aX, and 38aY may not be provided. Furthermore, the processing of the connection information generators 38, 38a, 38aX, and 38aY may be performed by the digital signal processors 32, 32a, 32aX, and 32a Y, and the connection information generators 38, 38a, 38aX, and 38aY may be not provided.

In the above-described embodiments, the digital signal processors 23X, 23aX. 23X-1 to 23X-m, 23aX-1 to 23aX-m. 23Y, 23aY, 23Y-1 to 23Y-n, and 23aY-1 to 23aY-n, the controllers 20X, 20aX, 20X-1 to 20X-m, 20Y. 20aY, and 20Y-1 to 20Y-n, the controllers 71X, 71aX. 71X-1 to 71X-m, 71Y, 71aY, and 71Y-1 to 71Y-n, the transmission controller 29X, the digital signal processors 32, 32a, 32aX, and 32a Y, the connection information generators 38, 38a, 38aX, and 38a Y, the controllers 12, 12a, 12b, 12c, 12d, 12e, 12fX, and 12/Y, and the operation devices 4, 4*a*, 4*b*, 4*c*, 4*d*, and 4*e* may be realized by a computer. In this case, a program for realizing this function may be recorded on a computer-readable recording medium, and the program recorded on the recording medium may be read by the computer system and executed. Here, the "computer system" is assumed to include hardware such as an OS and peripheral equipment. The "computer-readable recording medium" refers to portable media such as flexible discs, magneto-optical discs. ROMs and CD-ROMs, and storage devices such as hard disks built into computer systems. In addition, the "computer-readable recording medium" may include a medium configured to hold the program dynamically for a short period of time like a communication line when the program is transmitted over a network such as the Internet and a communication circuit such as a telephone line and a medium configured to hold the program for a certain period of time like a volatile memory inside a computer system serving as a server and a client in that case.

Furthermore, the program may be used to realize some of the above-described functions. In addition, the program may be used to realize the above-described functions in combination with a program which is already recorded in a computer system. The program may be realized using a programmable logic device such as an FPGA (field Programmable Gate Array).

Although the embodiments of the present invention have been described in detail with reference to the drawings, specific configurations are not limited to these embodiments, and design or the like made without departing from the gist of the present invention is also included in the scope of the present invention.

INDUSTRIAL APPLICABILITY

The present invention can be used when setting an optical path passing through a plurality of optical transmission paths.

REFERENCE SIGNS LIST

1 Connection node device
2X, 2Y Optical communicator
3 Connection line
11 Edge functional unit
12 Controller
13 Connection information processor
14 Output port switching unit
21Y Optical transceiver
20Y Controller
51, 52 Optical transmission path

The invention claimed is:

1. A connection node device comprising:
a connection information processor configured to acquire connection information including transmission path information that is information related to an optical transmission path;
an output port switch configured to connect to a first optical transmission path, a second optical transmission path, and the connection information processor, and sets a destination of the first optical transmission path as the connection information processor in an initial state;
a controller configured to transmit transmission mode information indicating a transmission mode identified based on connection information of the first optical transmission path acquired from an optical signal transmitted by an optical transceiver provided in an optical communicator that the connection information processor connects to the first optical transmission path, connection request data included in the optical signal and transmitted by the optical transceiver, and transmission path information of the second optical transmission path to the optical transceiver through the first optical transmission path, wherein
the output port switch performs switching processing of switching a destination of the first optical transmission path from the connection information processor to the second optical transmission path after the controller transmits the transmission mode information.

2. The connection node device according to claim 1, wherein a plurality of first optical transmission paths exists,
the controller transmits transmission mode information indicating a transmission mode identified based on connection information of the first optical transmission path that has transmitted the optical signal, acquired from an optical signal transmitted by the optical transceiver that the connection information processor connects to any one of the first optical transmission paths, connection request data included in the optical signal and transmitted by the optical transceiver, and transmission path information of the second optical transmission path to the source optical transceiver indicated in the connection request data through the first optical transmission path, and
the output port switch performs switching processing of switching a destination of the first optical transmission path to which the source optical transceiver connects, indicated in the connection request data from the connection information processor to the second optical transmission path after the controller transmits the transmission mode information.

3. The connection node device according to claim 1, wherein an optical signal can be communicated by wavelength multiplexing in the first optical transmission path,
the output port switch sets a destination of a fundamental wavelength determined in advance of the first optical transmission path as the connection information processor in an initial state,
the controller transmits transmission mode information indicating transmission mode identified based on connection information of the first optical transmission path acquired from an optical signal transmitted with the fundamental wavelength by the optical transceiver that the connection information processor connects to the first optical transmission path, connection request data included in the optical signal transmitted by the optical transceiver, and transmission path information of the second optical transmission path to the source optical transceiver indicated in the connection request data through the fundamental wavelength of the first optical transmission path, and
the output port switch performs switching processing of setting a destination of a wavelength path with a wavelength indicated in the transmission mode information included in the first optical transmission path to which the source optical transceiver indicated in the connection request data is connected as a wavelength path with a wavelength indicated in the transmission mode information included in the second optical transmission path after the controller transmits the transmission mode information.

4. The connection node device according to claim 1, wherein a plurality of second optical transmission paths exists, the controller transmits transmission mode information indicating a transmission mode identified based on connection information of the first optical transmission path acquired by the connection information processor, the connection request data, and transmission path information of the second optical transmission path corresponding to a destination indicated in the connection request data to the optical transceiver through the first optical transmission path, and the output port switch performs switching processing of setting the second optical transmission path corresponding to a destination indicated in the connection request data as a destination after the controller transmits the transmission mode information.

5. The connection node device according to claim 1, wherein an optical signal can be communicated by wavelength multiplexing in the second optical transmission path, the controller transmits transmission mode information indicating a transmission mode identified based on connection information of the first optical transmission path acquired by the connection information processor, the connection request data, and transmission path information of the second optical transmission path corresponding to a destination indicated in the connection request data to the optical transceiver through the first optical transmission path, and the output port switch performs switching processing of setting a wavelength path with a wavelength indicated in the transmission mode information included in the second optical transmission path corresponding to a destination indicated in the connection request data as a destination after the controller transmits the transmission mode information.

6. The connection node device according to claim 5, wherein the connection node device includes a wavelength converter that converts a wavelength of a given light to a wavelength received from the controller and outputs the wavelength, the optical transceiver has a light source that outputs light with a single wavelength, the optical transceiver sets a destination after switching to the wavelength converter after the controller transmits the transmission mode information, the controller outputs a wavelength indicated in the transmission mode information to the wavelength converter, and the wavelength converter receives an optical signal transmitted to the first optical transmission path by the optical transceiver through the output port-switch, converts a wavelength of the received optical signal to a wavelength received from the controller, and transmits the optical signal to the second optical transmission path corresponding to the destination indicated in the connection request data.

7. An optical transmission system comprising:

the connection node device according to claim 1;

a first optical communicator configured to connect to the other end of the first optical transmission path having one end to which the connection node device is connected; and a second optical communicator configured to connect to the connection node device directly or indirectly through the second optical transmission path having one end to which the connection node device is connected, wherein an optical transceiver provided in the first optical communicator receives the transmission mode information transmitted through the first optical transmission path by the controller of the connection node device and transmits and receives an optical signal through the first optical transmission path according to a transmission mode indicated by the received transmission mode information, an optical transceiver provided in the second optical communicator receives the transmission mode information and transmits and receives an optical signal through the second optical transmission path according to a transmission mode indicated by the received transmission mode information, and an output port switch of the connection node device performs the switching processing so that the optical transceiver provided in the first optical communicator and the optical transceiver provided in the second optical communicator are connected through the first optical transmission path and the second optical transmission path after the controller transmits the transmission mode information to the first optical communicator through the first optical transmission path.

8. The optical transmission system according to claim 7, wherein the second optical communicator connects to the other end of the second optical transmission path, the controller of the connection node device acquires transmission path information of the second optical transmission path, generates the transmission mode information indicating the transmission mode based on the acquired transmission path information of the second optical transmission path, connection information of the first optical transmission path acquired by the connection information processor, and the connection request data, transmits the generated transmission mode information to the first optical communicator through the first optical transmission path, and transmits the transmission mode information to the second optical communicator, the optical transceiver provided in the second optical communicator receives the transmission mode information transmitted by the controller and transmits and receives an optical signal through the second optical transmission path according to a transmission mode indicated by the received transmission mode information.

9. The optical transmission system according to claim 7, further comprising: an operation device that connects to the connection node device, wherein the operation device acquires transmission path information of the second optical transmission path, generates transmission mode information indicating the transmission mode based on the acquired transmission path information of the second optical transmission path, connection information of the first optical transmission path that the connection information processor of the connection node device acquires from an optical signal transmitted by an optical transceiver provided in the first optical communicator, and connection request data included in the optical signal transmitted by the optical transceiver provided in the first optical communicator, and transmits the generated transmission mode information to a controller of the connection node device, and the optical transceiver provided in the first optical communicator receives the transmission mode information that the controller of the connection node device receives from the operation device, the transmission mode information being transmitted through the first optical transmission path and transmits and receives an optical signal through the first optical transmission path according to a transmission mode indicated by the received transmission mode information.

10. The optical transmission system according to claim 9, wherein the second optical communicator connects to the other end of the second optical transmission path,
the operation device connects to the connection node device and the second optical communicator and transmits the transmission mode information to the controller of the connection node device and the second optical communicator, and
the optical transceiver provided in the second optical communicator receives the transmission mode information transmitted by the operation device and transmits and receives an optical signal through the second optical transmission path according to a transmission mode indicated by the received transmission mode information.

11. The optical transmission system according to claim 9, further comprising: a third optical transmission path; and
a second optical communicator configured to connect to the third optical transmission path, wherein
a plurality of connection node devices exists,
the output port switch of one of the connection node devices connects to the first optical transmission path, the second optical transmission path, and the connection information processor of the host device and sets a destination of the first optical transmission path in an initial state as the connection information processor of the host device,
the output port switch of the other connection node device that connects to the third optical transmission path, the other connection node device being any one of the connection node devices other than the one connection node device, connects to the third optical transmission path, the other end of the second optical transmission path having one end to which the one connection node device is connected, and the connection information processor of the host device and sets a destination of the third optical transmission path in an initial state as the connection information processor of the host device,
the operation device connects to the one connection node device and the other connection node device, acquires transmission path information of the second optical transmission path, generates transmission mode information indicating the transmission mode based on the acquired transmission path information of the second optical transmission path, connection information of the first optical transmission path that the connection information processor of the one connection node device acquires from an optical signal transmitted by an optical transceiver provided in the first optical communicator, connection request data included in the optical signal transmitted by the optical transceiver provided in the first optical communicator, connection information of the third optical transmission path that the connection information processor of the other connection node device acquires from an optical signal transmitted by an optical transceiver provided in the second optical communicator, and connection request data included in the optical signal transmitted by the optical transceiver provided in the second optical communicator, transmits the generated transmission mode information to the controller of the one connection node device and the controller of the other connection node device,
the optical transceiver provided in the first optical communicator receives the transmission mode information that the controller of the one connection node device receives from the operation device, the transmission mode information being transmitted through the first optical transmission path, and transmits and receives an optical signal through the first optical transmission path according to a transmission mode indicated by the received transmission mode information,
the optical transceiver provided in the second optical communicator receives the transmission mode information that the controller of the other connection node device receives from the operation device, the transmission mode information being transmitted through the third optical transmission path, and transmits and receives an optical signal through the third optical transmission path according to a transmission mode indicated by the received transmission mode information,
the output port switch of the one connection node device performs the switching processing so that the first optical transmission path and the second optical transmission path are connected after the controller of the one connection node device transmits the transmission mode information to the optical transceiver of the first optical communicator through the first optical transmission path, and
the output port switch of the other connection node device performs the switching processing so that the second optical transmission path and the third optical transmission path are connected after the controller of the other connection node device transmits the transmission mode information to the optical transceiver of the second optical communicator through the third optical transmission path.

12. The optical transmission system according to claim 11, wherein
the operation device transmits a trigger signal for transmitting connection information of the third optical transmission path and the connection request data to the other connection node device when the connection information of the third optical transmission path and the connection request data included in the optical signal transmitted by the optical transceiver provided in the second optical communicator are not received from the other connection node device.

13. The optical transmission system according to claim 11, wherein
the optical transceiver provided in the second optical communicator acquires information related to the third optical transmission path from an optical signal transmitted by the other connection node device and transmits the acquired information related to the third optical transmission path to the other connection node device through the third optical transmission path, and
the connection information processor of the other connection node device receives the information related to the third optical transmission path transmitted by the optical transceiver provided in the second optical communicator through the third optical transmission path and acquires transmission path information of the third optical transmission path in a direction from the other connection node device to the second optical communicator from the received information related to the third optical transmission path.

14. The optical transmission system according to claim 9, wherein the operation device calculates transmission path characteristics based on the connection information acquired by the connection information processor and transmission path information of the second optical transmission path corresponding to a destination indicated in the connection request data and generates the transmission mode information indicating the transmission mode based on the calculated transmission path characteristics, or generates the transmission mode information indicating the transmission mode based on transmission path characteristics calculated based on transmission path information of the second optical transmission path corresponding to a destination indicated in the connection request data and transmission path characteristics calculated based on the connection information that the controller of the connection node device acquires from the connection information processor.

15. The optical transmission system according to claim 8, wherein the controller of the connection node device calculates transmission path characteristics based on the connection information acquired by the connection information processor and transmission path information of the second optical transmission path corresponding to a destination indicated in the connection request data and generates the transmission mode information indicating the transmission mode based on the calculated transmission path characteristics, or generates the transmission mode information indicating the transmission mode based on transmission path characteristics calculated based on transmission path information of the second optical transmission path corresponding to a destination indicated in the connection request data and transmission path characteristics calculated based on the connection information acquired from the connection information processor.

16. The optical transmission system according to claim 7, wherein the connection information processor of the connection node device connected to the first optical transmission path acquires transmission path information of the first optical transmission path in a direction from the first optical communicator to the connection node device or acquires transmission path information of the first optical transmission path in a direction from the connection node device to the first optical communicator.

17. The optical transmission system according to claim 7 further comprises, a plurality of optical transceivers is connected to the first optical transmission path, the controller of the connection node device transmits initial setting information for avoiding collision of the connection request data to the plurality of optical transceivers through the first optical transmission path, the plurality of optical transceivers receives an optical signal including the initial setting information from the first optical transmission path and transmits the connection request data according to the received initial setting information.

18. The optical transmission system according to claim 7, wherein the first optical communicator includes:

a plurality of optical transceivers; and a transmission controller configured to adjust timings for the plurality of optical transceivers to transmit the connection request data so that pieces of connection request data that the plurality of optical transceivers transmits through the first optical transmission path do not collide with each other.

19. The optical transmission system according to claim 7, wherein the optical transceiver connected to the first optical transmission path stops optical output for a time determined arbitrarily when a response optical signal is not received from the connection node device in a predetermined waiting time after the connection request data is transmitted.

20. A connection method comprising: allowing an output port switch to connect to a first optical transmission path, a second optical transmission path, and the connection information processor, and set a destination of the first optical transmission path as the connection information processor in an initial state;

allowing a controller to transmit transmission mode information indicating a transmission mode identified based on connection information of the first optical transmission path acquired from an optical signal transmitted by an optical transceiver provided in an optical communicator that the connection information processor connects to the first optical transmission path, connection request data included in the optical signal and transmitted by the optical transceiver, and transmission path information of the second optical transmission path to the optical transceiver through the first optical transmission path; and allowing the output port switch to perform switching processing of switching a destination of the first optical transmission path from the connection information processor to the second optical transmission path after the controller transmits the transmission mode information.

* * * * *